United States Patent [19]
Nakashima

[11] Patent Number: 6,104,843
[45] Date of Patent: Aug. 15, 2000

[54] IMAGE DATA STORING METHOD AND IMAGE DATA ROTATIONAL PROCESSING DEVICE

[75] Inventor: Tadashi Nakashima, Kanagawa, Japan

[73] Assignee: Fuji Xerox Co., Ltd., Tokyo, Japan

[21] Appl. No.: 08/663,773

[22] Filed: Jun. 14, 1996

[30] Foreign Application Priority Data

Jun. 16, 1995 [JP] Japan .................................. 7-174140

[51] Int. Cl.[7] .................................................. G06K 9/54
[52] U.S. Cl. ........................ 382/305; 382/296; 382/297; 382/304; 395/126; 395/137; 395/507; 345/126
[58] Field of Search .................................. 382/296, 297, 382/305, 304; 395/126, 137, 507; 345/126

[56] References Cited

U.S. PATENT DOCUMENTS

| | | | |
|---|---|---|---|
| 4,929,085 | 5/1990 | Kajihara | 364/518 |
| 5,034,733 | 7/1991 | Okazawa et al. | 340/727 |
| 5,386,301 | 1/1995 | Yuasa et al. | 358/445 |
| 5,471,549 | 11/1995 | Kurosu et al. | 382/290 |
| 5,479,525 | 12/1995 | Nakamura et al. | 382/297 |
| 5,577,182 | 11/1996 | Hayashi | 395/137 |
| 5,579,419 | 11/1996 | Yaguchi et al. | 382/305 |
| 5,644,659 | 7/1997 | Honda | 382/276 |

FOREIGN PATENT DOCUMENTS 63-40972 2/1988 Japan .
63-95694 4/1988 Japan .

*Primary Examiner*—Jose L. Couso
*Assistant Examiner*—Kanji Patel
*Attorney, Agent, or Firm*—Finnegan, Henderson, Farabow, Garrett & Dunner, L.L.P.

[57] ABSTRACT

Image data representing a two-dimensional image is stored in N data storage devices driven in parallel. The two-dimensional image is divided into small divisional areas arranged in rectilinearly oriented lines and rows such that the number of areas in each line is equal to 2N and the number of areas in each row is equal to or less than 2N. The small divisional areas are stored in the N data storage devices such that no more than two of the areas in the same line are stored in the same storage device and no more of than two of the areas in the same row are stored in the same storage device. Additionally, two areas from the same line which are stored in the same storage device are positioned either adjacent to one another in the line or at opposite ends of the line and two areas from the same row which are stored in the same storage device are positioned either adjacent to one another in the row or at opposite ends of the row. The two-dimensional image is displayed on a display device by reading the small divisional areas out of the storage devices in parallel and supplying the data to the display device through a buffer memory. One data access procedure reads out the image data in its original orientation and a second data access procedure reads out the image data rotated at 90 degrees relative to the original orientation.

5 Claims, 46 Drawing Sheets

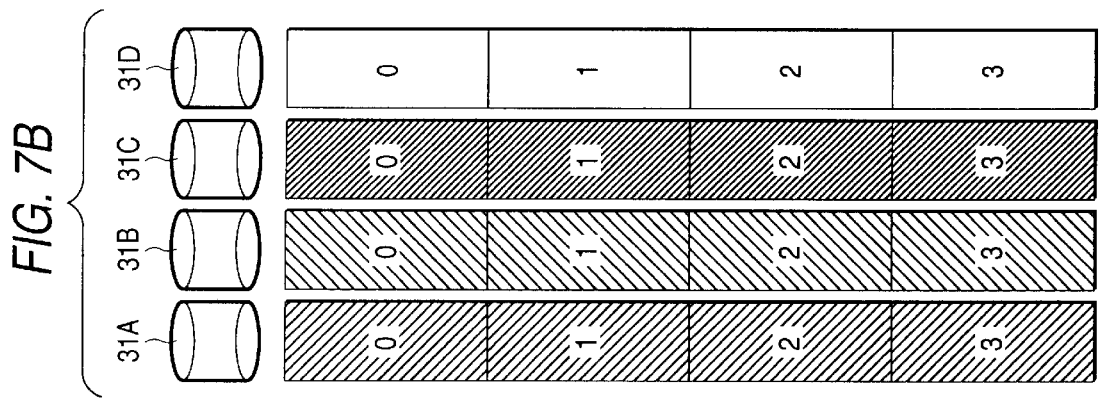
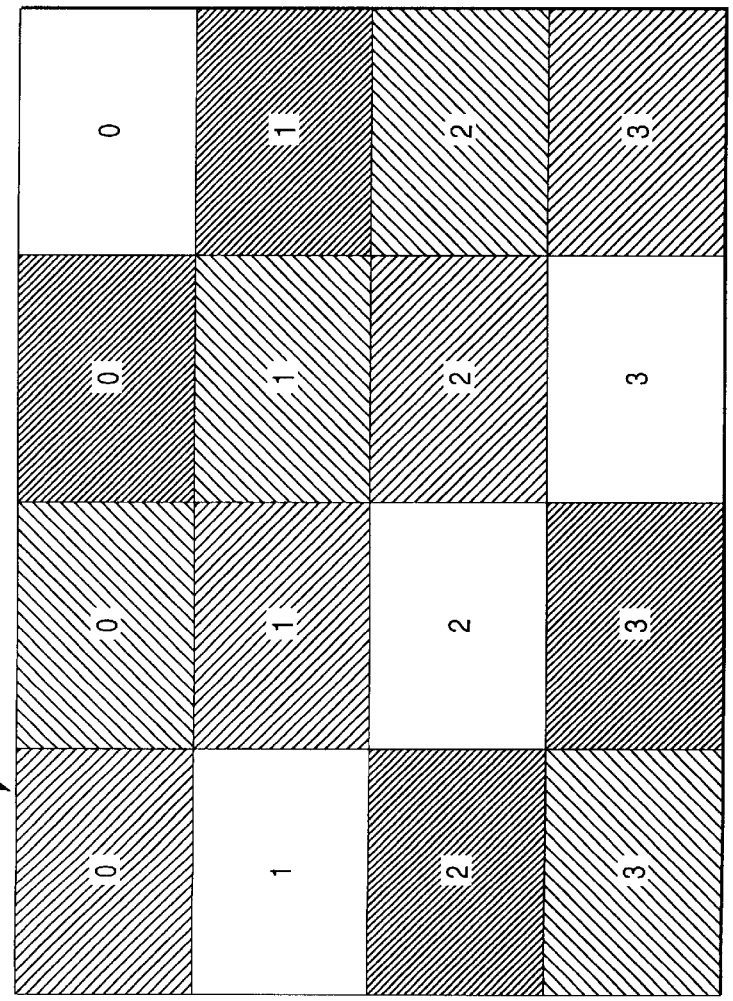

IM TWO-DIMENSIONAL IMAGE

FIG. 28
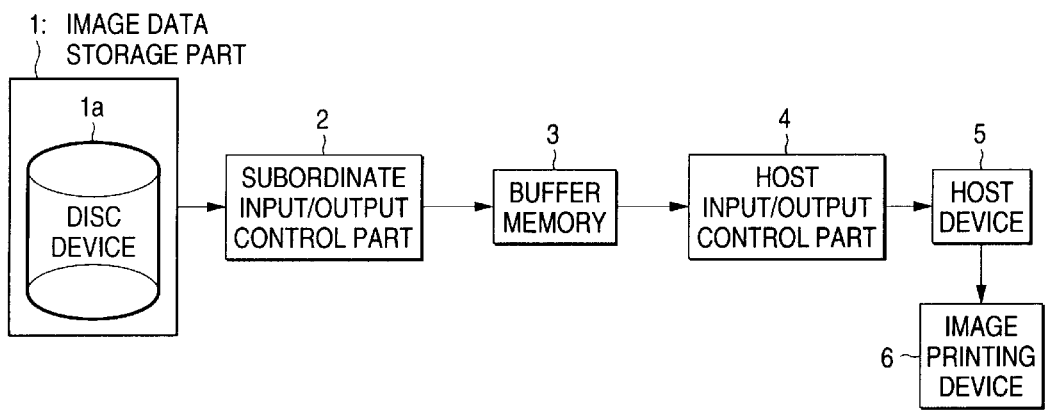
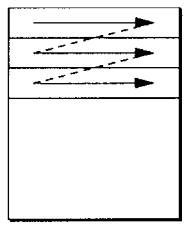
FIG. 29A
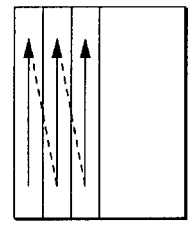
FIG. 29B
FIG. 30A
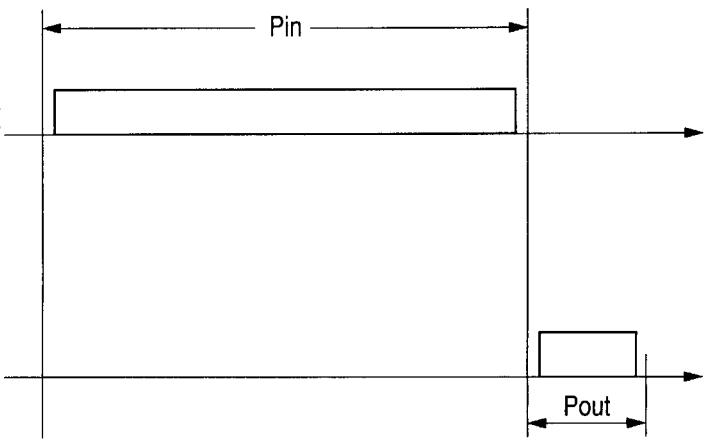
SUBORDINATE DEVICE
→ BUFFER MEMORY
FIG. 30B
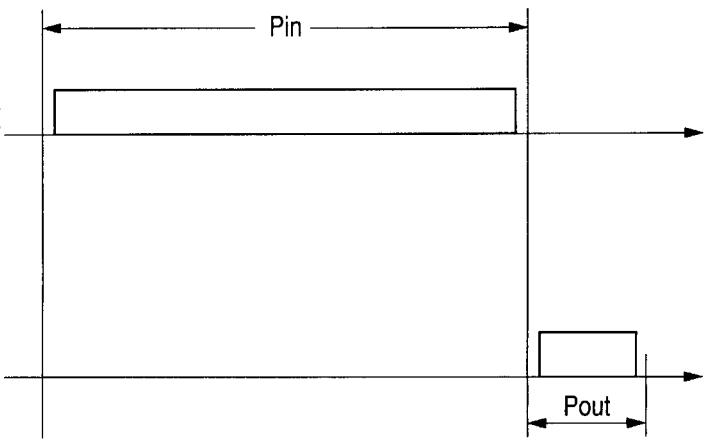
BUFFER MEMORY
→ HOST DEVICE FIG. 35
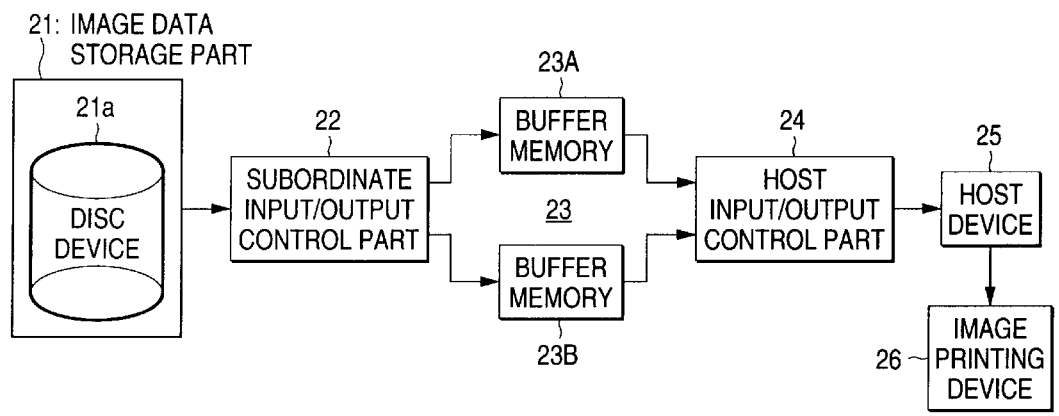
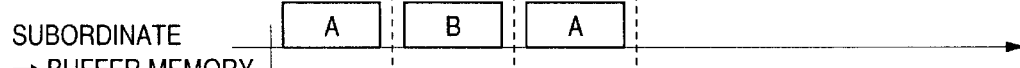
FIG. 36A
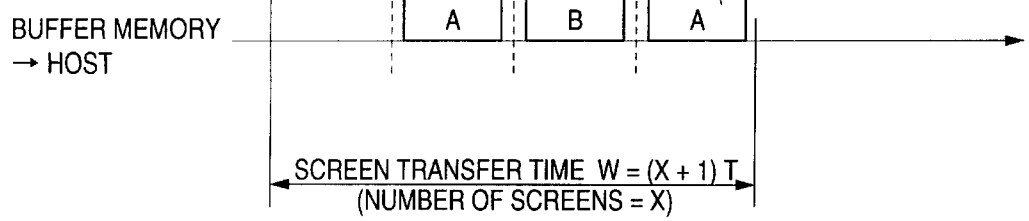
FIG. 36B

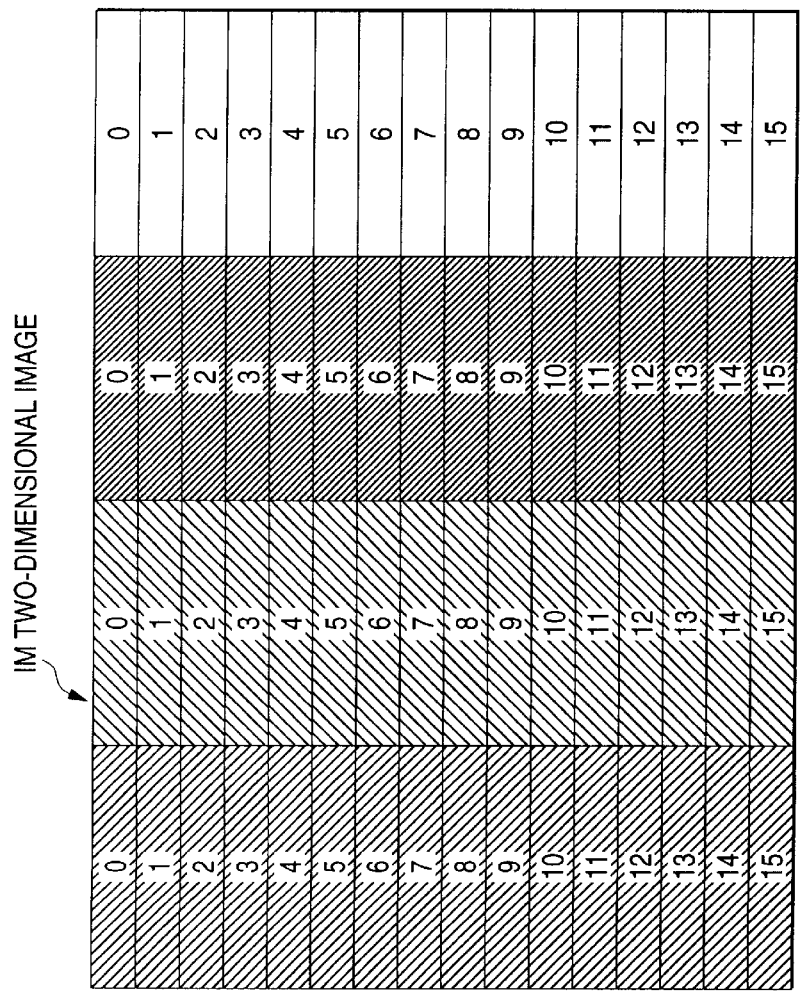

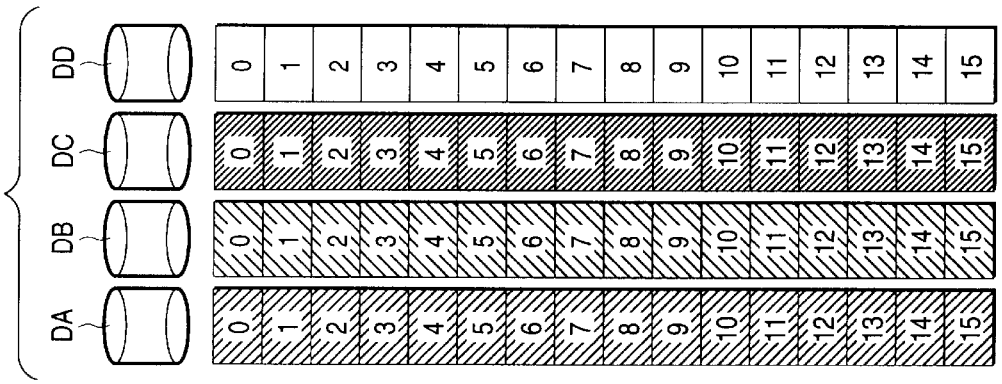
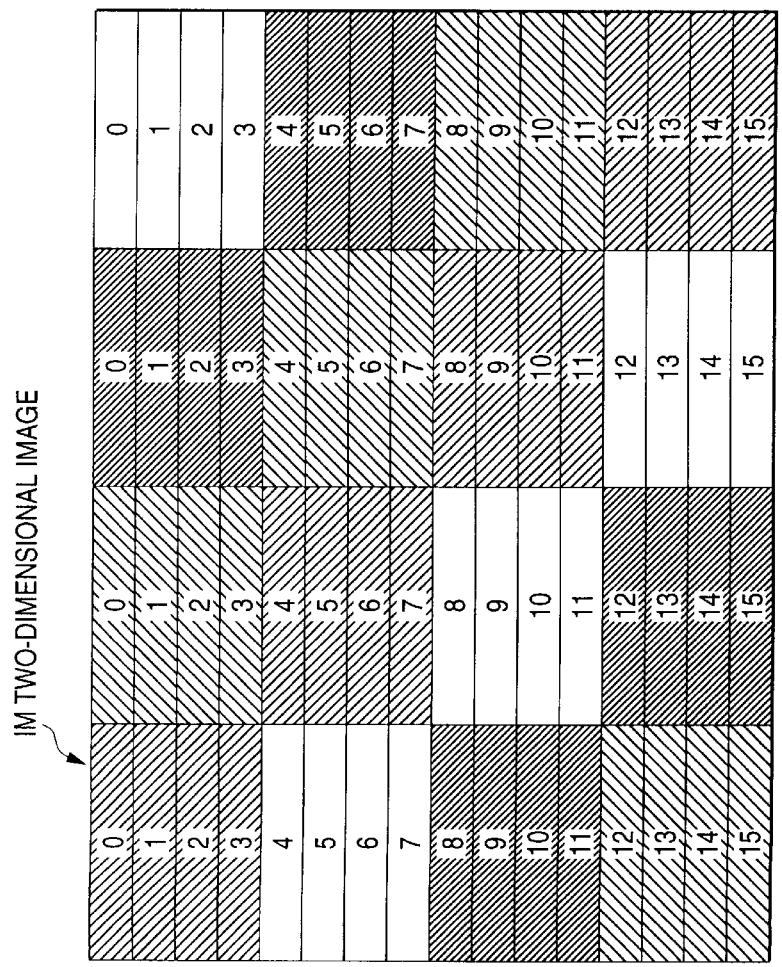

FIG. 45A

IM TWO-DIMENSIONAL IMAGE

FIG. 45B

IMAGE DATA STORING METHOD AND IMAGE DATA ROTATIONAL PROCESSING DEVICE

BACKGROUND OF THE INVENTION

The present invention relates to an image data storing method and an image data rotational processing device in which image data can be obtained at high speeds with a small buffer memory capacity not only when reading out an original image as it is from a storage part for storing therein image data on a two-dimensional image but also when reading out a rotated image rotated by a certain degree such as 90 degrees with respect to the original image.

When reading out image data on an two-dimensional image stored in an image data storage part and printing the two-dimensional image on a sheet, there occurs a case in which it is necessary to rotate the image by 90 degrees according to the direction of the sheet (the sheet feeding direction). For example, when an image longer in the vertical direction thereof is to be printed on a printing sheet arranged in the horizontal direction, it is necessary to obtain data on a two-dimensional image that is rotated by 90 degrees in the clockwise direction.

As one of techniques which can cope with the above-mentioned image rotation, there is known a method in which there is provided a buffer memory having an image data capacity corresponding to one screen, image data corresponding to one screen are once written into the buffer memory from an image data storage part, and, when the image data are read out from the buffer memory, the read-out order of pixels is operated before the pixels are transferred to a host device such as a printer or the like.

In most cases, a large capacity of image data are stored in a disc device such as a magnetic disc device or the like which is inexpensive at a unit cost per recording capacity. However, for recording and reproduction of moving images as well as for high speed image input and print-out (printing), a higher image data transfer throughput is required and, as one of techniques which can deal with such high throughput requirement, conventionally, there is known a technique in which a plurality of disc devices are driven in parallel to each other.

In this disc devices parallel driving method, a plurality of disc devices are driven parallel in synchronization with one another so that the image data can be written thereunto and read out therefrom. Further, in order to use the parallel driving with a high efficiency, there is also known a technique in which image data necessary at the same timing are dispersed to a plurality of disc devices so that writing and reading processing can not be concentrated on a specific device.

Now, in FIGS. 28 and 31, there are shown image data rotational processing devices in both of which image data on a two-dimensional image stored are outputted to a host device such as a printer or the like in the form of image data on the two-dimensional image that has been rotated by 90 deg. from their original state, using the above-mentioned conventional techniques.

FIG. 28 is a block diagram of an image data rotational processing device in which a piece of disc device is used as the image data storage part thereof, while FIG. 31 is a block diagram of an image data rotational processing device including a parallel drive disc device in which five pieces of disc devices are driven in parallel as the image data storage part thereof.

In the structure shown in FIG. 28, image data stored in a disc device 1a forming an image data storage part 1 are transmitted by a subordinate input-output control part 2 to a buffer memory 3, in which the image data are stored temporarily. When they are stored into the buffer memory 3 by the subordinate input-output control part 2, the image data are stored in the same direction as they are stored into the image data storage part 1. In this case, as shown in FIG. 29A, in the order in which priority is given to the upper pixel data of the two-dimensional images, the pixel data are written sequentially from left to right in the horizontal direction of the two-dimensional image.

The temporarily stored image data are then read out from the buffer memory 3 and are outputted through a host input-output control part 4 into a host device 5. Here, the image data may be read out from the buffer memory 3 in two manners. That is, to obtain an image in the same state as it is stored in the image data storage part 1 (which is hereinafter referred to as a standard image), the pixel data are taken out from the buffer memory 3 in the same order as they have been written thereunto. On the other hand, to provide a rotated image which is obtained by rotating the standard image by 90 deg. clockwise, in the illustrated case, as shown in FIG. 29B, in the order in which priority is given to the left pixel data of the image, the image data or pixel data are taken out from the buffer memory 3 in the upward direction from the bottom of the vertical direction of the two-dimensional image. In the illustrated case, the host device 5 outputs the received image data to an image printing device 6 and allows the device 6 to print the image data.

Here, FIGS. 30A and 30B are timing charts for a data transfer timing employed in the image data rotational processing device shown in FIG. 28, in which a horizontal axis represents the passage of time. In particular, FIG. 30A shows an input period Pin during which the image data are transferred from the subordinate input-output control part 2 to the buffer memory 3, while FIG. 30B shows an output period Pout during which the image data are transferred from the buffer memory 3 to the host device 5 by the host input-output control part 4.

Further, FIGS. 30A and 30B show a timing employed when the number of screens of the read-out images is 1.

Assuming that the image data stored in the disc device 1a forming the image data storage part 1 are arranged continuously so that the greatest throughput can be provided, then the time necessary for the subordinate input-output control part 2 to transfer the image data from the image data storage part 1 to the buffer memory 3 is almost in inverse proportion to the sustained transfer speed (a speed at which the image data are transferred continuously, this expression will be used similarly in the following description of this specification) of the disc device 1a. Also, the time necessary for transfer of the image data from the buffer memory 3 to the host device 5 is almost in inverse proportion to the sustained transfer speed of the buffer memory 3. In FIGS. 30A and 30B, the sustained transfer speed of the disc device 1a is set to ⅙ to ⅕ of the sustained transfer speed of the buffer memory 3. The image data storage part 1 consists only of one piece of disc device 1a. Therefore, in the structure shown in FIG. 28, as shown in FIGS. 30A and 30B, the input period Pin is 5 to 6 times the output period Pout.

Next, the image data rotational processing device using the parallel driving disc device shown in FIG. 31 will next be described. The structure shown in FIG. 31 is different from the structure shown in FIG. 28 in that an image data storage part 11 is composed of a plurality of disc devices, in the illustrated embodiment, five disc devices and also in that the five disc devices 11A, 11B, 11C, 11D and 11E are driven in parallel to one another. The remaining components and the flow of processing of the structure shown in FIG. 31 are the same as those of the structure shown in FIG. 28.

In the illustrated embodiment, for the five disc devices 11A, 11B, 11C, 11D and 11E of the image data storage part 11, as shown in a data storage view in FIG. 32, image data on the two-dimensional images are stored in such a manner that, for every 5 pixels arranged in the vertical direction, one pixel is stored in one disc device and the pixel data are stored from left to right in the horizontal direction, with priority given to the upper side of the two-dimensional images. That is, assuming that a horizontal direction is referred to as a line and a vertical direction is referred to as a row in FIG. 32, one line of pixel data every five lines are stored in one disc device: for example, the pixel data of the first line, sixth line, eleventh line,—are respectively stored in the disc device 11A; the pixel data of the second line, seventh line, twelfth line,—are stored in the disc device 11B; the pixel data of the third line, eighth line, thirteenth line,—are stored in the disc device 11C; and so on.

In the illustrated embodiment, a subordinate input-output control part 12 reads out five lines of pixel data one pixel after another sequentially from the five disc devices 11A to 11E. That is, the control part 12 reads out simultaneously the five pixels in the vertical direction and repeats this read-out operation in the horizontal direction to thereby store the thus read-out pixels in a buffer memory 13. The processing operations of a host input-output control part 14, a host device 15 and an image printing device 16 are quite the same as in the embodiment shown in FIG. 28.

As described above, in the embodiment shown in FIG. 31, the necessary image data can be obtained from the five disc devices 11A–11E substantially at the same timing and thus the load of the transfer speed when the image data are taken out from the image data storage part 11 can be dispersed equally to the five disc devices 11A–11E.

The timing of the data transfer in the embodiment shown in FIG. 31 is as shown in FIGS. 33A and 33B. In the data transfer timing chart in FIGS. 33A and 33B as well, the horizontal axis represents the passage of time. Similarly to the timing chart in FIGS. 30A and 30B for the device shown in FIG. 28, FIG. 33A shows an input period Pin' during which the image data are transferred from the subordinate input-output control part 12 to the buffer memory 13, while FIG. 33B shows an output period Pout (which is the same as in the embodiment shown in FIG. 28) during which the image data are transferred by the host input-output control part 14 from the buffer memory 13 to the host device 15. Here, FIGS. 33A and 33B also show a timing which is used when the number of screens for the images read out is one.

In the present embodiment, since there is employed the parallel driving method, if the respective sustained transfer speeds of the five disc devices 11A–11E are equal to one another and the parallel driving is carried out ideally, then the transfer time of the image data from the image data storage part 11 to the buffer memory 13 becomes ⅕ of a transfer time necessary for one disc device. That is, the effective sustained transfer speed given by the five disc devices becomes 5 times the sustained transfer speed of one disc device.

Here, the timing chart in FIGS. 33A and 33B show a case in which the respective sustained transfer speeds of the five disc devices 11A–11E in the embodiment shown in FIG. 31 are assumed to be ⅙- ⅕ of the sustained transfer speed of the buffer memory 13 and thus the effective sustained transfer speeds of the five disc devices do not exceed the sustained transfer speed of the buffer memory 13. However, when the effective sustained transfer speed of the image data from the image data storage part 11 exceeds the sustained transfer speed of the buffer memory 13 due to the parallel driving of the five disc devices, the input period Pin' depends on the sustained transfer speed of the buffer memory 13.

In other words, the embodiment shown in FIG. 31 provides a technique which can improve the low data transfer speed (throughput) of the image data storage part 1 included in the embodiment shown in FIG. 28.

In either of the above-mentioned image data rotational processing devices, the buffer memory 3 or 13 is structured such that it includes a memory capacity corresponding to one screen of the image data. However, when the buffer memory includes only such memory capacity corresponding to one screen, unless the read-out of the image data from the buffer memory is completed, the image data corresponding to the next one screen cannot be written and thus the throughput of the image data storage part cannot be utilized as it is, so that the transfer efficiency of the device is cut in half. This raises a problem especially when the image data must be read out continuously.

That is, in the embodiment shown in FIG. 28 or in FIG. 31, when the number of screens is two or more and the image data are read out from the image data storage part and are then transferred to the host device, there is employed such a timing as shown in FIGS. 34A and 34B. In the arrangement of the device to which the timing in FIGS. 34A and 34B is applied, the sustained transfer speed of the image data storage part is assumed to be the same as in the arrangement shown in FIG. 31.

In this case, the buffer memory, as shown in FIGS. 34A and 34B, is processed in such a manner that it is time-shared into a data transfer phase in which image data are transferred from the subordinate input-output control part to the buffer memory (FIG. 34A) and a data transfer phase in which image data are transferred from the buffer memory to the host input-output control part (FIG. 34B). Here, assuming that the transfer time from the subordinate input-output control part to the buffer memory is equal to the transfer time from the buffer memory to the host input-output control part and the time is expressed as T, if the image data to be transferred are present in an amount corresponding to an X number of screens (X is an integral number equal to 2 or more), and also if the initial access times of a command overhead and a disc device are neglected, then a time W necessary to complete the data transfer from the image data storage part to the host device can be expressed by the following general equation:

$$W = 2 \, XT \qquad (1)$$

As a method for solving the above problem, conventionally, there is known a method in which a buffer memory is arranged so as to have banks of two image data screens, a bank of one screen is used for writing while the other bank of one screen is used for reading, and they are changed alternately over to each other. This method is generally referred to as a bank switching method.

In FIG. 35, there is shown an image data rotational processing device which rotates the image data stored therein by 90 deg. and then outputs the 90-deg. rotated imaged data to a host device, using the bank switching method.

The present image data rotational processing device basically has a similar structure to those respectively described before with reference to FIGS. 28 and 31: that is, it includes an image data storage part 21 with a disc device 21a, a subordinate input-output control part 22, a buffer memory 23, a host input-output control part 24, a host device 25, and an image printing device 26. However, the processing device shown in FIG. 35 is different from the before-mentioned two processing devices in that the buffer memory 23 is divided into two memory banks, that is, two buffer memories 23A and 23B.

In the present structure, the buffer memories 23A and 23B respectively have an image memory capacity corresponding to one screen of image data and, when one buffer memory is used for image data storage, the other is used to take out the image data. In this case, when image data corresponding to two or more screens are transferred from the image data storage part 21 to the host device 25, there is employed such a timing as shown in FIGS. 36A and 36B.

That is, similarly to the timing chart shown in FIGS. 34A and 34B, the image data respectively corresponding to one screen that are stored in the buffer memory 23A or 23B at a timing shown in FIG. 36A are taken out at processing timings which respectively correspond to their respective following one screen image data in the obliquely lower right shown in FIG. 36B. However, since each take-out timing overlaps the storage processing timing for the next image data, the whole transfer time is shortened. In FIG. 36B, English capital letters A or B respectively shown within their associated blocks respectively represent the buffer memories 23A and 23B to be used and they respectively correspond to the suffixes of the buffer memories.

In the present processing device, similarly to the device shown in FIG. 34, if it is assumed that the data transfer time from the subordinate device to the buffer memory is equal to the data transfer time from the buffer memory to the host device, the data transfer time is expressed as T, and the initial access times of a command overhead and a disc device are neglected, then the time W necessary to complete the transfer of the image data to the host device can be obtained according to the following general equation:

$$W=(X+1)T \quad (2)$$

As can be understood from the above description, the structure of the processing device shown in FIG. 35 employs a technique to improve the low data transfer speed (throughput) due to the restrictions of the buffer memory.

In the above-mentioned conventional image data rotational processing devices, description has been given hereinabove of a case in which they respectively have, as a buffer memory, a capacity corresponding to one or two screens of image data in order to obtain the images that are rotated by 90 deg.

However, if the density and gradation of an image are both increased and the image is colored, then the image data per screen is increased in size and thus a buffer memory capacity required is also increased. This provides a great factor that causes the cost of the device to rise. For example, when 400 dots/inch, 256 gradations (8 bits), a single color, and an image size=12 in.×8.5 in., then image data corresponding to one screen is (400×12)×(400×8.5)×8÷8=16,320,000 bytes. That is, for one screen, the image data size becomes approx. 16 M bytes and thus, for two screens, the image data size becomes approx. 32 M bytes.

Therefore, it is important to reduce the capacity of the buffer memory. However, not only when obtaining the standard image (unrotated image) but also when obtaining an image that is rotated by 90 deg., it is desired to be able to reduce the capacity of the buffer memory without lowering the image data transfer throughput.

As a technique to be able to reduce the capacity of the buffer memory without lowering the image data transfer throughput even when a 90-deg. rotated image is obtained, there is available a method in which, when two-dimensional image data are stored into the image data storage part, a two-dimensional image IM is divided in the vertical and transverse directions thereof into a plurality of small divisional areas, and the small divisional areas are stored dispersedly in a plurality of disc devices.

In this case, as means for dispersing and storing the two dimensional image, there are known a memory control technique which is disclosed in Japanese Patent Unexamined Publication No. Sho. 63-40972 and a device for converting pattern data lengthwise and crosswise which is disclosed in Japanese Patent Unexamined Publication No. Sho. 63-95694.

Since both of the techniques disclosed in the above-mentioned publications aim at processing a memory element having a 1-bit structure, the object to be processed by them is different from the object to be processed by the before-mentioned technique in which the image data are processed using the small divisional areas as a unit. However, it seems that the disclosed way of thinking can also apply to the parallel driving disc device in which the image data are processed using the small divisional areas as a unit. In this case, whether the standard image or the 90-deg. rotated image is to be obtained, a plurality of disc devices send out the image data sequentially and thus it can be expected that the parallel drive disc device dispenses with an extra buffer memory.

Now, FIGS. 37, 41 and 45 respectively show methods for storing the image data into the image data storage part, which methods can be expected from the above-mentioned conventional techniques and are also different from one another. The three methods are similar to one another in that the divided image data are stored in four disc devices DA, DB, DC and DD which are driven in parallel to one another, but they are different from one another in how to divide the image data, how to distribute the image data, and how to arrange the image data. Here, it is assumed that an image longer in the horizontal direction is considered as a standard image (unrotated image). Also, a small divisional area consisting of a cluster of divided images is referred to as a tile.

In the storage method (1) shown in FIGS. 37A and 37B, at first, as shown in FIG. 37A, a two-dimensional image is divided horizontally into four equal divisional images and each of the quartered image is further divided vertically into 16 equal parts. And, one of the images obtained by dividing into the 16 equal parts is used as a minimum unit and is referred to as a tile. That is, a tile is equivalent to a part which is obtained by dividing a screen into 64 equal parts.

According to the present storage method, as shown in FIG. 37B, in the two-dimensional image, the tiles that are arranged at the same position in the horizontal direction, that is, 16 pieces of tiles which are arranged in the same row (in FIGS. 37A and 37B, parts respectively shown by the same patterns, that is, shown in white blocks, oblique lines, dots and the like) are stored in the same single disc device respectively, and 16 pieces of tiles which are arranged in different rows are stored in different disc devices respectively. That is, 16 tiles arranged in each of the rows shown in FIG. 37A are respectively stored in each of the disc devices consisting of the four disc devices DA, DB, DC and DD.

In this case, the tiles are stored sequentially from the upper side of the image into each of the disc devices.

Numerals shown within the respective tiles in FIGS. 37A and 37B represent the respective storage positions of the tiles within one disc device. The meaning of the numerals within the tiles is the same also in the figures to be described below. The kinds of the patterns such as the white blocks, oblique lines, dots and the like correspond to the individual disc devices. The patterns of the tiles are also similar in the respective figures to be described below.

Next, in the storage method (2) of FIGS. 41A and 41B, as shown in FIG. 41A, a two-dimensional image is divided into four equal parts respectively in the horizontal and vertical directions thereof, that is, the two-dimensional image is actually divided into 16 equal parts. Each of the 16 divisional images (in FIG. 41A, the portions that are given the same patterns such as white blocks, oblique lines, dots and the like) is further divided in the vertical direction thereof into four equal parts, and the minimum division unit is referred to as a tile. Therefore, similarly to the method shown in FIGS. 37A and 37B, one tile is equivalent to one of the 64 equally divided parts of one screen.

In the present method, in FIG. 41A, a storage disc device is allotted to each of the same pattern portions which consist of the 16 divisional images of the original two-dimensional image, and in the 16 divisional images, images that are shifted in the same direction (in the lower right direction) in position one in each of the vertical and horizontal directions are allotted to the same disc device. The respective tiles are arranged and stored sequentially from the upper side of the image. Here, there is assumed a two-dimensional space (a closed two-dimensional space) in which, in the horizontal direction, the left end tile is connected to the right end tile, and in the vertical direction, the top end tile is connected to the bottom end tile. A two-dimensional image to be processed is positioned in this space. For example, if the tiles that are shifted one in each of the vertical and horizontal directions are traced in the lower right direction from the top, then, in the two-dimensional image, the next tile to a certain bottom end tile becomes a top end tile which is displaced one in the right direction.

Next, in the storage method (3) shown in FIGS. 45A and 45B, similarly to the storage method (2) in FIGS. 41A and 41B, a two-dimensional image is largely quartered in the respective vertical and horizontal directions thereof into 16 equal parts, and each of the resultant 16 divisional images (in FIG. 45A, the portions that are given the same patterns such as white blocks, oblique lines, dots and the like) is further divided in the horizontal direction into four equal parts, and the minimum division unit is referred to as a tile. In this case as well, similarly to the storage methods respectively shown in FIGS. 37A, 37B, 41A and 41B, a tile is equivalent to one of the 64 divisional parts of one screen.

In the present storage method, similarly to the storage method (2) shown in FIGS. 41A and 41B, in FIG. 45A, a storage disc device is allotted to each of the same pattern portions which consist of the 16 divisional parts of the original two-dimensional image, and in the 16 divisional images, images displaced in the same direction (in the lower right direction) one in each of the vertical and horizontal directions are allotted to the same disc device. However, in the respective disc devices, the respective tiles are arranged and stored sequentially from the left side of the image.

Here, if the buffer memory of the image data rotational processing device, as in the embodiment shown in FIG. 35, is composed of two memory banks each having a capacity corresponding to one screen, when the parallel drive disc devices of the three storage methods respectively shown in FIGS. 37A, 37B, 42A, 42B, 45A and 45B are applied as the image data storage part, no performance difference is found between the above-mentioned three storage methods.

However, when an image to be obtained is only the standard image (the unrotated image), let us compare the above three storage methods with one another in the capacities of the buffer memories thereof that are sufficient and minimum to obtain the same transfer speed as a buffer memory having a capacity corresponding to two screens. In the storage methods shown in FIGS. 37A, 37B, 41A and 41B, since the tiles are stored in each of the disc devices sequentially from the upper side of the image, as shown in FIGS. 38 and 42 in which the accessing operations for reading out the images are illustrated, the minimum capacity of the buffer memory may be two times 4 tiles which are the number of tiles extending in the horizontal direction of the two-dimensional image, that is, 8 tiles.

That is, as shown in FIGS. 38 and 42, at first, the four tiles in the upper-most row of each of the two-dimensional images respectively shown in FIGS. 37A and 41A are read out from the four disc devices DA–DD, that is, one tile from each of the four disc devices, and the four tiles are then written into one of the two memory banks of the buffer memory. If this writing operation is completed, then an operation to read out the written data from the one memory bank is started and the read-out data are transferred through the host input-output control part to the host device.

At the same time, the other memory bank of the buffer memory is put into a writable state, and the four tiles in the second row from top are read out from the four disc devices DA–DD one from each of them and are then written into the other memory bank.

If the writing of the tiles into the other memory bank is completed, then, in the buffer memory, the writing and reading states of the two memory banks are reversed and, after then, the read-out and writing of the data are repeated similarly to the above operations. These operations are performed repetitively until the four tiles in the bottom row of each of FIGS. 37A and 41A are read out and written, with the result that the standard image is read out and transferred to the host device.

As can be seen from the foregoing description as well, to obtain a standard image in the storage methods respectively shown in FIGS. 37A, 37B, 41A and 41B, as the buffer memory, there may be provided two memory banks each having a capacity corresponding to four tiles and, as shown in the buffer memory bank switching timings in FIGS. 38 and 42 (In these figures, a point to which a mark O is applied is a switching point. In the following description, this also applies similarly to figures in which accessing operations are illustrated.), the two memory banks each having a 4-tile capacity may be used alternately in such a manner that they are switched over to each other every tiles corresponding to one line of a two-dimensional image.

However, in the storage method shown in FIGS. 45A and 45B, since the 16 divisional images of a two-dimensional image are further quartered in the horizontal direction, as shown in FIG. 46 in which there is illustrated the accessing operation to be performed when the images are read out, the capacity of the buffer memory must be two times the number of tiles in the horizontal direction of the two-dimensional image, 4 tiles×4=16 tiles, that is, as the buffer memory capacity, 32 tiles are necessary. In this case, two buffer memories each having a capacity corresponding to 16 tiles are used alternately in such a manner that they are switched over to each other every 1 line of tiles. Therefore, in the storage method shown in FIGS. 45A and 45B, to obtain a standard image, there is necessary a buffer memory capacity which is four times the buffer memory capacity in the storage methods respectively shown in FIGS. 37A, 37B, 41A and 41B.

In the above description, for fair comparison, the area of a tile is set for a fixed one. However, in the storage methods in FIGS. 37A, 37B, 41A and 41B, if the tile is decreased down to a smaller area, then the buffer memory capacity can be reduced by an amount corresponding to such decrease.

A transfer time necessary for transfer of the image data will next be described. Here, in FIGS. 38, 42 and 46, the data transfer operation passes downwardly from the top to the bottom in these figures in terms of time, while a width in the vertical direction represents a length of time.

In FIGS. 38, 42 and 46, it is assumed that tiles having ascendingly continuing numbers adjoin each other in terms of access and, when access is moved from a certain tile to its adjoining tile, no access time is necessary. Also, it is assumed that tiles having discontinuous numbers do not adjoin each other in terms of access and, in this case, when access is moved from a certain tile to a next tile, there is necessary an access time which is equal to T. Here, T is defined as a time which is necessary for a disc device to transfer image data corresponding to a tile.

Also, on the assumption that the performance of the device in transferring the image data from the buffer memory through the host input-output control part to the host device is five times that of one disc device, the time necessary to transfer the image data corresponding to four tiles from the buffer memory to the host device is assumed to be almost equal to T.

If the transfer times of the above-mentioned storage methods necessary to obtain the standard image are compared with one another in accordance with the above assumptions, then the following conclusion can be obtained.

That is, in the storage methods respectively shown in FIGS. 37A and 37B, 41A and 41B, and 45A and 45B, the transfer time is the same and the time necessary for completion of transfer of the image data corresponding to one screen is 17T according to the above-mentioned equation (2) (W=(X+1) T). This can be understood from FIGS. 38, 42 and 46 as well.

Next, in the respective storage methods in FIGS. 37A and 37B, 41A and 41B, and 45A and 45B, description will be given below of a case in which a 90-deg rotated image is obtained.

That is, in the respective storage methods of FIGS. 37A and 37B, 41A and 41B, and 45A and 45B, if the sufficient and minimum buffer memory capacities thereof to obtain almost the same transfer speed as in a method employing a buffer memory having a capacity equivalent to two screens are compared with one another, then there can be obtained such comparison results as shown in FIGS. 39, 43 and 47 which respectively show read-out access operations corresponding to the respective storage methods shown in FIGS. 37a and 37B, 41A and 41B, and 45A and 45B, that is, in this order, there are necessary a capacity equivalent to 128 tiles, a capacity equivalent to 32 tiles and a capacity equivalent to 8 tiles, which shows that the three storage methods are different from one another in the capacities thereof.

In other words, to obtain a 90-deg rotated image, there are necessary tiles arranged every vertical row. In particular, in the storage method (1) shown in FIGS. 37A and 37B, since 16 pieces of tiles which are arranged in one vertical row and are the same in position in the horizontal direction of the screen are stored in each of the disc devices, as shown in FIG. 39, when the four disc devices DA to DD are driven in parallel so as to obtain a 90-deg. rotated image, there is necessary a capacity equivalent to one screen as a buffer memory. For this reason, each of the two buffer memories must have a capacity equivalent to 64 tiles and thus the two buffer memories must have a total of 128 tiles.

On the other hand, in the storage method shown in FIGS. 41A and 41B, since image data necessary to read out a 90-deg. rotated images from the buffer memory are equally dispersed and stored in the four disc devices DA to DD with the 16 divisional images of a two-dimensional image as a unit, to obtain a 90-deg. rotated image in the storage method (2) of FIGS. 41A and 41B, as shown in FIG. 43, the capacity of the buffer memory may be two times 16 tiles which are equivalent to four disc devices each having four tiles corresponding to the 16 divisional images of a two-dimensional image, that is, 32 tiles.

Further, in the storage method shown in FIGS. 45A and 45B, in the four disc devices DA to DD, image data necessary to read out a 90-deg. rotated image from the buffer memory, that is, image data arranged in one vertical row are equally dispersed and stored with a tile as a unit. Therefore, to obtain a 90-deg. rotated image in the storage method of FIGS. 45A and 45B, as shown in FIG. 47, the capacity of the buffer memory may be two times 4 tiles which are equivalent to the four disc devices, that is, 8 tiles.

On the other hand, referring to the transfer speed, since the transfer time increases by T as a time for access to each of tiles having discontinuing numbers in ascending order, in FIGS. 39, 43 and 47, the transfer times necessary for completion of the data transfer are respectively 17T, 19T and 20T in this order.

To sum up the above-mentioned contents, on condition that the transfer speed (20T or less) must be maintained, the buffer memory capacity necessary for the image data transfer is as follows.

In the storage method (1) shown in FIGS. 37A and 37B, the memory buffer capacity may be equivalent to 8 tiles for a standard image, while it may be equivalent to 128 tiles for a 90-deg. rotated image.

In the storage method (2) shown in FIGS. 41A and 41B, the memory buffer capacity may be equivalent to 8 tiles for a standard image, while it may be equivalent to 32 tiles for a 90-deg. rotated image.

In the storage method (3) shown in FIGS. 45A and 45B, the memory buffer capacity may be equivalent to 32 tiles for a standard image, while it may be equivalent to 8 tiles for a 90-deg. rotated image.

Therefore, the necessary minimum capacity of the buffer memory to obtain both of the standard and 90-deg. rotated images is equivalent to 128 tiles in the storage method (1) shown in FIGS. 37A and 37B, 32 tiles in the storage method (2) in FIGS. 41A and 41B, and 32 tiles in the storage method (3) in FIGS. 45A and 45B. That is, either of the storage methods (2) or (3) shown in FIGS. 41A and 41B or 45A and 45B is preferable to the storage method (1) shown in FIGS. 37A and 37B.

Next, for reference, description will be given below of how the time necessary for completion of transfer of image data is effected when the buffer memory capacity is limited to a smaller level.

For example, in the storage method shown in FIGS. 37A and 37B, when obtaining a 90-deg. rotated image, it is assumed that the buffer memory capacity is nothing but 16 tiles. On this assumption, an influence on the image data transfer completion time will be described with reference to FIG. 40.

As described above, to obtain a 90-deg. rotated image, all of the pixels of an image situated at the same horizontal position (at the same transverse position) thereof must be arranged in the buffer memory. The 90-deg. rotated image can be taken out by reading out the tiles sequentially from the lower side of the image to the upper side thereof.

In this manner, in order to arrange the data on a row of tiles within the buffer memory, the data on 16 pieces of tiles must be read out. Here, in an example to be described below, if the disc device is accessed two times for the same image data, then an extra access time is necessary. Therefore, in order to avoid this, there is not employed such a structure that the capacity of the buffer memory is divided according to the number of disc devices and the divided memory portions are occupied by every individual disc devices, but there is employed a structure in which the buffer memory is used as a united body; and, there is not employed the two bank switching technique but there is employed the data transfer technique described before with reference to FIG. 34 in which the buffer memory is divided into the two phases, that is, the subordinate and host transfer phases. This is because the buffer memory does not have a capacity which exceeds 16 tiles.

In the above-mentioned structure, to obtain a 90-deg. rotated image, at first, data on the right-side 16 tiles are transferred from the disc device DA to the buffer memory. It takes a time equivalent to 16T to transfer the above right-side 16 tiles data. Next, the thus transferred data are then transferred to the host device. A time necessary to transfer the data from the buffer memory to the host device can be obtained as follows, on the assumption that the transfer speed thereof is five times the transfer speed of one disc device: that is, 16T÷5=3.2T=3T.

After then, if the disc device from which the above data are read out is changed and similar operations are repeated three times, then there can be obtained a 90-deg. rotated image. In this case, a time necessary to complete this transfer can be obtained in the following manner: that is, (16T+3T)×4=76T. This time is about 4.5 times the transfer time of a standard image, namely, approx. 17T.

Next, similarly, a case in which, in the storage method (2) shown in FIGS. 41A and 41B, when a 90-deg. rotated image is to be obtained, it is assumed that the buffer memory has a capacity equivalent to nothing but 16 tiles, will be described with reference to FIG. 44.

As described above, to arrange all pixels of an image situated at the same horizontal position of the image from the top to the bottom, the data on 16 tiles must be read. Similarly to the above-mentioned case, since there is necessary an extra time when a disc device is accessed twice for the same data, such access is avoided.

That is, in the storage method shown in FIGS. 41A and 41B, since the 16 divisional images of the original image are dispersed equally in the four disc devices in the vertical direction as well, there is employed a structure in which the capacity of the buffer memory is divided according to the number of disc devices and the divided memory parts are individually occupied by the respective disc devices. However, in the present storage method, similarly to FIG. 40, there is employed not the 2-bank switching technique but the data transfer technique which is divided into the subordinate and host transfer phases.

In this case, as shown in FIG. 44, at first, it takes a time of 4T to transfer the data on the left-side 16 tiles in parallel from the four disc devices to the buffer memory. Next, it takes a time of approx. 3T to transfer the data from the buffer memory to the host device. After then, by repeating these operations three times similarly, there can be obtained a 90-deg. rotated image. In this case, the time necessary for completion of the data transfer is (4T+3T)×4=28T. This time is approx. 1.6 times the transfer time necessary for a standard image, that is, approx. 17T.

In the storage method (3) shown in FIGS. 45A and 45B, although description will not be given with reference to its associated figure of an influence of a reduced buffer memory capacity on the transfer time, on the contrary to the storage method (2) shown in FIGS. 41A and 41B, there is produced an equivalent time delay (a time about 1.6 times the transfer time necessary when the buffer memory is 16 tiles) when a standard image is obtained.

To sum up the above description, if it is assumed that the buffer memory capacity is maintained at 16 tiles or less, that is, at ¼ screen or less, then time necessary for the image data transfer (exclusive of the initial access time of the command overhead and disc devices) can be obtained as follows:

That is, in the storage method (1) shown in FIGS. 37A and 37B, the image data transfer time is 17T for a standard image, while 76T for a 90-deg rotated image.

In the storage method (2) in FIGS. 41A and 41B, the transfer time is 17T for a standard image and 28T for a 90-deg. rotated image.

In the storage method (3) in FIGS. 45A and 45B, the transfer time is 28T for a standard image and 20T for a 90-deg. rotated image.

Besides the above-mentioned techniques, as a very simple technique which does not lower the throughput of an image data storage part but can reduce the capacity of a buffer memory even when a 90-deg. rotated image is obtained, there is available a method in which the number of disc devices to be driven in parallel is increased.

For example, as shown in FIG. 48, one screen is divided vertically into 8 equal parts as well as horizontally into 8 equal parts and, as shown in FIG. 49, image data are dispersed and stored in 8 disc devices having the same performance in such a manner that tiles having the same pattern in FIG. 48 are respectively stored in the same disc device. That is, the storage disc devices are allotted for every tile, and the tiles that are shifted in position by a distance equivalent to a tile in the vertical and horizontal directions are stored in the same single disc device.

When obtaining a standard image (a non-rotated image), if the buffer memory has a capacity equivalent to the 2 upper-side stages of tiles so that the banks thereof can be switched over to each other, then the image data can be transferred at such a timing as shown in FIG. 36, while the states of access at that time are as shown in FIG. 50. On the other hand, when obtaining a 90-deg. rotated image, similarly, the buffer memory may have a capacity equivalent to the 2 left-side rows of tiles, and the states of access are as shown in FIG. 51.

In other words, in the image data storage method using N (N is an integral number which is 2 or more) pieces of disc devices, when obtaining either of a standard image or a 90-deg. rotated image, if the buffer memory has a capacity equivalent to a 2/N screen, then the image data can be transferred at such a timing as shown in FIG. 36. That is, the necessary buffer memory capacity is in inverse proportion to the number N of disc devices to be driven in parallel. If the number of disc devices is four as in the storage methods (2) and (3) respectively shown in FIGS. 41A and 41B, and 45A and 45B, then the necessary buffer memory capacity may be equivalent to a ½ screen; if the number of disc devices is ten, then the capacity may be equivalent to a ⅕ screen; and, for 20 disc devices, the capacity may be equivalent to a ¹⁄₁₀ screen.

However, in the above-mentioned techniques employing the prior art, there are found the following drawbacks.

In the conventional simple bank switching technique, to obtain a 90-deg. rotated image, it has been necessary to use a buffer memory which has a capacity equivalent to 2 screens. Due to this, as described above, especially for an image which has a color multiple value and a high density, it is necessary to use a memory having a large capacity as a buffer memory. The large-capacity memory is expensive and thus leads to an economic disadvantage.

Also, in the parallel drive disc device technique using N (N is an integral number which is two or greater) pieces of disc devices, to obtain a standard image, the buffer memory capacity can be set equal to a 1/N screen or less but, however, in this technique, the time necessary to obtain a 90-deg. rotated image is inconveniently N times the time necessary to obtain the standard image. That is, the buffer memory capacity is nearly in inverse proportion to the required time and, therefore, both of them cannot be decreased at the same time.

Further, there is also available a method in which the number of disc devices to be driven in parallel is increased to thereby decrease both the buffer memory capacity and required time. However, in this method, the cost thereof is increased in proportion to the number of the disc devices used. That is, this method is disadvantageous in the economic aspect.

SUMMARY OF THE INVENTION

The present invention aims at eliminating the above-mentioned drawbacks found in the conventional image data storage methods. Accordingly, it is an object of the invention to make it possible to obtain both of standard image data and rotated image data with a smaller buffer memory capacity and in a shorter time.

That is, one of the objects of the invention is to further reduce the capacity of a buffer memory, which is necessary to obtain rotated image data that are rotated by, for example, 90 deg. from image data stored in N pieces of data storage means to be driven in parallel, without increasing the number of the image data storage means to be driven in parallel.

Also, the other object of the invention is to shorten the time, which is necessary to obtain rotated image data that are rotated by, for example, 90 deg. from the stored image data, without changing the number of the image data storage means to be driven in parallel. Especially, this object is to shorten the time necessary to process continuously image data corresponding to a plurality of screens.

In solving the above problems, according to the invention, there is provided an image data storing method in which, when storing image data on a two-dimensional image into N pieces of data storage means to be driven in parallel, the two-dimensional image is divided in the vertical and horizontal directions thereof into small divisional areas and the image data are stored into their respective data storage means with the small divisional areas as a unit, characterized in that the two-dimensional image is divided in such a manner that, in one of the vertical and horizontal directions thereof, the number of the small divisional areas is twice the number N of the data storage means to be driven in parallel and, in the other direction, the number of the small divisional areas is equal to or less than a number twice the number N of the data storage means; the small divisional areas to be stored in the respective data storage means are allotted in such a manner that, in the above-mentioned two-dimensional image, the number thereof is not more than two of a plurality of small divisional areas in the same line and is not more than two of a plurality of small divisional areas in the same row; and, in a closed two-dimensional space in which the right and left ends of the above two-dimensional image in the horizontal direction thereof are connected to each other and the top and bottom ends in the vertical direction thereof are connected to each other, the two small divisional areas in the above-mentioned same line to be stored in the respective data storage means are arranged so as to adjoin each other in terms of space and the two small divisional areas in the above-mentioned same row are arranged so as to adjoin each other in terms of space.

Also, according to the invention, there is provided an image data rotational processing device which comprises an image data storage part consisting of N pieces of data memory means to be driven in parallel, a buffer memory for storing temporarily therein image data read out from the image data storage part, and a control part for controlling the writing of the image data from the image data storage part to the buffer memory and the read-out of the image data from the buffer memory to thereby control not only a read-out mode in which data on a standard image facing in the same direction of the image stored in the image data storage part are read out from the buffer memory but also a read-out mode in which a rotated image rotated in the unit of 90 degrees with respect to the standard image are read out from the buffer memory, characterized in that a two-dimensional image is divided in the vertical and horizontal directions thereof in such a manner that the number of the divided parts or small divisional areas in one of the vertical and horizontal directions is just equal to a number twice the number N of the data storage means while the number of the small divisional areas in the other direction is just equal to or less than a number twice than the number N of the data storage means, and image data on the two dimensional image are respectively stored in N pieces of data storage means of the image data storage part with the small divisional areas as a unit; the small divisional areas stored in the respective data storage means are allotted in such a manner that the number thereof is not more than two in the same line and not more than two in the same row in the above-mentioned two-dimensional image; and, in a closed two-dimensional space in which the right and left ends of the two-dimensional image in the horizontal direction thereof are connected to each other while the top and bottom ends thereof in the vertical direction are connected to each other, the two small divisional areas in the same line to be stored in the respective data storage means are arranged so as to adjoin each other in terms of space, and the two small divisional areas in the same row are arranged so as to adjoin each other in terms of space.

According to the above-mentioned image data storing method of the invention, the image data stored in each of N pieces of image data storage means are stored with the small divisional areas as a unit and, as shown in figures such as FIG. 5 to be described later, in the two-dimensional image, the two small divisional areas in each line stored in the respective image data storage means are arranged so as to adjoin each other in terms of space while the two small divisional areas in each row are arranged so as to adjoin each other in terms of space. Due to this, in the closed two-dimensional space in which the right and left ends of the above-mentioned two-dimensional image in the horizontal direction thereof are connected to each other and the top and bottom ends thereof in the vertical direction are connected to each other, the small divisional areas respectively stored in their respective image data storage means are continuously connected with one another in terms of space not only when they are viewed in the vertical direction from the upper side to the lower side of the above-mentioned two-dimensional image space but also when they are viewed in the horizontal direction from the left side to the right side or from the right side to the left side.

Therefore, the image data of the respective image data storage means are continuous with one another in terms of space not only when they are read out not only in the vertical direction but also in the horizontal direction with the small divisional areas as a unit, which makes it possible to maintain the continuity of access from the image data storage means. According to this, it is possible to shorten not only the time to obtain the standard image but also the time to obtain the 90-deg. rotated image.

Since each of the image data storage means is arranged to store the two small divisional areas in each line of the original two-dimensional image and in each row thereof, in a structure in which an exclusive buffer memory is allotted to each of the image data storage means in such a manner that banks can be switched over to each other, a capacity necessary as the buffer memory may be obtained according to an equation, that is, (a capacity equivalent to two small divisional areas)×(the number N of the image data storage means used), not only when obtaining the standard image but also when obtaining the 90-deg. rotated image.

Also, in the above-mentioned image data rotational processing device according to the invention, since the two-dimensional image data are stored in N pieces of image data storage means of the image data storage part according to the above-mentioned method, if, under the control of the control part, the small divisional areas in a line, for example, in the horizontal direction are read out in order from the image data storage part and are then transferred to the buffer memory and, after then, they are read out in the same order from the buffer memory, then the standard image can be obtained.

If, under the control of the control part, similarly to the case for the standard image, the small divisional areas in a line in the horizontal direction are read out in order from the image data storage part and are then transferred to the buffer memory and, after then, the small divisional areas in a row in the vertical direction are read out in order from the buffer memory, then the 90-deg. rotated image can be obtained.

As described above, each of N pieces of image data storage means is arranged to store the small divisional areas in each line and in each row of the original two-dimensional image and, for this reason, the capacity necessary for the buffer memory, as mentioned above, may be (a capacity equivalent to 2 small divisional areas)×(the number N of the image data storage means).

BRIEF DESCRIPTION OF THE DRAWINGS

FIGS. 4A and 4B are explanatory views of a data storage system employed in an embodiment of an image data storing method according to the invention;

FIGS. 7A and 7B are explanatory views of a data storage system to be compared with the present invention;

FIGS. 13A and 13B are explanatory views of a data storage system employed in a second modification of an image data storing method according to the invention;

FIG. 28 is a block diagram of a structure of a conventional image data rotational processing device;

FIGS. 29A and 29B are explanatory views of operations to write image data into a buffer memory and to read out image data from the buffer memory in the conventional image data rotational processing device shown in FIG. 28;

FIGS. 30A and 30B are explanatory views of a transfer time necessary for transfer of image data (which are equivalent to 1 screen) in the conventional device shown in FIG. 28;

FIG. 35 is a block diagram of still another structure of a conventional image data rotational processing device;

FIGS. 36A and 36B are explanatory views of a transfer time necessary for transfer of image data (which are equivalent to X screens) in the conventional device shown in FIG. 35;

FIGS. 37A and 37B are explanatory views of an example of an image data storage system to be expected;

FIGS. 41A and 41B are explanatory views of another example of an image data storage system to be expected;

Figures 45A, 45B:
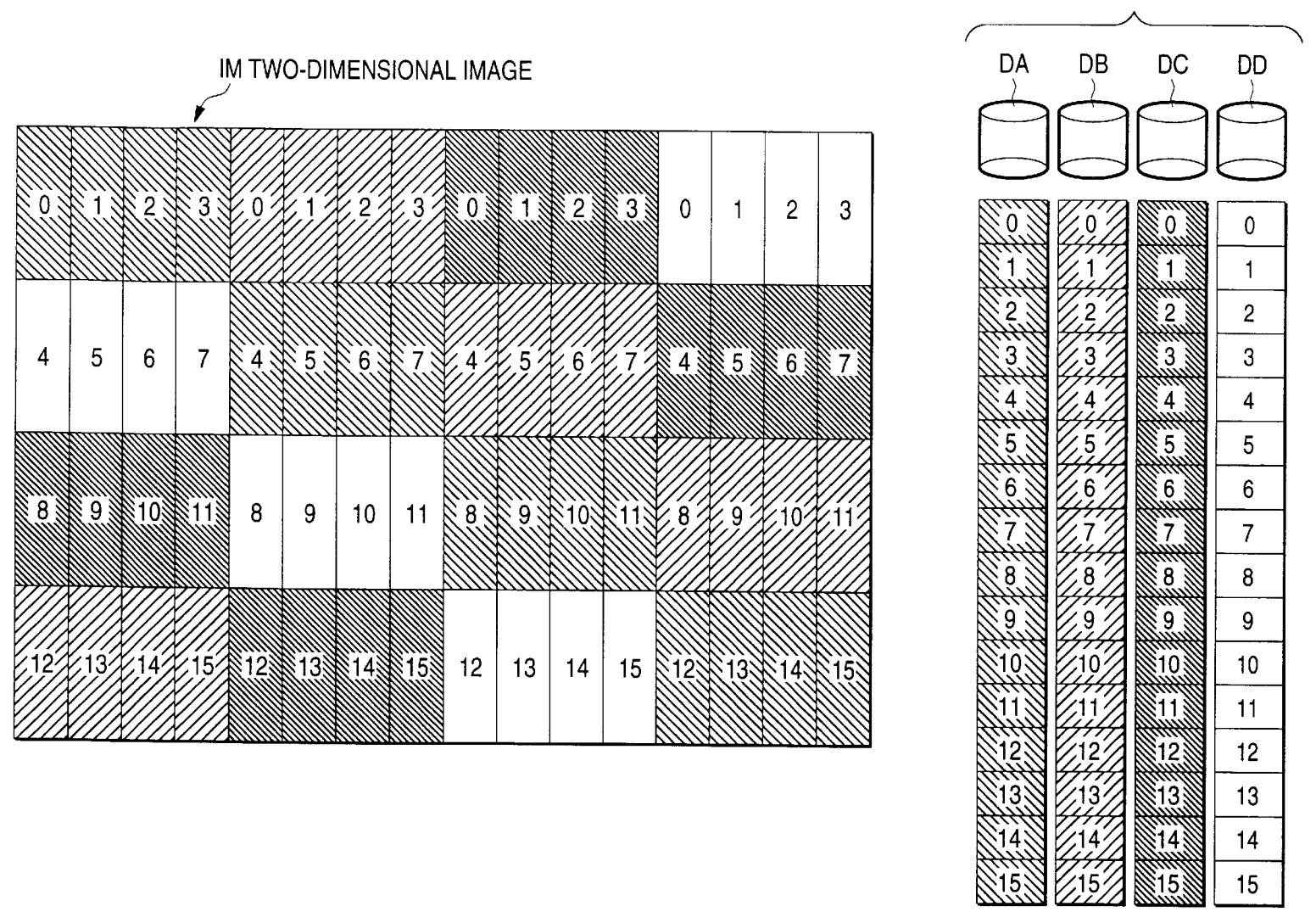

FIGS. 45A and 45B are explanatory views of still another example of an image data storage system to be expected;

DETAILED DESCRIPTION OF THE INVENTION

Preferred embodiments of the invention will be described with reference to the accompanying drawings.

Figure 1:
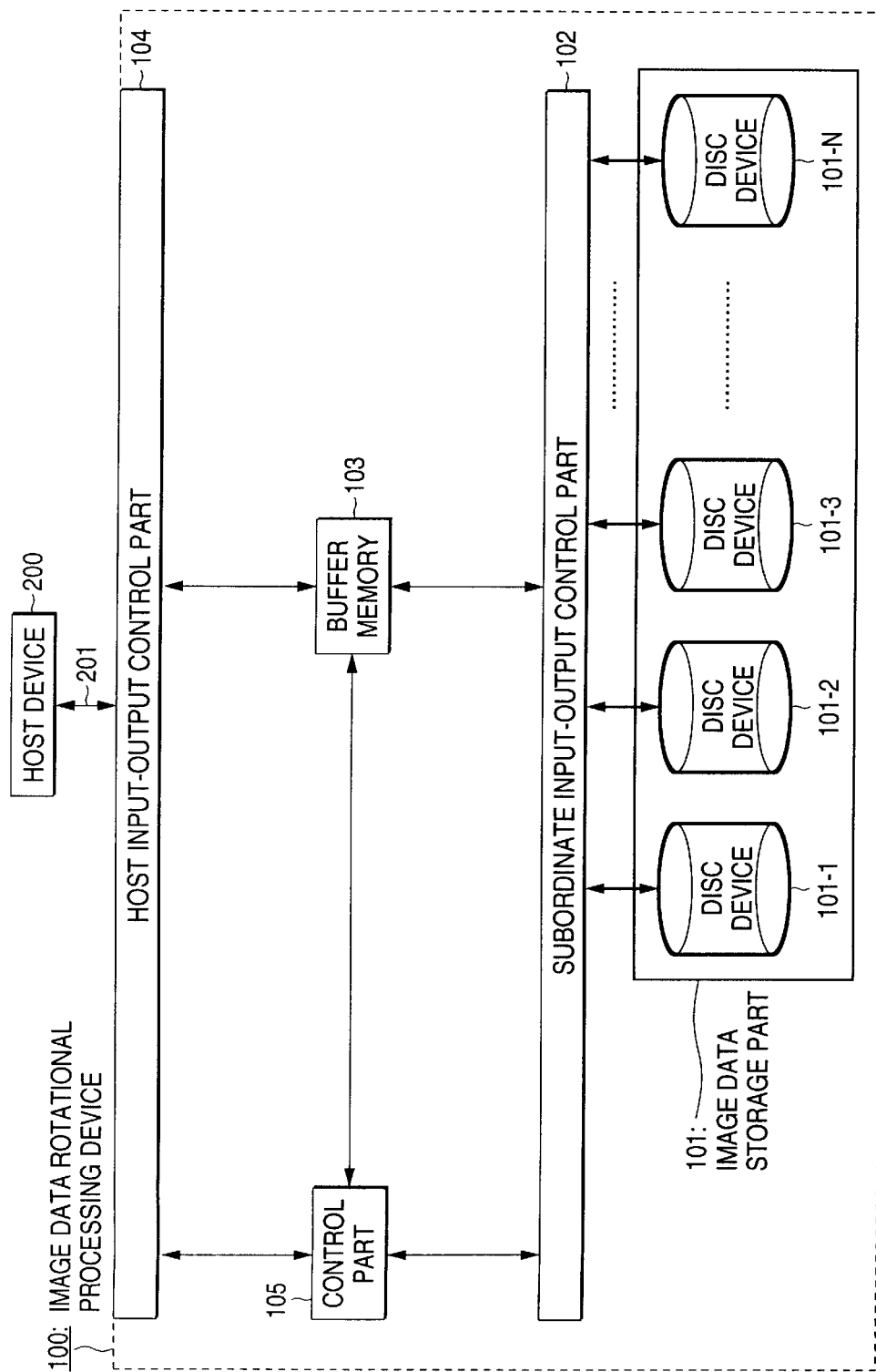
FIG. 1 is a block diagram of a basic structure of an embodiment of an image data rotational processing device according to the invention.

FIG. 1 shows a basic block diagram of an embodiment of an image data rotational processing device according to the invention. In the embodiment shown in FIG. 1, an image data rotational processing device 100 according to the present embodiment is connected to a host device 200, which consists of a host computer or the like, through a data line and a command line 201.

The image data rotational processing device 100 according to the present embodiment comprises an image data storage part 101 consisting of N pieces of data storage means 101-1 to 101-N to be driven in parallel, a host input-output control part 104 which outputs and inputs data to and from the host device 200 and transmits and receives a control command to and from the host device 200, a subordinate input-output control part 102 which outputs and inputs data to and from the image data storage part 102 and transmits and receives a control command to and from the image data storage part 102, a buffer memory 103 interposed between the host input-output control part 104 and the subordinate input-output control part 102 for storing image data temporarily, and a control part 105 for controlling the host input-output control part 104, subordinate input-output control part 102 and buffer memory 103.

A two-dimensional image is divided in the vertical and horizontal directions thereof in such a manner that the number of the divided parts thereof, that is, the number of the small divisional areas of the two-dimensional image in one of the vertical and horizontal directions thereof is equal to the number that is twice the number N of the data storage means and the number of the small divisional areas in the other direction is equal to or less than the number that is twice the number N of the data storage means. Image data on the two-dimensional image are respectively stored in each of the N pieces of data storage means 101-1 to 101-N of the image data storage part 101 with the small divisional areas as a unit.

The small divisional areas stored in each of the data storage means 101-1 to 101-N are, in the two-dimensional image, allotted in such a manner that they are not more than 2 in the same line and not more than 2 in the same row. At the same time, in a closed two-dimensional space in which the right and left ends of the two-dimensional image in the horizontal direction are connected to each other and the top and bottom ends thereof in the vertical direction are connected to each other, the two small divisional areas in the same line to be stored in the respective storage means are arranged so as to adjoin each other in terms of space and the two small divisional areas in the same row are arranged so as to adjoin each other in terms of space.

Figure 2:
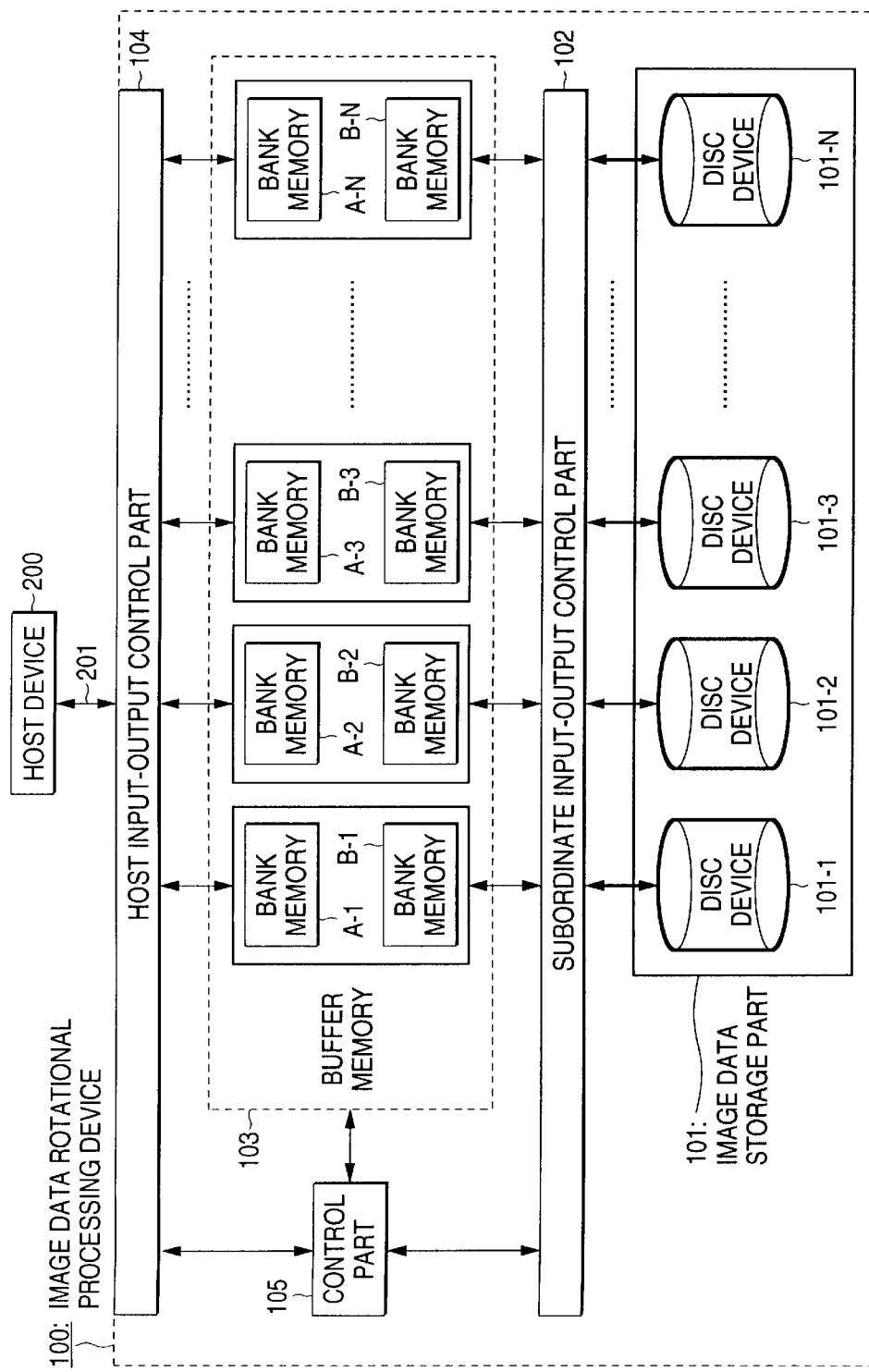
FIG. 2 is a more detailed block diagram of the basic structure of the embodiment of an image data rotational processing device according to the invention.

In the buffer memory 103, according to the present embodiment, as shown in FIG. 2, there are provided two, that is, A and B bank memories which are allotted exclusively to the respective data storage means 101-1 to 101-N. In particular, bank memories A-1 and B-1 are allotted exclusively to the data storage means 101-1, bank memories A-2 and B-2 are allotted exclusively to the data storage means 101-2, bank memories A-3 and B-3 are allotted exclusively to the data storage means 101-3, --- ---, and bank memories A-N and B-N are allotted exclusively to the data storage means 101-N. These two bank memories A and B are used alternately for reading and for writing. That is, a bank switching technique is employed.

Figure 3:
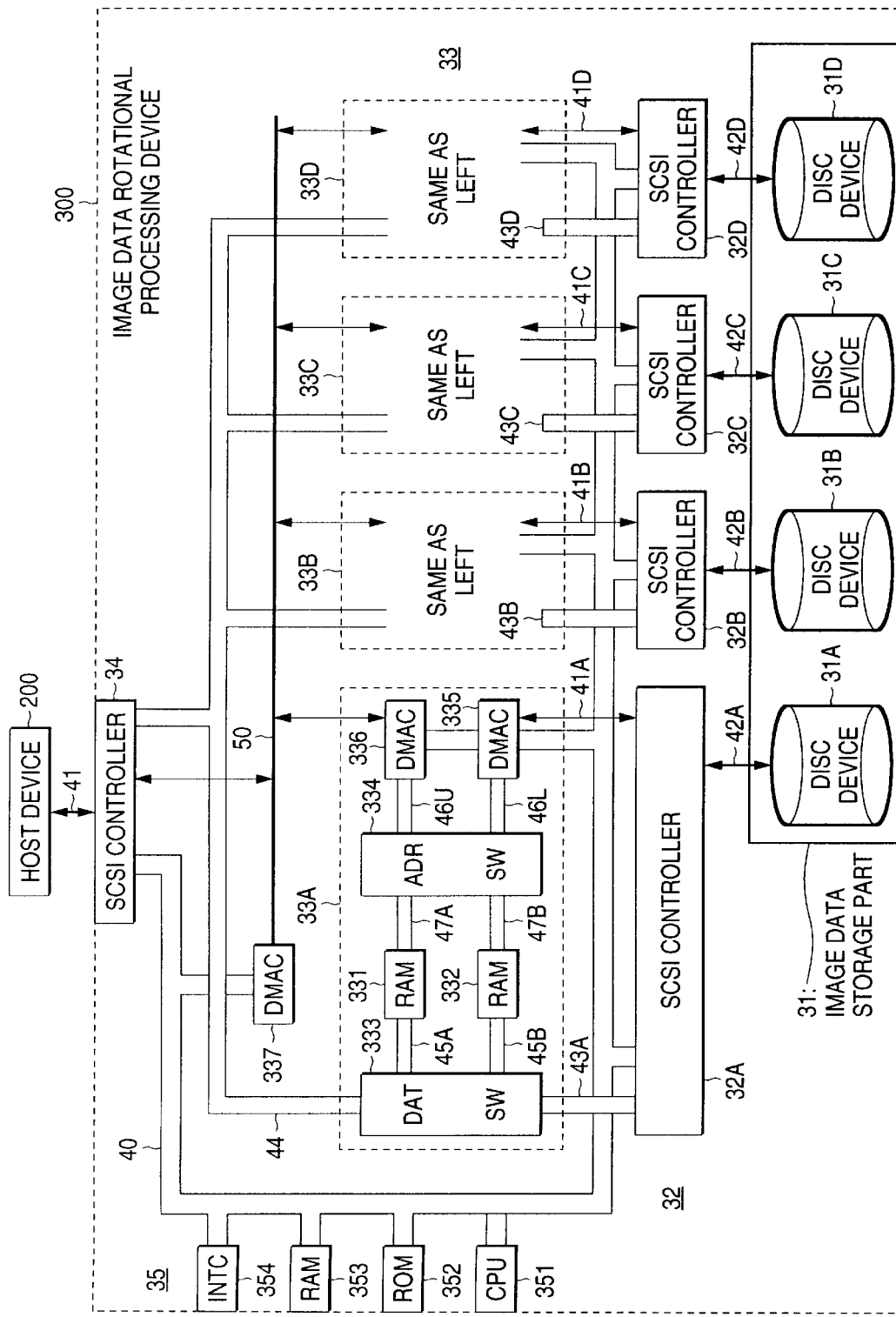
FIG. 3 is a block diagram of a concrete structure of the embodiment of an image data rotational processing device according to the invention.

In FIG. 3, there is shown a more detailed block diagram of the above embodiment of an image data rotational processing device according to the invention. In the present embodiment, similarly to the above-mentioned basic block diagrams shown in FIGS. 1 and 2, an image data rotational processing device 300 according to the present embodiment is connected to the host device 200. The present image data rotational processing device 300 is basically composed of an image data storage part 31, a subordinate input-output control part 32, a buffer memory part 33, a host input-output control part 34, and a control part 35.

As will be described later, the present invention is characterized by the storage state of the image data that are stored in the image data storage part 31. That is, the present invention is different from the prior art in how to divide two-dimensional image data equivalent to one screen, how to distribute them, and how to arrange them when the image data are divided and stored into the image data storage part 31.

In the image data rotational processing device 300 according to the present embodiment, the image data storage part 31 includes four magnetic disc devices 31A, 31B, 31C and 31D, and these four magnetic disc devices 31A to 31D are arranged so that they can be driven in parallel to one another.

The four magnetic disc devices 31A to 31D respectively include a so-called cylinder skew and a so-called track skew so that the times necessary to gain access to the next cylinder and the next track can be shortened. That is, the devices 31A to 31D are adjusted such that the data transfer performance thereof in continuous access can be enhanced.

In this case, as described before, a two-dimensional image is divided into small divisional areas, and the small divisional areas are allotted to and stored in the respective four disc devices 31A to 31D in such a manner that they can make full use of the above-mentioned high data transfer performance thereof in the continuous access.

Figures 4A, 4B:
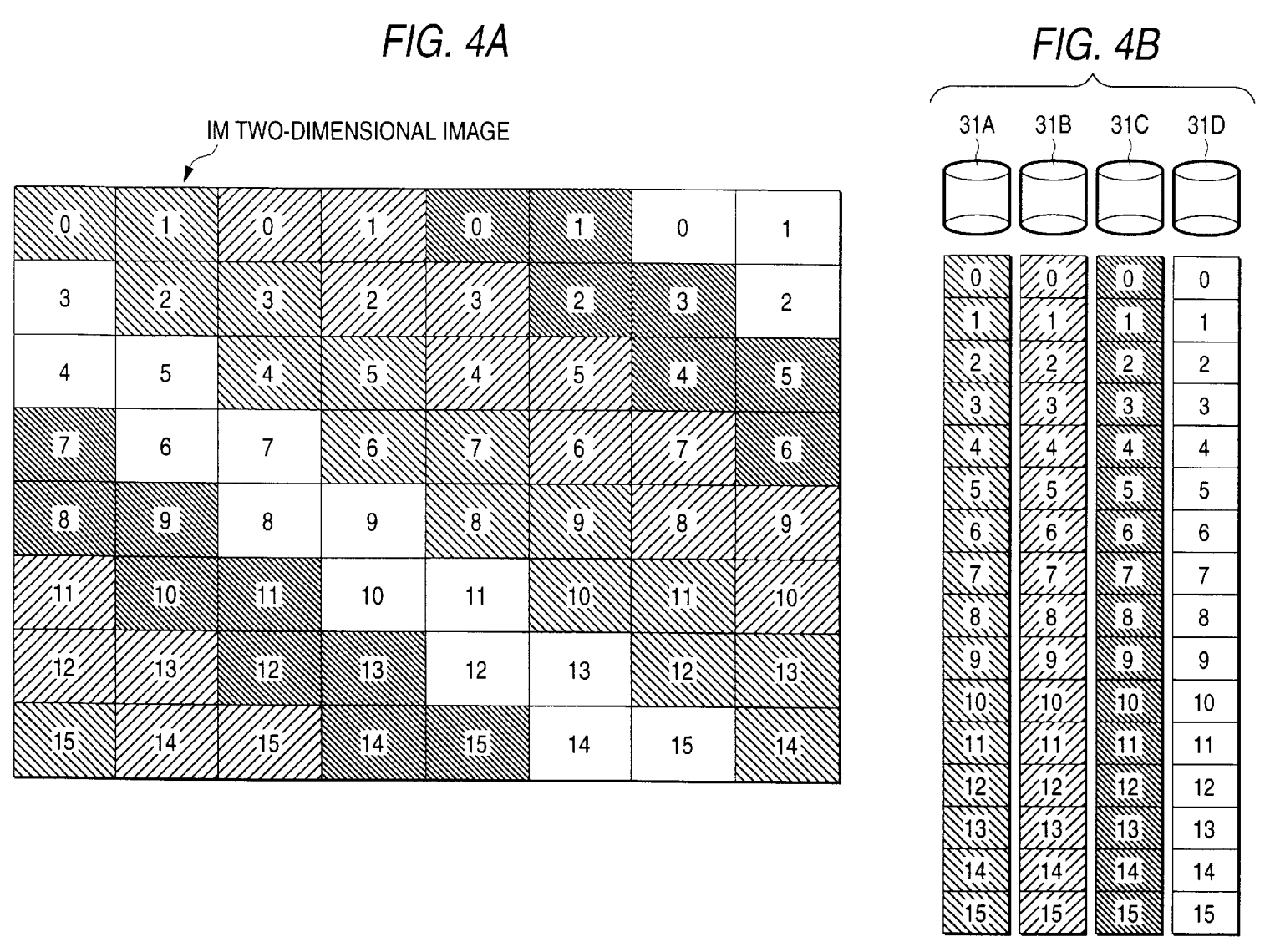

Now, FIGS. 4A and 4B show an embodiment in which the two-dimensional image IM is divided into small divisional areas and also the small divisional areas are allotted to a plurality of disc devices. In this embodiment, as shown in FIG. 4, the image data of the two-dimensional image IM are stored in such a manner that the image data corresponding to the small divisional areas that are given the same patterns such as a white block pattern, an oblique line pattern, a dot pattern and the like are respectively stored in the same magnetic disc device with the small divisional areas of the two-dimensional image IM as a storage unit.

In other words, at first, as shown in FIG. 4A, the two-dimensional image IM is divided in the horizontal direction into equal parts equivalent in number to a number twice the number of disc devices used, that is, 8 equal parts in this embodiment. Similarly, the two-dimensional image IM is divided in the vertical direction as well into 8 equal parts which are twice the number of the disc devices. As a result of this, one screen of the two-dimensional image IM is divided into 64 equal parts. In this embodiment as well, an image in a minimum unit consisting of one of the 64 equal divided parts or 64 small divisional areas of the two-dimensional image IM is referred to as a tile.

The 8 tiles in each line in the horizontal direction of the two-dimensional image IM are stored in a unit of two in each of the disc devices, and two tiles adjoining each other in terms of space are stored in one disc device. Also, in each row in the vertical direction as well, the 8 tiles are stored in a unit of two in each of the disc devices, and two tiles adjoining each other in terms of space are stored in one disc device. As a result, as shown in FIG. 4A, in the respective disc devices, there are respectively stored the tiles that continue with each other stepwise in the original two-dimensional image IM.

Here, the term "space" used in the phrase "--- adjoining each other in terms of space" is defined in the following manner. That is, let us assume a two-dimensional space (a closed two-dimensional space) in which, in the horizontal direction of the two-dimensional image IM, the left-end tile is connected to the right-end tile and, in the vertical direction thereof, the upper-end tile is connected to the lower-end tile. The respective tiles of the two-dimensional image IM to be processed are positioned in the above closed two-dimensional space. For example, when tracing the tiles from the top in the lower right direction that are shifted by one in each of the vertical and horizontal directions, a next tile to a certain lower-end tile of the two-dimensional image IM provides the upper-end tile that is shifted by one to the right. Here, numerals given within the respective tiles represent the storage positions of the respective tiles within one disc device.

The control part 35 comprises a CPU 351, a ROM 352 in which a program for control is stored, a RAM 353 which is mainly used as a work area, and an interrupt controller 354, while the control part 35 is connected to a CPU bus 40 which includes a data bus and an address bus.

The subordinate input-output control part 32 and the host input-output control part 34, in the present embodiment, are respectively interfaces by SCSI (Small Computer System Interfaces), and they are composed of SCSI controllers which respectively control the input and output of data between the buffer memory part 33 and image data storage part 31 as well as between the buffer memory part 33 and host device 200.

The SCSI controller forming the host input-output control part 34 is connected to the host device 200 by, for example, a 16-bit high speed SCSI bus 41.

The buffer memory part 33, in the present embodiment, are divided according to the respective magnetic disc devices 31A, 31B, 31C and 31D into buffer memory sections 33A, 33B, 33C and 33D which are respectively used exclusively for the respective magnetic disc devices. For this reason, the subordinate input-output control part 32 is also divided according to the magnetic disc devices 31A to 31D into four SCSI controllers 32A to 32D so that they can be used exclusively for the magnetic disc devices, respectively. That is, the four SCSI controllers 32A to 32D are respectively interposed between the respective magnetic disc devices 31A, 31B, 31C, 31D and the buffer memory sections 33A, 33B, 33C, 33D. The magnetic disc devices 31A–31D are respectively connected to the SCSI controllers 32A–32D, for example, by 8-bit high speed SCSI buses 42A, 42B, 42C and 42D.

The buffer memory sections 33A–33D respectively have the same structure and, therefore, in FIG. 3, as a typical example, there are shown the details of the buffer memory 33A. In this example, data read-out and writing with respect to the buffer memory sections 33A–33D are not controlled by the CPU 351 of the control part 35 but are carried out at high speeds by means of DMA (Direct Memory Access).

That is, in the present embodiment, each of the buffer memory sections 33A–33D includes two RAMs 331, 332 serving as bank memories, a data switch 333, an address switch 334, and DMA controllers 335, 336, 337. Each of the RAMs 331 and 332 has a capacity equivalent to two tiles shown in FIG. 4A. Therefore, the buffer memory section 33A has a memory capacity equivalent to four tiles and the buffer memory part 33, as a whole, has a memory capacity equivalent to a total of 16 tiles ($^{16}/_{64}=^{1}/_{4}$ screen) because it includes the four buffer memory sections 33A–33D.

The respective data switches 333 of the buffer memory sections 33A–33D are connected to the respective SCSI controllers 32A–32D of the subordinate input-output control part 32 by local data buses 43A–43D respectively. Also, the respective data switches 333 of the buffer memory sections 33A–33D are also connected to the SCSI controller serving as the host input-output control part 34 by a local data bus 44.

Also, the data switch 333 is connected to the RAM 331 by a local data bus 45A while it is also connected to the RAM 332 by a local data bus 45B. The data switch 333 is used to switch the local data buses 45A and 45B, which are respectively provided between itself and the RAMs 331 and 332, into connection to either the local data buses 43A–43D or the local data bus 44.

As described above, since the two RAMs 331 and 332 are controlled in such a manner that, when one of them is in the data writing state, the other is in the data read-out state, the data switch 333 supplies data to one of the two RAMs 331 and 332 that is in the writing state, obtains data from one of the RAMs 331 and 332 that is in the read-out state, and switches the RAMs so that data can be transferred to a host or subordinate device.

The address switch 334 supplies a writing address to the RAM in the writing state and a read-out address to the RAM in the read-out state, respectively. These writing and read-out addresses are given by DMA controllers 335 and 336, respectively.

The DMA controller 335 is used to transmit and receive data to and from the RAMs 331 and 332 through the subordinate input-output control part 32. The DMA controller 335 is connected to the CPU bus 40 and is also connected through a local address bus 46L to the address switch 334. Also, the DMA controller 335 is connected to the SCSI controller 32A through a control line 41A. Here, the respective DMA controllers 335 of the buffer memory sections 33B–33D are connected to the SCSI controllers 32B–32D by control lines 41B–41D, respectively.

The DMA controllers 336 and 337 are respectively used to transmit and receive data to and from the RAMs 331 and 332 through the host input-output control part 34. That is, in the present embodiment, DMA transfer to the host input-output control part 34 is carried out using two DMA controllers. However, the DMA controller 337 is arranged such that it has a single DMA controller common to the four buffer memories 33A–33D.

The DMA controller 336 is used to supply address data for DMA transfer to the RAMs 331 and 332 through an address switch 334, while the DMA controller 336 is connected to the CPU bus 40 and is also connected through a local address bus 46U to the address switch 334.

On the other hand, the DMA controller 337 is connected to the CPU bus 40 and is also connected to the respective DMA controllers 336 of the buffer memory sections 33A–33D by a control line 50. The DMA controller 337 is further connected to the SCSI controller 34 serving as a host input-output control part also by the control line 50.

The address switch 334 is connected to the RAMs 331 and 332 respectively through local address buses 47A and 47B. The address switch 334 switches local address buses 46L and 46U over to each other to connect one of them to either of the local address buses 47A and 47B, thereby controlling writing and read-out addresses with respect to the RAMs 331 and 332.

With use of the image data storing device 300 structured in the above-mentioned manner, it is possible to obtain a 90-deg. rotated image with a small buffer memory while maintaining the data transfer performance thereof. Now, description will be given below in detail of the operation of the image data storing device 300. In this operation, control in the buffer memory sections 33A–33D, as mentioned above, is carried out by the DMA controllers 335–337.

Figure 5:
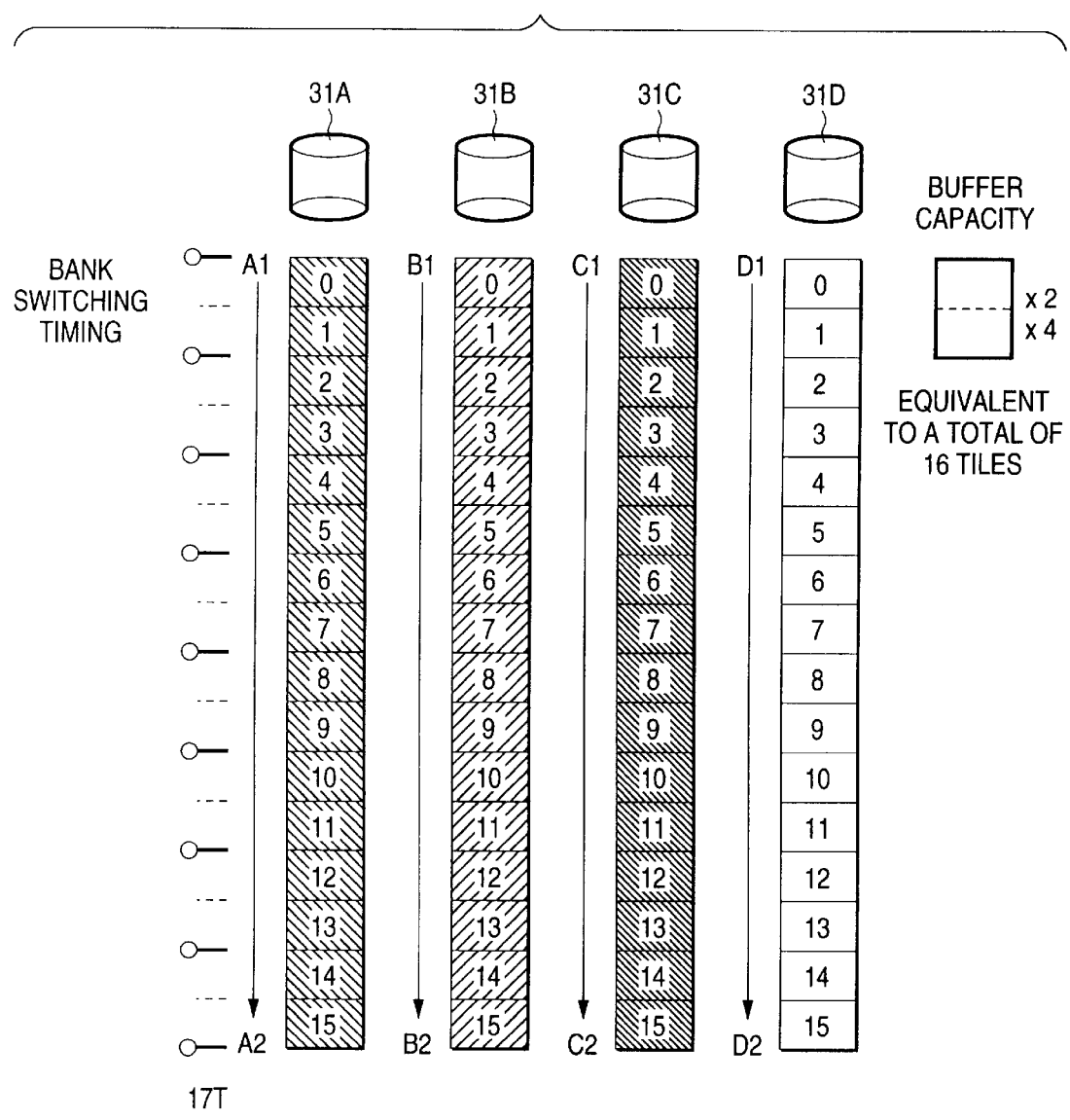
FIG. 5 is an explanatory view of an access technique employed when a standard image is obtained in the embodiment of an image data rotational processing device according to the invention, using the data storage system shown in FIGS. 4A and 4B.

That is, a case in which a standard image is obtained from the image data rotational processing device 300 shown in FIG. 3, in particular, how the disc devices 31A–31D are accessed when the image data of the device are read out therefrom, will be described with reference to FIG. 5. In FIG. 5, numerals given to the respective tiles represent the storage positions of the respective tiles when they are stored into the four magnetic disc devices 31A–31D shown in FIG. 4B.

That is, at first, 8 tiles in the top line of a two-dimensional image shown in FIG. 4A are read out respectively in a unit of two tiles from the four magnetic disc devices 31A–31D, and are then written into one of the respective RAMs 331 and 332 of the buffer memory sections 33A–33D, for example, into the RAM 331.

If this writing is completed, then in each of the buffer memory sections 33A–33D, the data switch 333 and the address switch 334 are switched over so that the RAM 331 is switched from the writing state over to the read-out state. The thus written data are read out, and then the thus read-out data are transferred through the host input-output control part 34 to the host device 200. Also, at the same time, the RAM 332 is switched over into the writing state, and 8 tiles on the second row from top are read out respectively in a unit of two tiles from the four magnetic disc devices 31A–31D and are then written into the present RAM 332.

On completion of the writing operation into the RAM 332, in each of the buffer memory sections 33A–33D, the data switch 333 and address switch 334 are switched to thereby switch the RAM 332 from the writing state over to the read-out state, so that the written data are read out and the read-out data are then transferred through the host input-output control part 34 to the host device 200. Also, at the same time, the RAM 331 is switched from the read-out state over to the writing state, so that 8 tiles in the third line from top are read out respectively in a unit of two tiles from the four magnetic disc devices 31A–31D and are then written into the present RAM 331.

After then, down to 8 tiles in the bottom line in FIG. 4A, a similar operation is performed repetitively, whereby a standard image can be read out and then the read-out standard image can be transferred to the host device 200. By means of the data on this standard image, there are performed necessary processing such as an operation to print the standard image on a sheet.

When the standard image is accessed for read-out, as shown in FIG. 5, since the tiles read out are all continuous in the storage position thereof with one another in each of the magnetic disc devices, if a time necessary to transfer a tile is expressed as T, one piece of standard image can be transferred in a time equivalent to 17T.

Next, a case in which the 90-deg. rotated image is accessed for read-out will be described with reference to FIG. 6. That is, in this case, as discussed in the description of the prior art as well, from the four magnetic disc devices 311A–311D, the tiles are read out in one row in an order starting from the left-most row of the two-dimensional image shown in FIG. 4. When the tiles are read out from the buffer memory sections 33A–33D, they are read out in one row in the order from the lower tile to the upper tile of the two-dimensional image IM and are then transferred to the host device 200, whereby the 90-deg. rotated image can be obtained.

Figure 6:
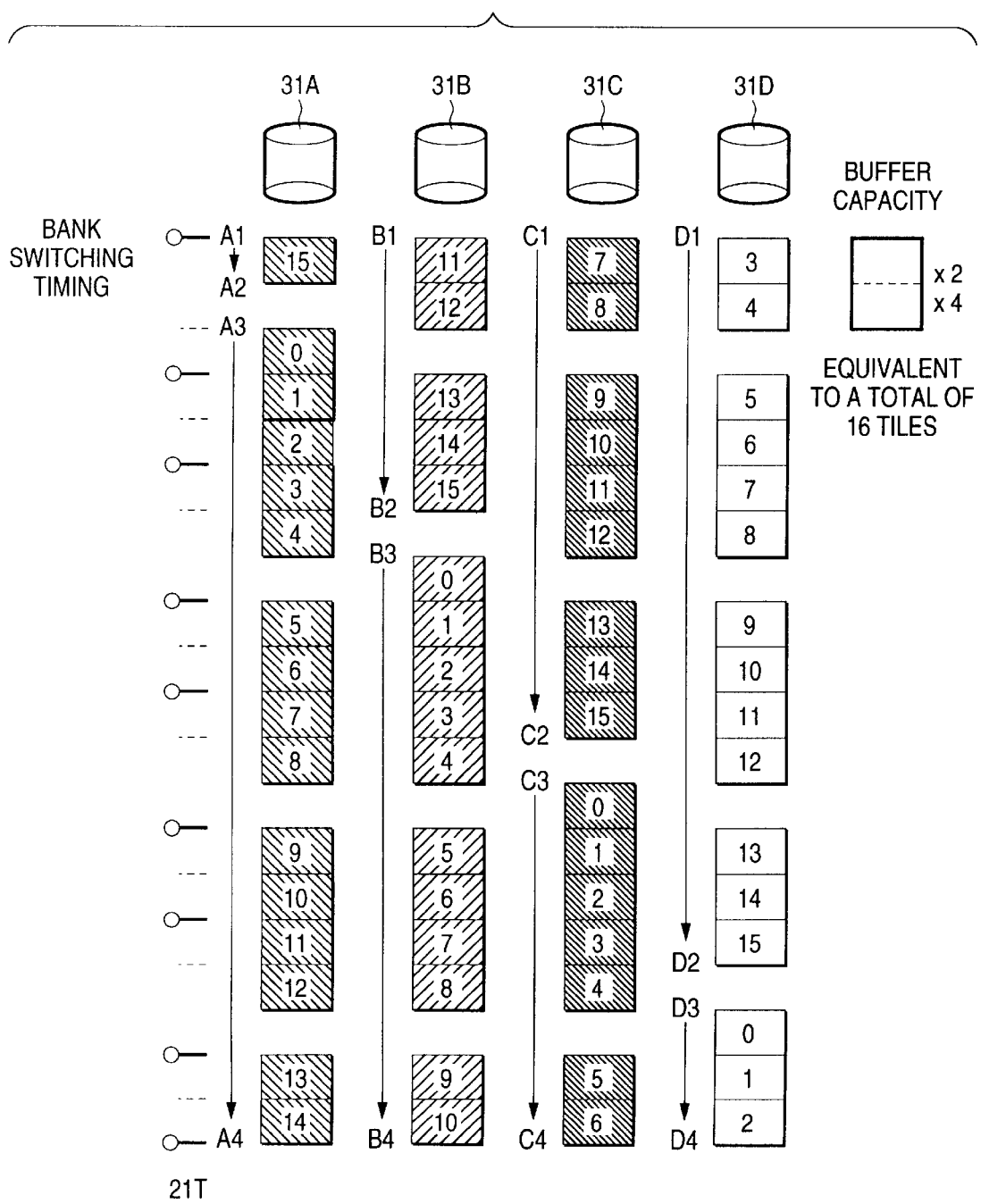
FIG. 6 is an explanatory view of an access technique employed when a 90-deg. rotated image is obtained in the embodiment of an image data rotational processing device according to the invention, using the data storage system shown in FIGS. 4A and 4B.

An access technique employed in the above case is shown in FIG. 6. In FIG. 6, numerals given to the respective tiles represent the storage positions of the respective tiles in the four magnetic disc devices 31A–31D shown in FIG. 4.

At first, as shown in FIG. 6, 8 tiles in the left-most row of the two-dimensional image shown in FIG. 4A are respectively read out in a unit of two tiles from the four magnetic disc devices 31A–31D, and are written into one of the respective RAMs 331 and 332 of the buffer memory sections 33A–33D, for example, the RAMs 331. In this case, the two tiles read out from the magnetic disc device 31A are the tiles that are respectively stored in the bottom and in the top and are discontinuous with each other in position. In view of this, in the present embodiment, as shown by a space in FIG. 6, it is assumed that a time 1T is necessary between them.

In this manner, if a time of 3T has passed and the writing of the tiles of the left-most row has been completed, then, in each of the buffer memory sections 33A–33D, the data switch 333 and address switch 334 are changed over to thereby switch the RAM 331 from the writing state into the read-out state, so that the written data are read out and the thus read-out data are transferred through the host input-output control part 34 to the host device 200. Also, at the same time, the RAM 332 is switched over to the writing state thereof, so that 8 tiles in the second row from left are respectively read out in a unit of two tiles from the four magnetic disc devices 31A–31D and are then written into the present RAM 332. The tiles of this row are all continuous with each other in the storage position thereof in the respective magnetic disc devices and thus the transfer time thereof provides 2T.

If the writing of the tiles into the RAM 332 is completed, then, in the respective buffer memory sections 33A–33D, the data switch 333 and address switch 334 are changed over to thereby switch the RAM 332 from the writing state to the read-out state, so that the written data are read out from the buffer memory part 33 in the above-mentioned manner and the thus read-out data are then transferred through the host input-output control part 34 to the host device 200. Also, at the same time, the RAM 331 is changed from the read-out state over to the writing state, so that 8 tiles in the third row from left are respectively read out in a unit of two tiles from the four magnetic disc devices 31A–31D and are then written into the present RAM 331.

In this case, the two tiles read out from the magnetic disc device 31B are the tiles that are respectively stored in the bottom and top positions and are not continuous with each other in position. Therefore, as shown by a space in FIG. 6, because a time of 1T is necessary for such discontinuous position, the transfer time thereof provides 3T.

After then, up to data on 8 tiles in the right-most row in FIG. 4A, these similar operations are performed repeatedly, so that the 90-deg. rotated image is read out and is then transferred to the host device 200. In this operation, as described above, in the rows arranged in the odd numbers when they are counted from the left of the two-dimensional image, the storage positions thereof are not continuous with each other, so that a time of 1T is necessary for each of such discontinuous positions. That is, when compared with the previously-mentioned standard image, the transfer time of the 90-deg. rotated image becomes longer by 4T and thus the total transfer time of the 90-deg. rotated image provides 21T.

In the above-mentioned manner, according to the present embodiment, the image data of the 90-deg. rotated image can be obtained with a smaller buffer memory capacity while the data transfer performance thereof is maintained. The details of the operation of the present embodiment are as follows:

For example, let us assume an embodiment: that is, in a printer in which, for a sheet 12 inches long and 8.5 inches wide, an image is formed with 400 pixels per inch in both length and width and with 8 bits per pixel, and a standard (longer in width: sheet is shorter in the advancing direction thereof) image is continuously printed at a speed of 1.4 sec. per sheet while a 90-deg. rotated (longer in length: sheet is longer in the advancing direction thereof) image is continuously printed at a speed of 1.8 sec. per sheet, the storage and take-out of the image data are carried out using four magnetic disc devices which are arranged so as to be driven in parallel.

Here, it is assumed that the respective magnetic disc devices 31A–31D have the following characteristics:

Sustained data transfer speed=4M bytes per sec., 256K byte data transfer time=70 msec., and, Maximum access time (inclusive of time to wait for rotation)=60 msec..

In this case, a buffer memory capacity equivalent to one screen of the image is (400 pixels/inch×12 inches)×(400 pixels/inch×8.5 inches)×1 byte×1 screen=approx. 16 M bytes.

For comparison with the present embodiment, let us assume another embodiment in which the original two-dimensional image is divided in the vertical and horizontal directions respectively into four equal parts, a 1/16 image of the original two-dimensional image is referred to as a tile, and, in a plurality of tiles obtained as the result of the division of the original two-dimensional image, the tiles that are arranged simply obliquely to one another are respectively allotted to and stored in four magnetic disc devices as shown in FIG. 7A. That is, as shown in FIG. 7B, one of four tiles in each line and one of four tiles in each row are allotted in such a manner that they are given the same pattern in FIG. 7B, and they are then stored into one of the four magnetic disc devices.

Figure 8:
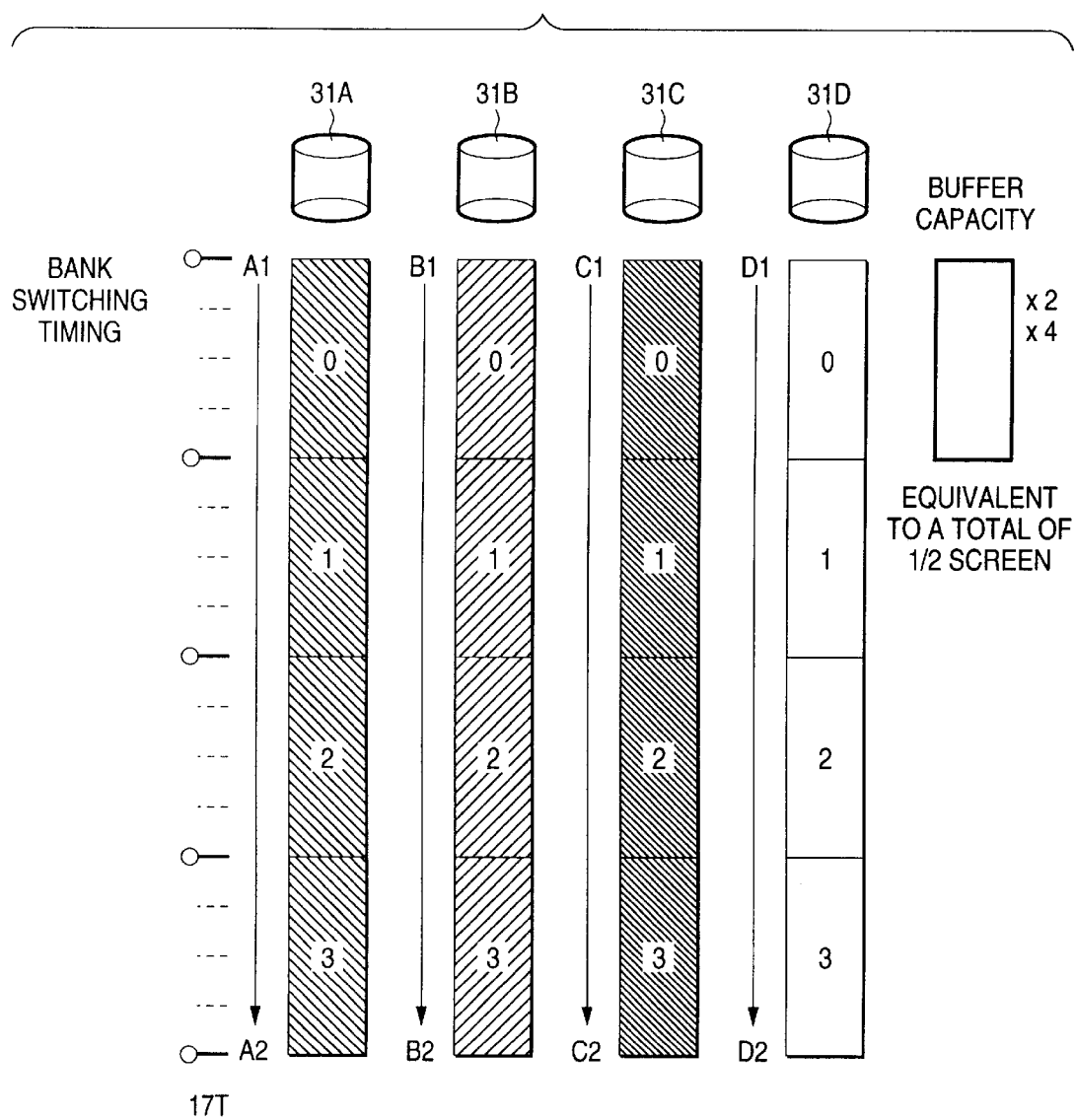
FIG. 8 is an explanatory view of an access technique employed when a standard image is obtained in the first embodiment of an image data rotational processing device according to the invention, using the data storage system shown in FIGS. 7a and 7B.
Figure 9:
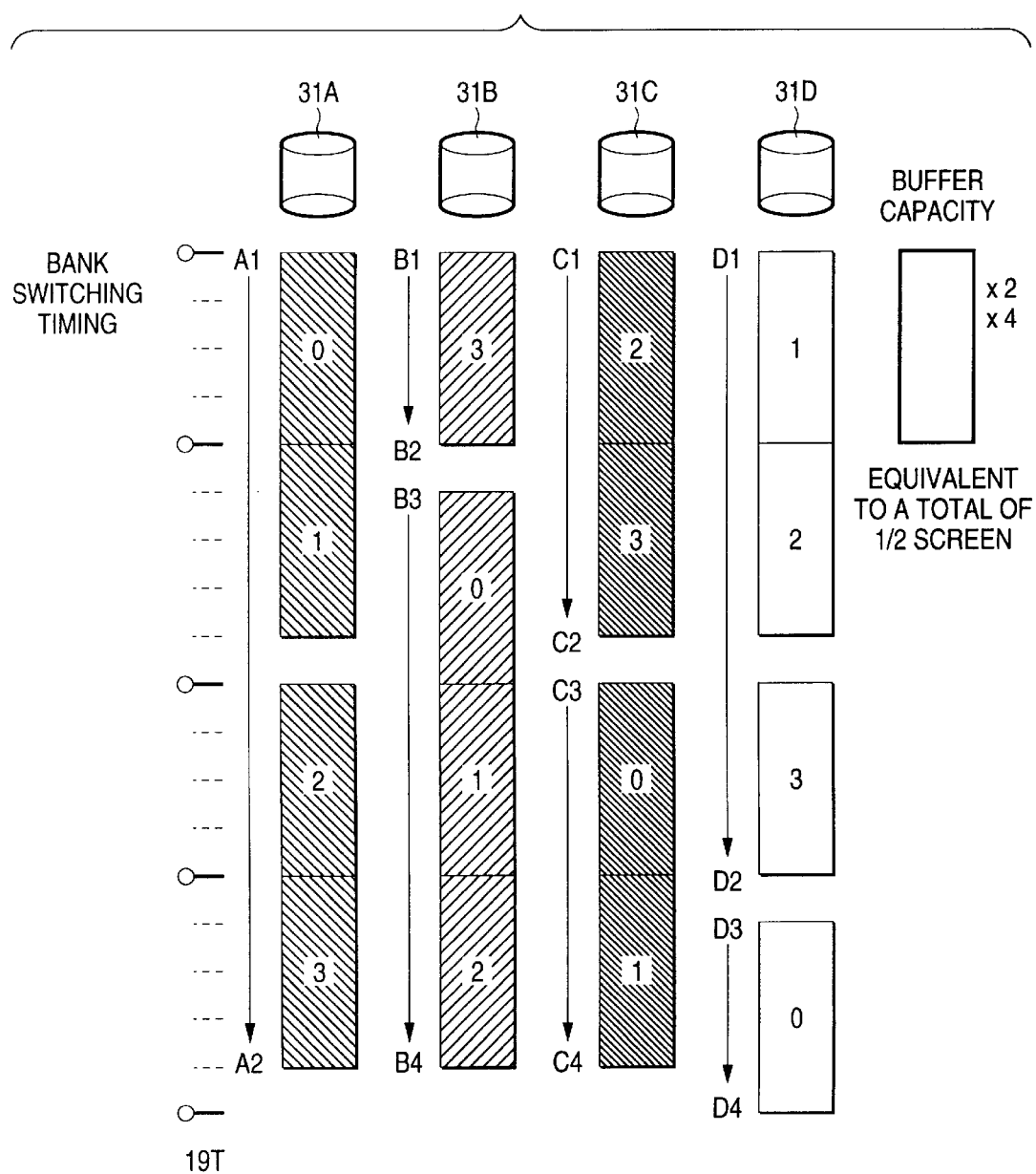
FIG. 9 is an explanatory view of an access technique employed when a 90-deg. rotated image is obtained in the first embodiment of an image data rotational processing device according to the invention, using the data storage system shown in FIGS. 7A and 7B.

In this comparison embodiment, an access time necessary to obtain a standard image is as shown in FIG. 8, that is, 17T equal to the above-mentioned embodiment, while an access time for a 90-deg. rotated image provides 19T as shown in FIG. 9. However, as the capacity of two buffer memories for switching of banks, there is necessary a capacity equivalent to tiles in 1 line and 1 row, that is, for the two buffer memory, as a whole, there is necessary a capacity equivalent to 8 tiles (which corresponds to a ½ screen).

In other words, in the comparison embodiment shown in FIGS. 7A and 7B in which the tiles are arranged simply obliquely in the four magnetic disc devices, the buffer memory capacity is (400 pixels/inch×12 inches)×(400 pixels/inch×8.5 inches)×1 byte×½ screen=approx. 8 M bytes.

On the other hand, as shown in FIGS. 4A and 4B which have already been discussed, in the embodiment of the invention in which the tiles are arranged stepwise in the four magnetic disc devices, the buffer memory capacity provides tiles equivalent to a ¼ screen and, in particular, it is (400 pixels/inch×12 inches)×(400 pixels/inch×8.5 inches)×1 byte×¼ screen=approx. 4 M bytes.

Accordingly, when compared with the embodiment shown in FIGS. 7A and 7B, in the embodiment of the invention, the buffer memory can be saved by tiles equivalent to a ¼ screen, that is, approx. 4 M bytes (=approx. 8 M bytes–approx. 4 M bytes).

Referring to the time necessary from the issue of a command to the completion of data transfer in the above-mentioned embodiment of the invention, when the command overhead=100 m sec., and the initial data access time of the magnetic disc device=60 m sec., for the standard (longer in width) image, the data transfer time becomes 70 m sec.×17 =1190 m sec. and, therefore, the time of occupation for transfer of data equivalent to 1 screen provides 100+60+1190=1350 m sec., which satisfies the specified time of 1.4 sec..

Also, for the 90 deg. rotated (longer in length) image, since the data transfer time=70 m sec.×21=1470 m sec., the time of occupation for transfer of data equivalent to 1 screen provides 100+60+1470=1630 m sec., which satisfies the specified time of 1.8 sec..

As described above, with use of the above-mentioned embodiment according to the invention, in obtaining the 90-deg. rotated image data, without increasing the number of disc devices to be driven in parallel, the expected performance on the transfer time can be satisfied as well as the capacity of a buffer memory required can be reduced, which can provide a large effect in the reduction of the costs of devices used.

In the above-mentioned embodiment, when the number of disc devices to be driven in parallel is set for N, a two-dimensional image IM to be processed is divided into 2N parts in both of the vertical and horizontal directions thereof and the resultant stepwise tiles are sequentially stored in their respective disc devices. However, as a method for storing the image data into the data storage part, there are also possible various modifications which will be described below.

[Modification 1]

Even in a case in which the two-dimensional image IM to be processed is not divided in either of the vertical or horizontal direction thereof into 2N parts but is divided in the vertical and/or horizontal direction thereof into parts in an arbitrary number equal to or less than 2N, there can be obtained a similar effect to the above-mentioned embodiment.

Figure 10B:
FIGS. 10A and 10B are explanatory views of a data storage system employed in a first modification of an image data storing method according to the invention.
Figure 10A:

For example, FIGS. 10A and 10B show a modification in which the number N of disc devices to be driven in parallel is set for 5, a two-dimensional image is divided into 10 parts (=2N) in the vertical direction thereof and into 7 parts (<2N) in the horizontal direction thereof, and tiles given the same pattern and arranged stepwise are respectively stored in one disc device. Although the structure of the image data rotational processing device is basically similar to that shown in FIGS. 1–3, as the disc devices to be driven in parallel, there are used five disc devices 31A–31E and, as the buffer memory part 33, there are prepared five pairs of RAMs (bank memories) in correspondence to the number of the disc devices. In the present modification as well, the capacity of each of the RAMs is set to be equivalent to 2 tiles and thus the total capacity of the buffer memory part 33 is equivalent to 20 tiles.

Figure 11:
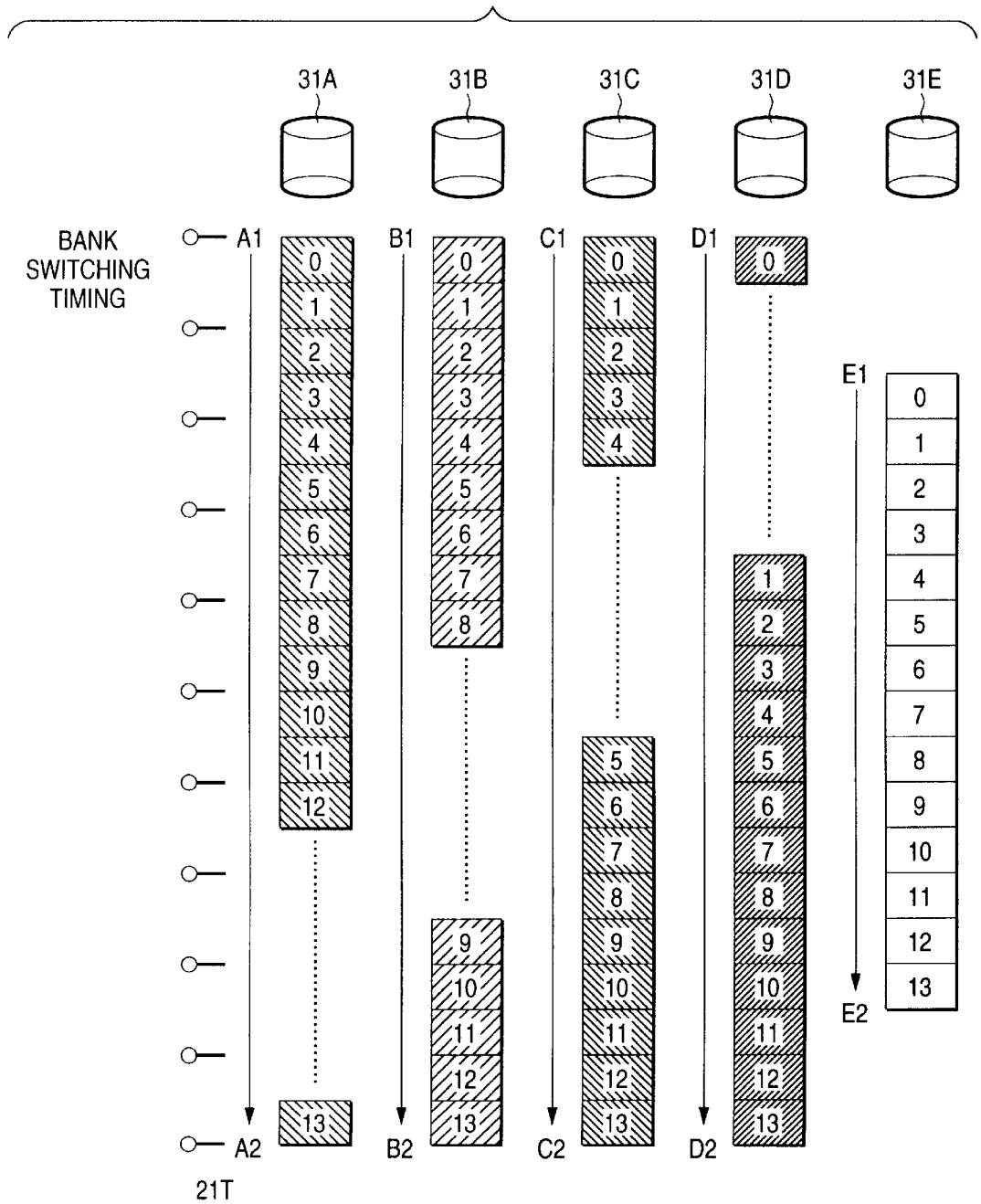
FIG. 11 is an explanatory view of an access technique used when a standard image is obtained in the embodiment of an image data storing device according to the invention, using the data storage system shown in FIGS. 10A and 10B.

In the present modification, the data transfer time, for the standard image (the image longer in the vertical direction), is as shown in FIG. 11 in which an access technique for accessing the data on the standard image is illustrated. That is, for such places in which, when the tiles are read out from their respective disc devices, the storage positions of the tiles are not continuous with one another in the disc device, there is left a transfer time equivalent to 6 tiles. As a result of this, the transfer time for the standard image provides approx. 21T.

Figure 12:
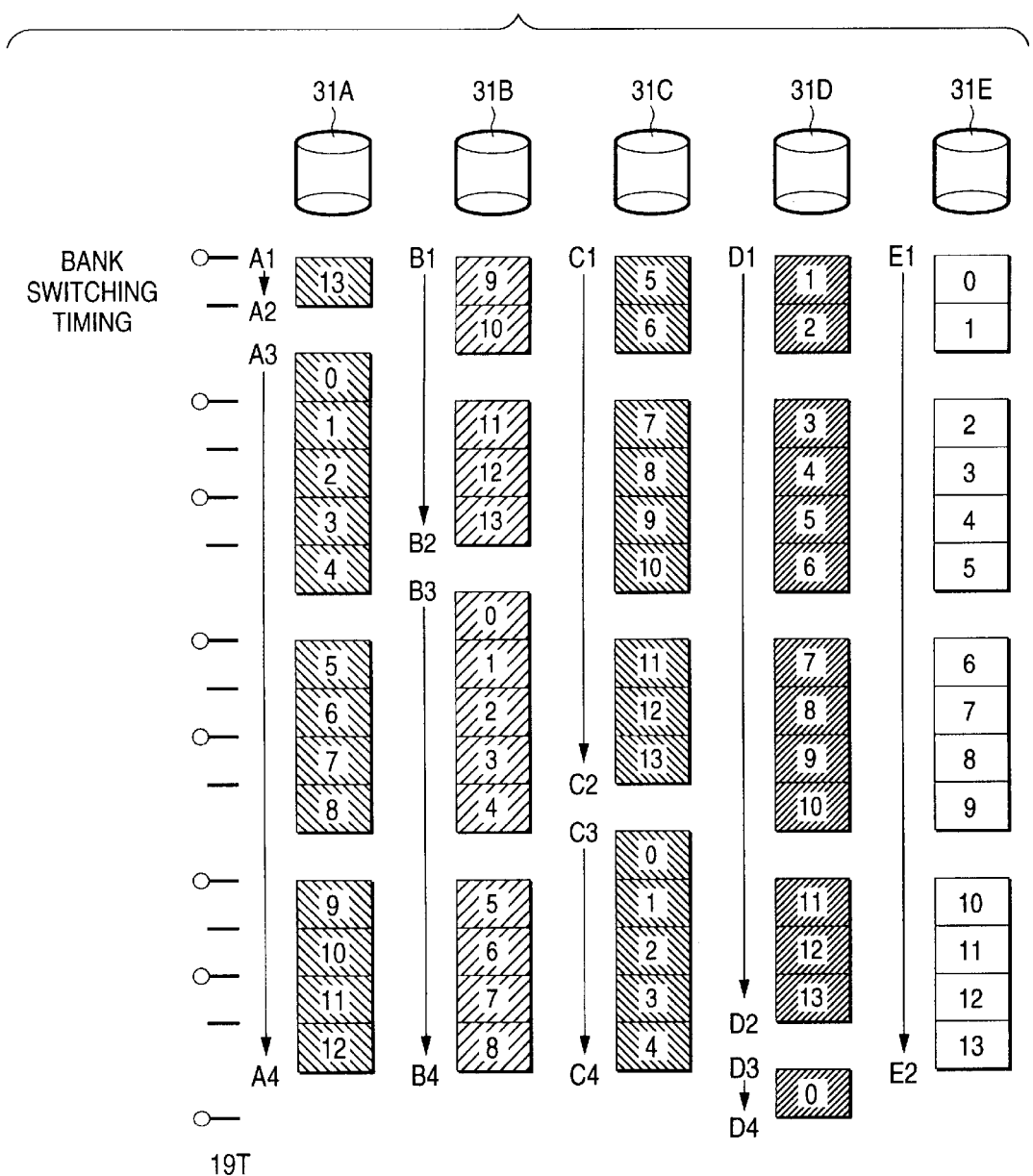
FIG. 12 is an explanatory view of an access technique used when a 90-deg. rotated image is obtained in the embodiment of an image data storing device according to the invention, using the data storage system shown in FIGS. 10A and 10B.

Also, for the 90-deg. rotated image (the image longer in the horizontal direction), as shown in FIG. 12 in which an access technique for accessing the data on the 90-deg. rotated image is illustrated, in such places where, when the tiles are read out from their respective disc devices, the storage positions of the tiles are not continuous with one another in the disc device, there is necessary a transfer time equivalent to 1 tile, with the result that the transfer time for the 90-deg. rotated image provides approx. 19T.

Therefore, although the data transfer time varies according to the direction of the image, for example, in a print processing, when different data transfer speeds are required according to the directions of the image due to other factors in sheet processing such as the limit of a sheet feed speed or development processing speed, the different data transfer times can be applied well. In this case, there can be obtained an advantage: that is, the tile can be formed square so that the image rotation processing and other image processing can be performed easily and the speeds of the processing can be increased.

[Modification 2]

In a modification 2, the method thereof for dividing a two-dimensional image and the number of the divided parts thereof are similar to the embodiment shown in FIGS. 4A and 4B and the allotment of tiles to be stored in the same disc devices is the same as in the embodiment shown in FIGS. 4A and 4B. However, the storage order of one half of tiles is opposite to that of the other half of tiles.

Figures 13A, 13B:
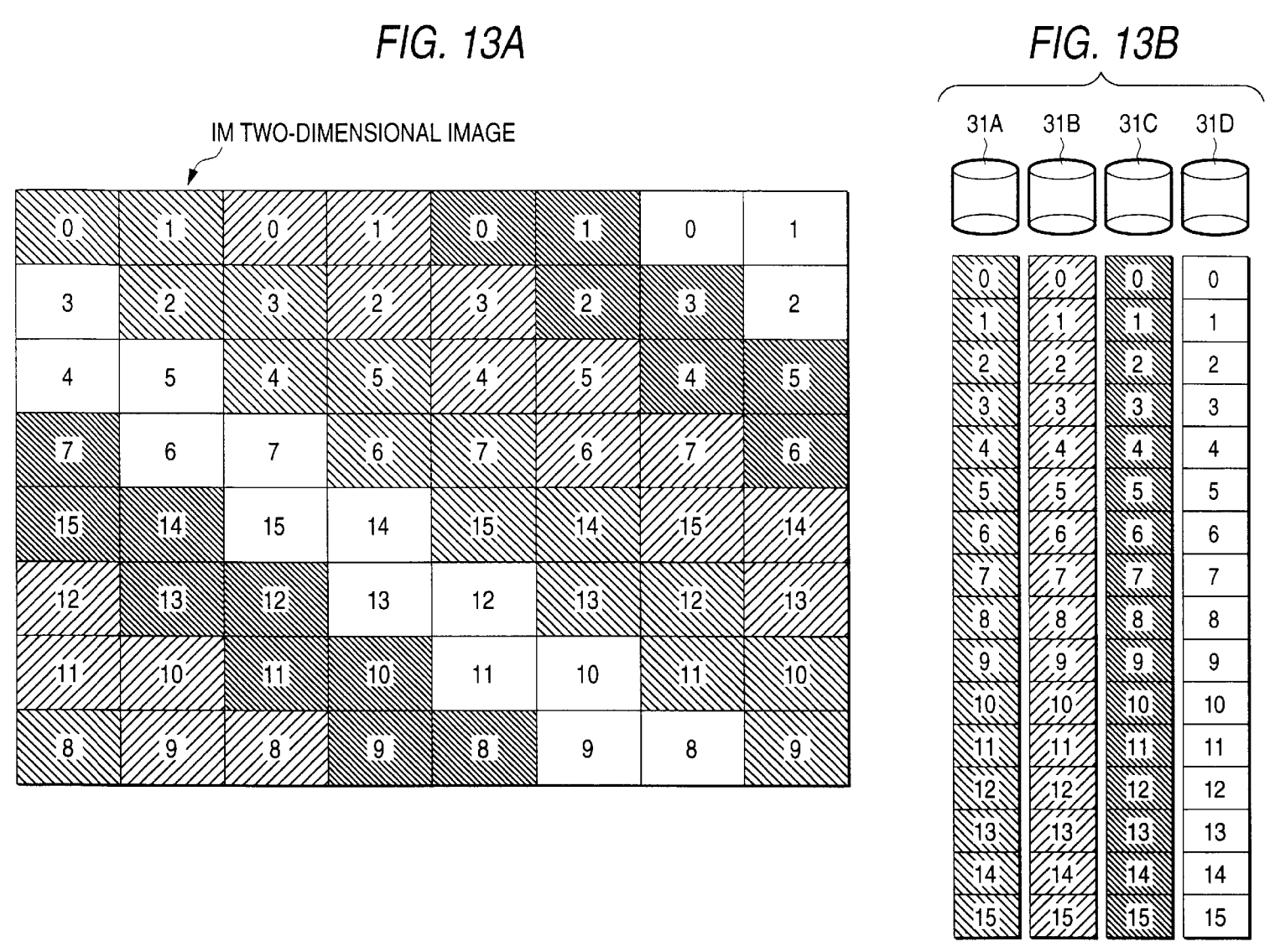

In FIG. 13, there are shown the allotment and arrangement of the tiles employed in the modification 2. That is, the tiles including a 0th tile to a 7th tile to be stored in each of the four disc devices are stored in the same order as shown in FIGS. 4A and 4B, whereas the tiles including an 8th tile to a 15th tile are stored in the reverse order to the storage order shown in FIGS. 4A and 4B.

According to the modification 2, the capacity of the buffer memory part thereof, quite similarly to the buffer memory part 33 of the image data rotational processing device shown in FIG. 3 and correspoding to the data storage system of FIGS. 4A and 4B, can be set to be equivalent to 16 tiles, in total. At the same time, even when the image is rotated not only by 90 deg. but also by 180 deg. and 270 deg., the transfer time thereof can be set in such a manner that it does not differ greatly from that of the standard image.

Access techniques respectively for accessing the data on the standard image, 90-deg. rotated image, 180-deg. rotated image and 270-deg. rotated image are shown in FIGS. 14, 15, 16 and 17, respectively.

Figure 14:
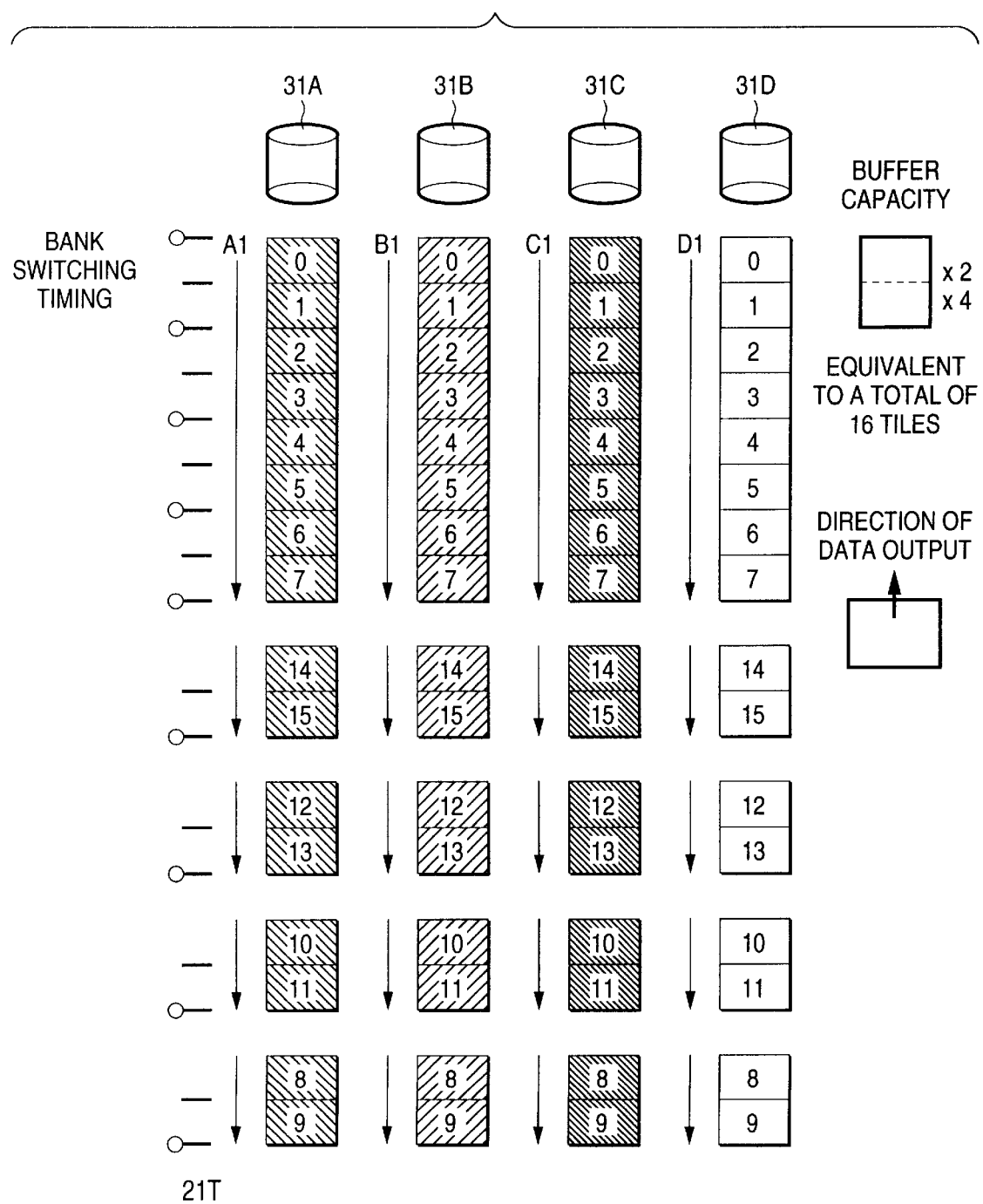
FIG. 14 is an explanatory view of an access technique used when a standard image is obtained in the first embodiment of an image data rotational processing device according to the invention, using the data storage system shown in FIGS. 13A and 13B.

That is, for the standard image, as shown in FIG. 14, the tiles from a tile 0 (numerals respectively represent the storage positions of the tiles stored in each of the disc devices, which will also apply in the following description as well) to a tile 7 can be taken out continuously from the buffer memory. However, the tiles from tile 8 to tile 15 can be respectively obtained continuously for every two tiles, but every continuous two tiles are not continuous with each other. Therefore, the transfer time for the standard image provides 21T.

Figure 16:
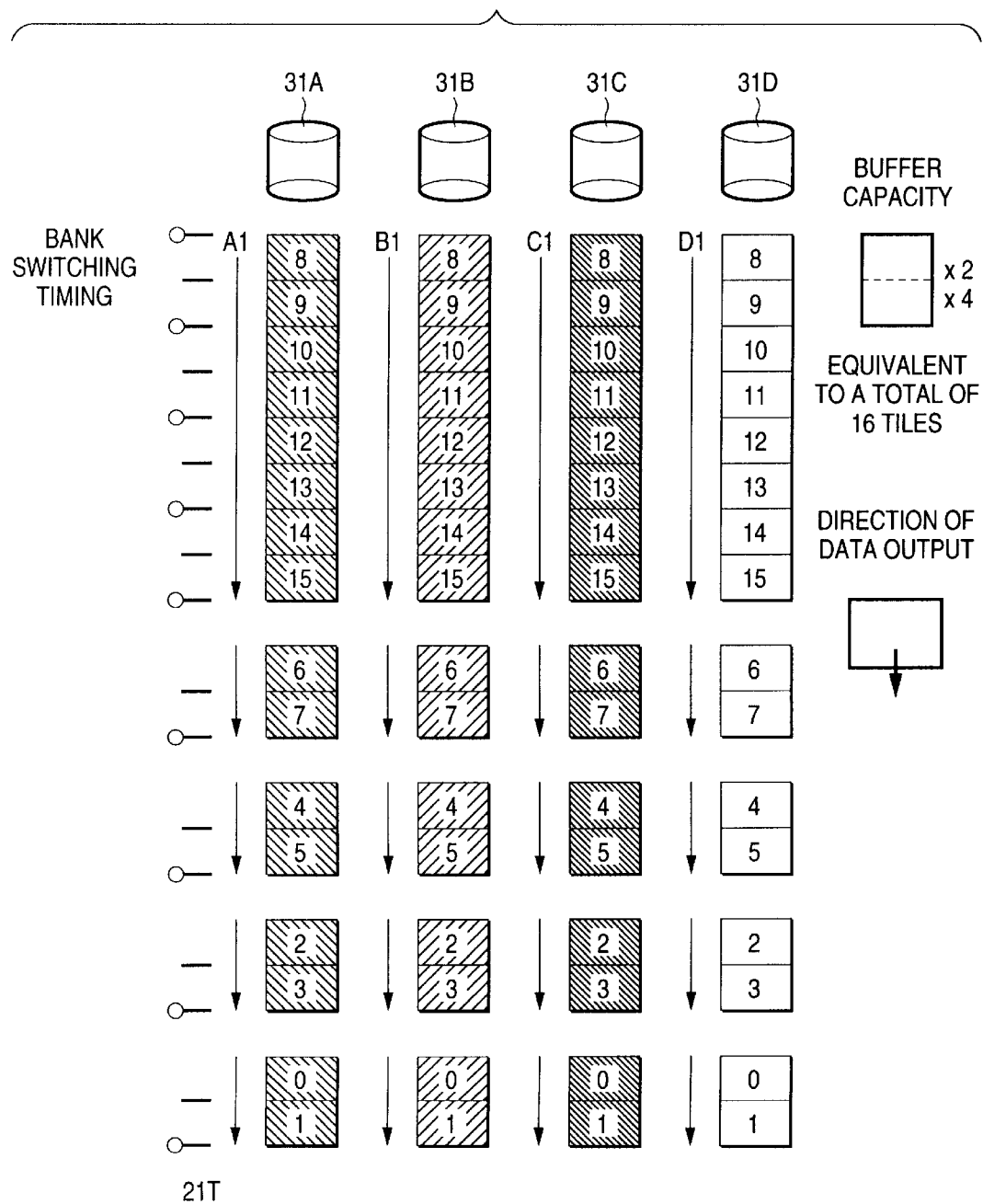
FIG. 16 is an explanatory view of an access technique used when a 180-deg. rotated image is obtained in the embodiment of an image data rotational processing device according to the invention, using the data storage system shown in FIGS. 13A and 13B.

For the 180-deg. rotated image, the relationship between the tiles from a tile 0 to a tile 7 and the tiles from 8 to a tile 15 is reversed to the relationship in the standard image and, therefore, as shown in FIG. 16, the transfer time for the 180-deg. rotated image also provides 21T.

Figure 15:
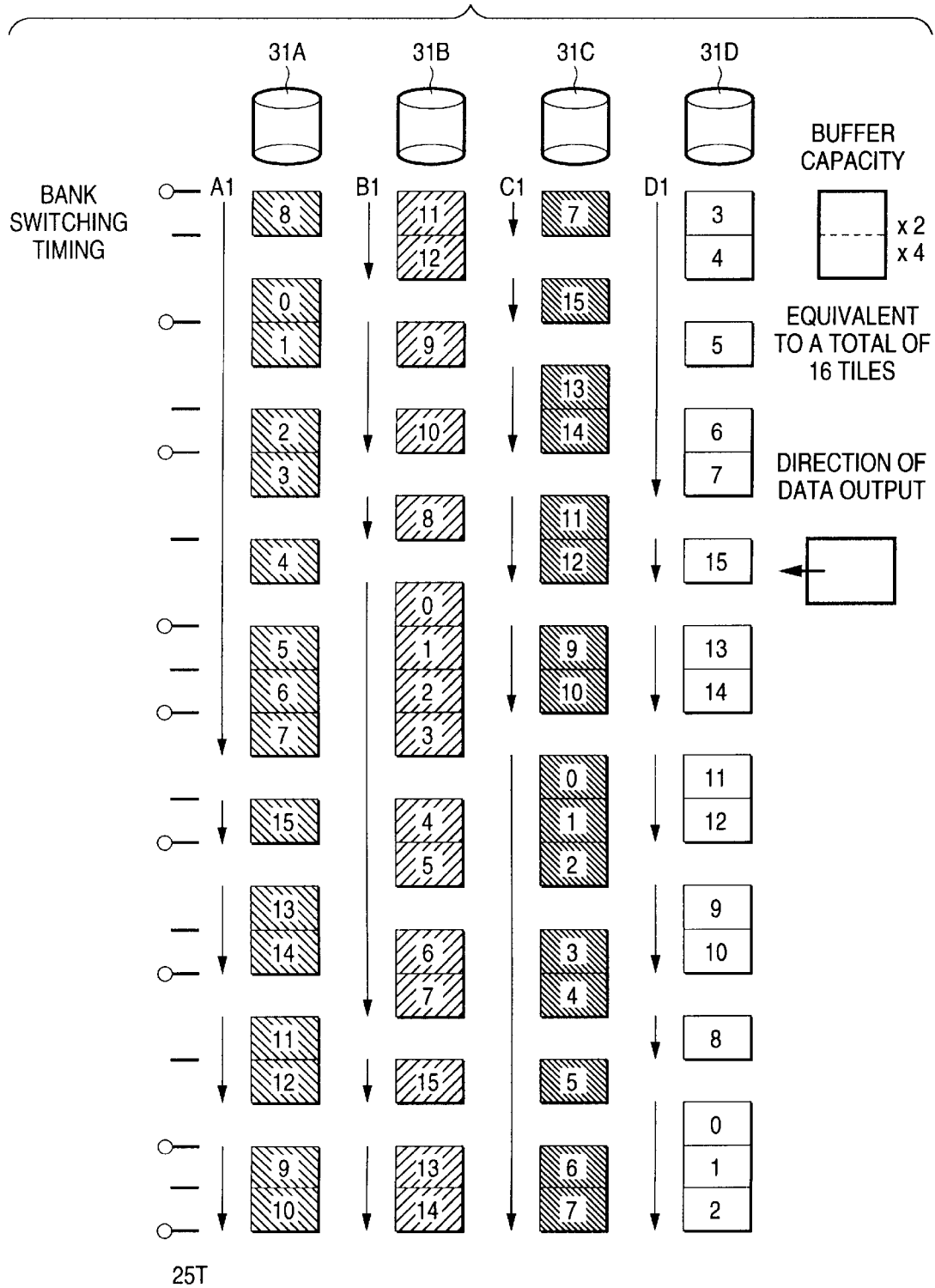
FIG. 15 is an explanatory view of an access technique used when a 90-deg. rotated image is obtained in the embodiment of an image data rotational processing device according to the invention, using the data storage system shown in FIGS. 13A and 13B.
Figure 17:
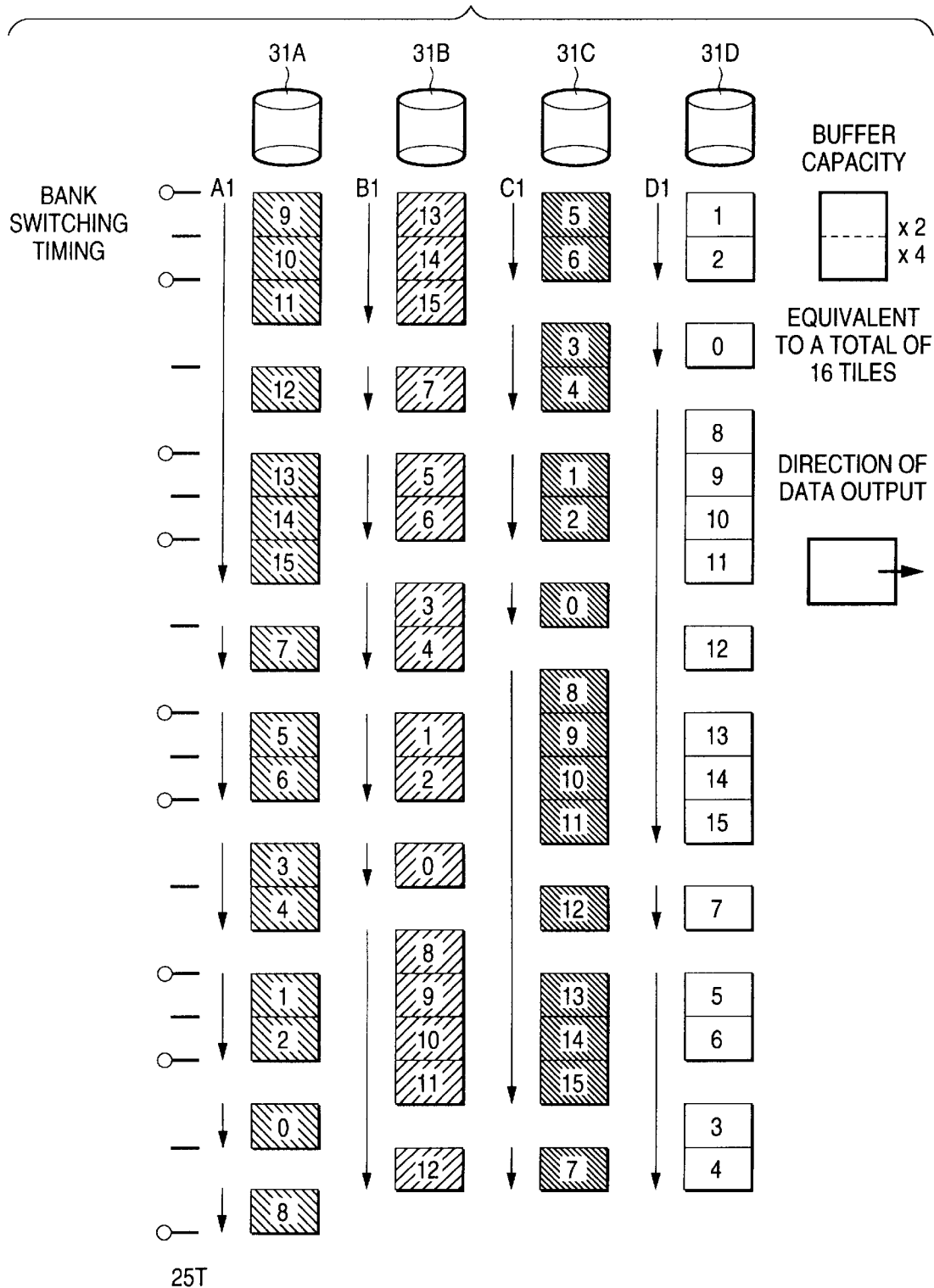
FIG. 17 is an explanatory view of an access technique used when a 270-deg. rotated image is obtained in the embodiment of an image data rotational processing device according to the invention, using the data storage system shown in FIGS. 13A and 13B.

Next, for the 90-deg. rotated image, the image data can be taken out according to such an access technique as shown in FIG. 15 and thus the transfer time thereof provides 25T. For the 270-deg. rotated image, as shown in FIG. 17, the accesses thereof are almost similar to those of the 90-deg. rotated image and thus the transfer time thereof also provides 25T.

[Modification 3]

Figure 18:
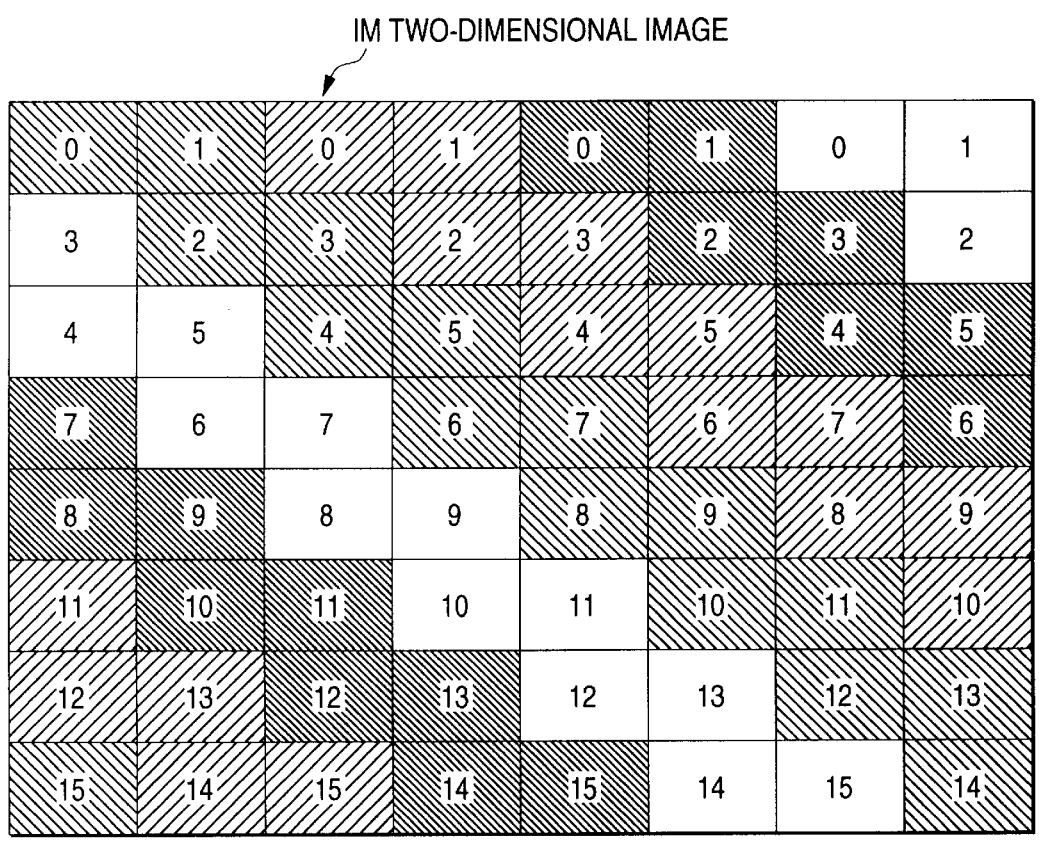
FIG. 18 is an explanatory view of a data storage system used in a third modification of an image data storing method according to the invention.
Figure 19:
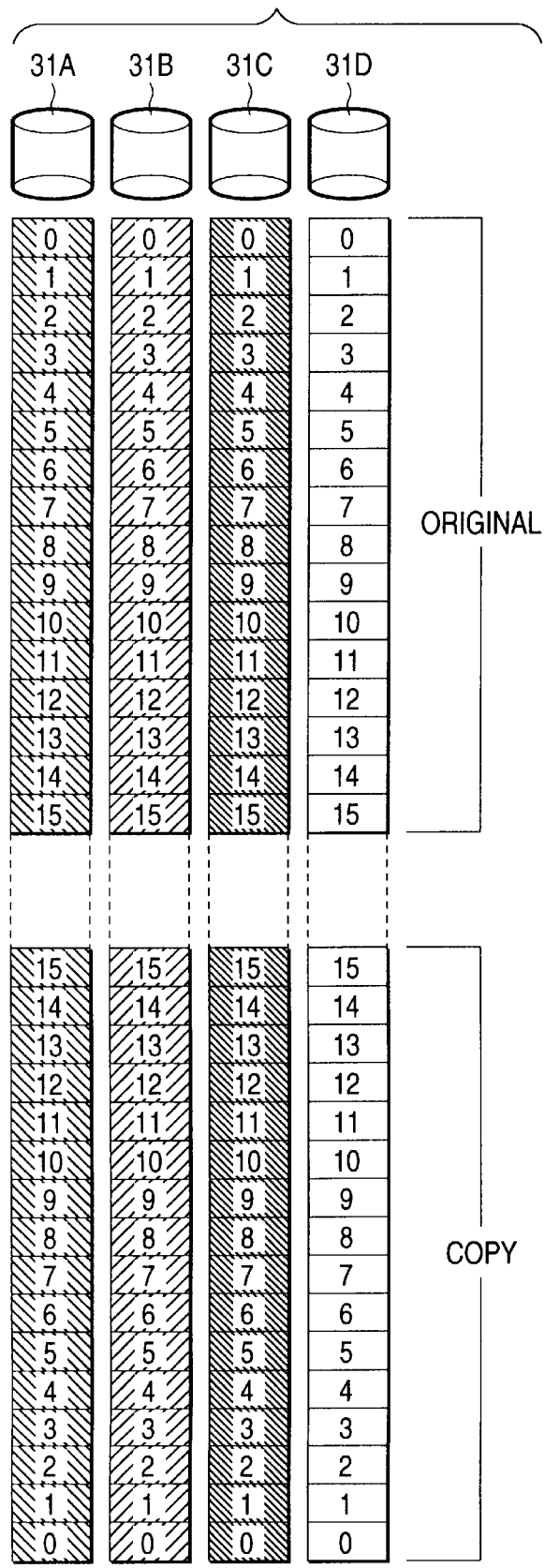
FIG. 19 is an explanatory view of the data storage system shown in FIG. 18.

According to this modification 3, in the above-mentioned initial embodiment, the original and copy data of the two-dimensional image data are stored double in four disc devices 31A–31D. That is, the copy data of the image data are formed and the copy data of the respective tiles are stored in the mutually adjoining disc devices 31A–31D. The order of the storage of the copy data is reversed to the order of the original image data. In FIGS. 18 and 19, there is shown the image data storage method of the modification 3 for storing the image data into the four disc devices 31A–31D.

That is, as shown in FIG. 19, in the disc device 31A, there are stored the original data that are just the same as in the above-mentioned embodiment, and the copy data that are reversed in the order thereof to the original data to be stored in the disc device 31D; in the disc device 31B, there are stored the original data that are just the same as in the above-mentioned embodiment, and the copy data that are reversed in the order thereof to the original data to be stored in the disc device 31A; in the disc device 31C, there are stored the original data that are just the same as in the above-mentioned embodiment, and the copy data that are reversed in the order thereof to the original data to be stored in the disc device 31B; and, in the disc device 31D, there are stored the original data that are just the same as in the above-mentioned embodiment, and the copy data that are reversed in the order thereof to the original data to be stored in the disc device 31C.

In the present modification, for the standard image and 90-deg. rotated image, the original data of the four disc devices 31A–31D are transferred to the buffer memory part 33 and, for the 180-deg. rotated image and 270-deg. rotated image, the copy data of the four disc devices 31A–31D are transferred to the buffer memory part 33.

Figure 20:
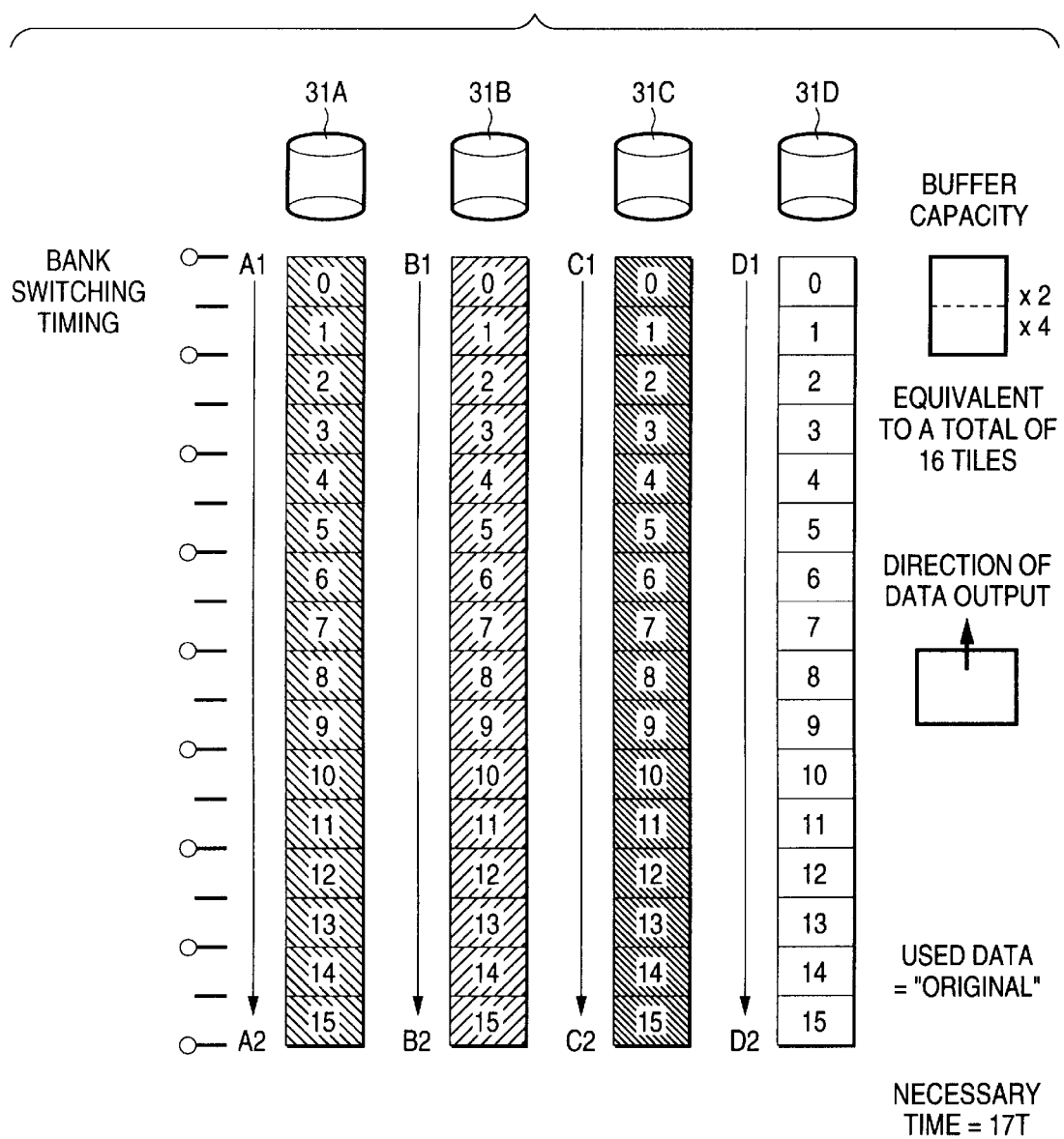
FIG. 20 is an explanatory view of an access technique used when a standard image is obtained in the embodiment of an image data rotational processing device according to the invention, using the data storage system shown in FIGS. 18 and 19.
Figure 21:
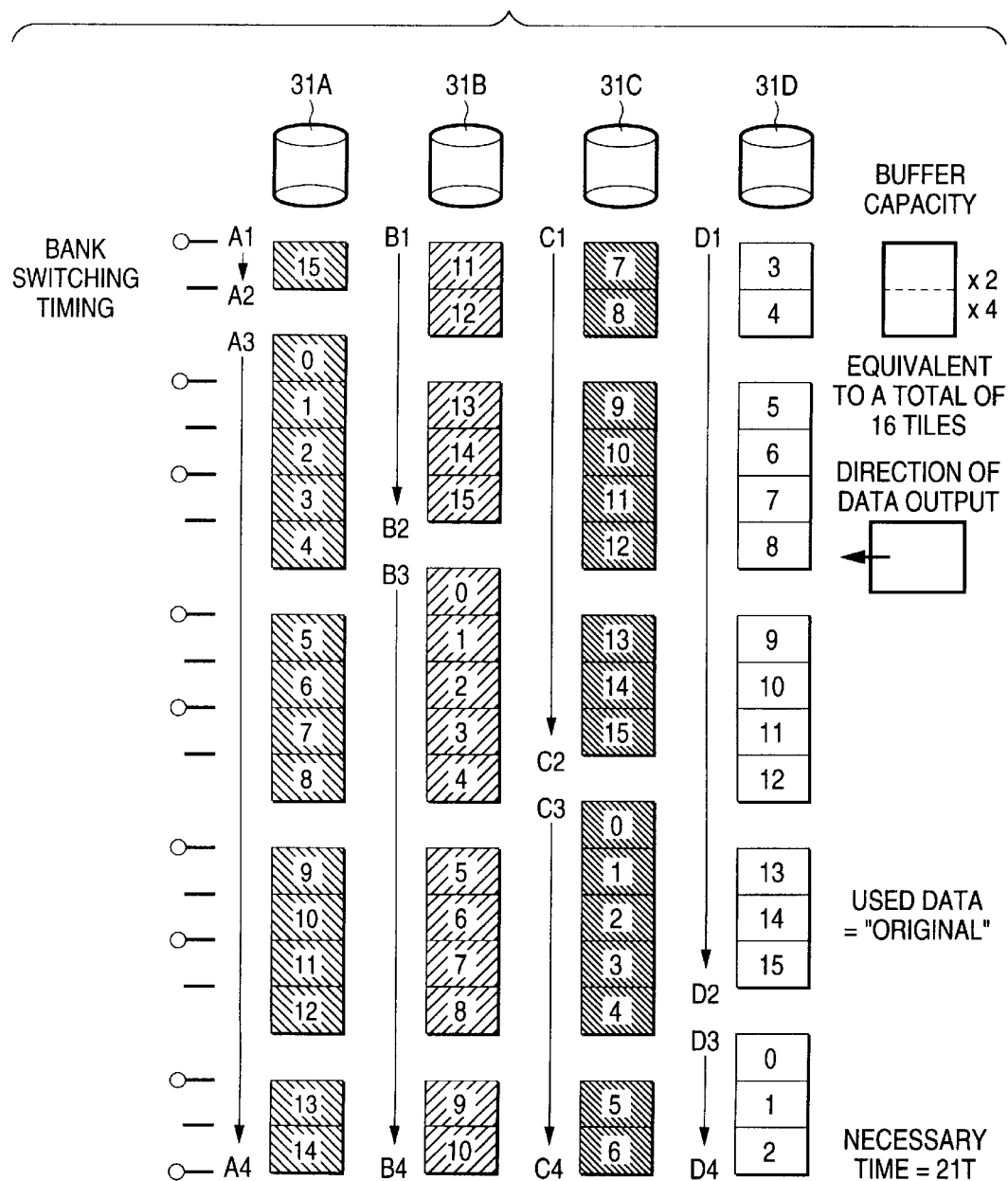
FIG. 21 is an explanatory view of an access technique used when a 90-deg. rotated image is obtained in the embodiment of an image data rotational processing device according to the invention, using the data storage system shown in FIGS. 18 and 19.
Figure 22:
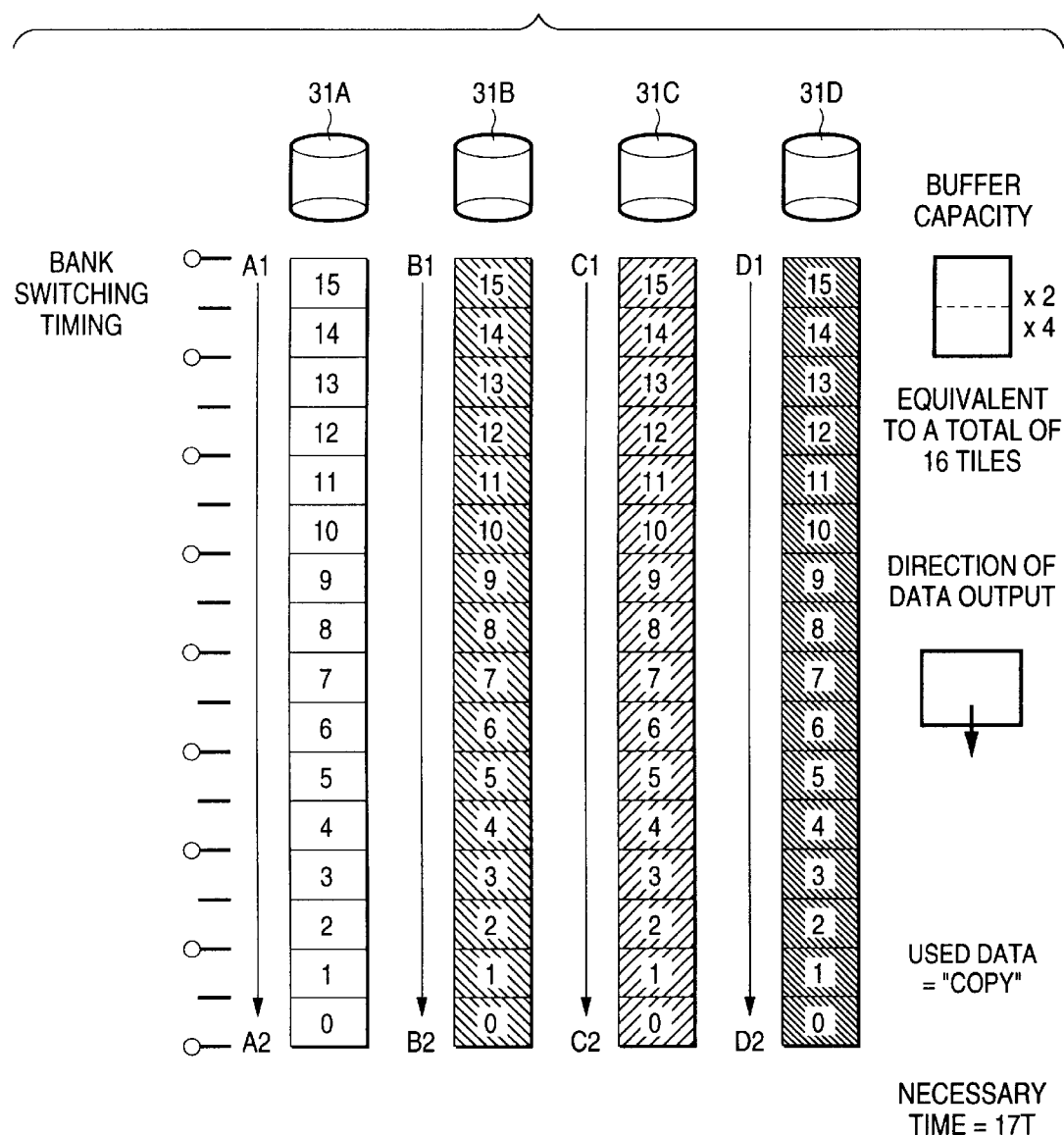
FIG. 22 is an explanatory view of an access technique used when a 180-deg. rotated image is obtained in the embodiment of an image data rotational processing device according to the invention, using the data storage system shown in FIGS. 18 and 19.
Figure 23:
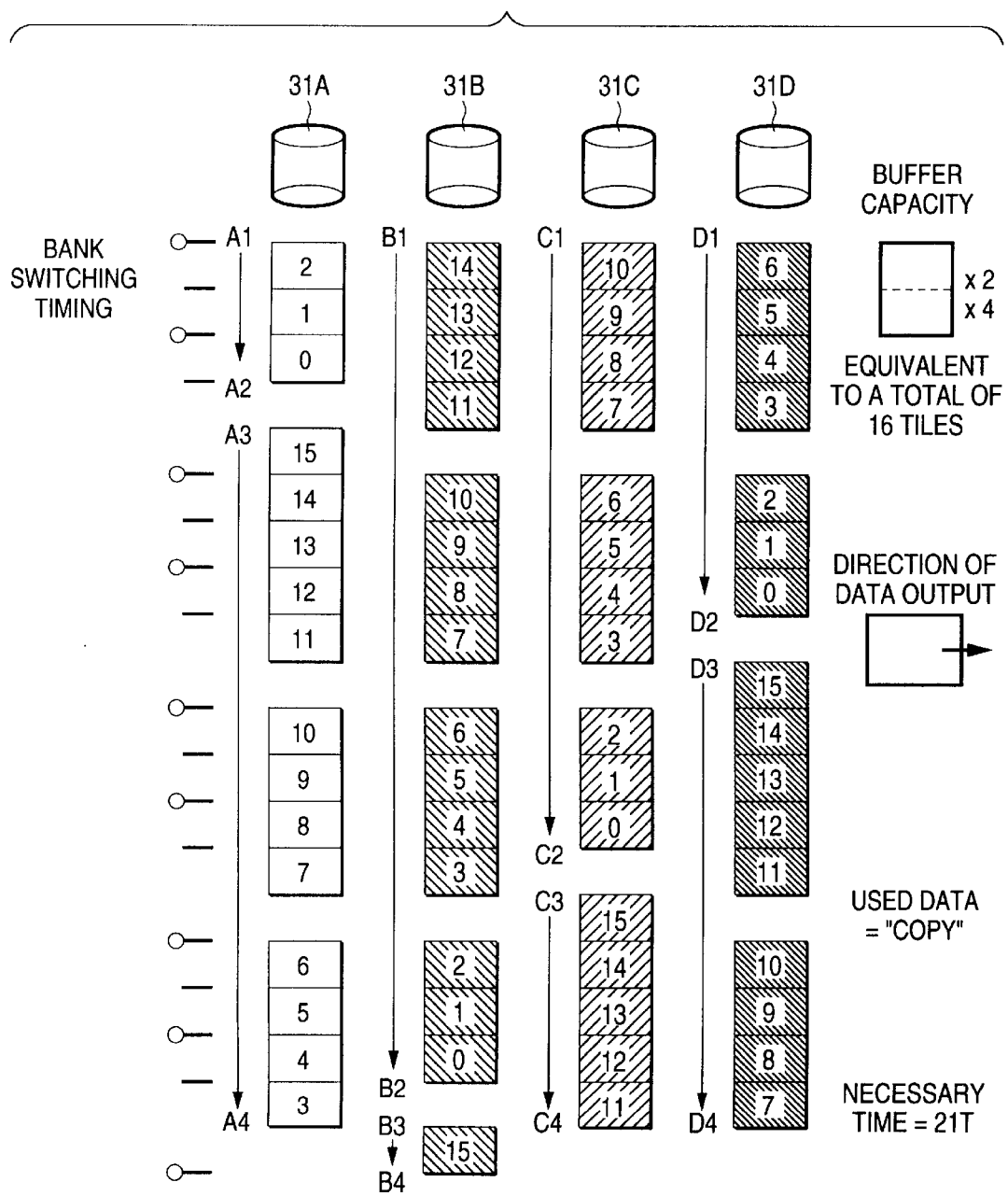
FIG. 23 is an explanatory view of an access technique used when a 270-deg. rotated image is obtained in the embodiment of an image data rotational processing device according to the invention, using the data storage system shown in FIGS. 18 and 19.

Due to this, not only for the standard image and 90-deg. rotated image but also for the 180-deg. and 270-deg. rotated images, the data can be taken out within 17T when the sheet is shorter in the advancing direction thereof and within 21T when the sheet is longer in this direction. In FIG. 20, there is shown an access technique employed when the standard image is read out; in FIG. 21, there is shown an access technique for reading out the 90-deg. rotated image; in FIG. 22, there is shown an access technique for reading out the 180-deg. rotated image; and, in FIG. 23, there is shown an access technique for reading out the 270-deg. rotated image.

Here, as shown in FIGS. 20–23 as well, the capacity of the buffer memory part 33 is just the same as in the above-mentioned embodiment, that is, it corresponds to a total of 16 tiles.

According to the present modification 3, it is possible to improve the reliability of the data with respect to the failure of the disc device. That is, in this modification 3, even if data loss due to the failure occurs in at least one of the disc devices, the lost data are stored in the other disc device and, therefore, although the throughput of the device is lowered, the whole device is sure to work well with no trouble.

[Modification 4]

In the above-mentioned respective embodiment and modifications, there is necessary a time (it is assumed to be approx. 1T) in the discontinuous portion of the tile arrangement of the tiles stored in the disc device, that is, a time to access the leading address of the leading tile (that is, the tile 1) after completion of read-out of the trailing tile (that is, the tile 15). This time has frustrated the other disc devices to be driven in parallel.

Figure 24:
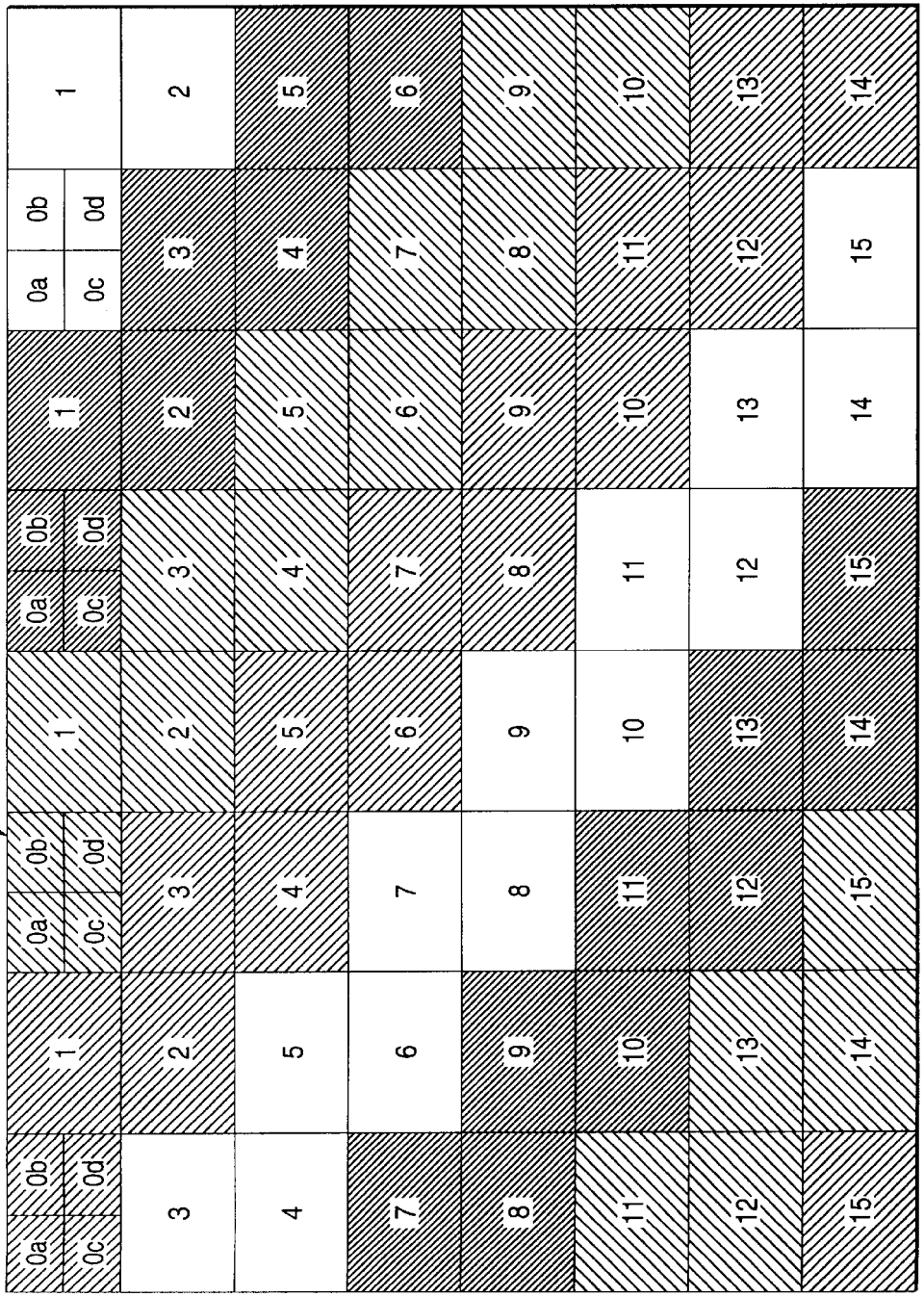
FIG. 24 is an explanatory view of a fourth modification of a data storage system employed in an image data storing method according to the invention.
Figure 25:
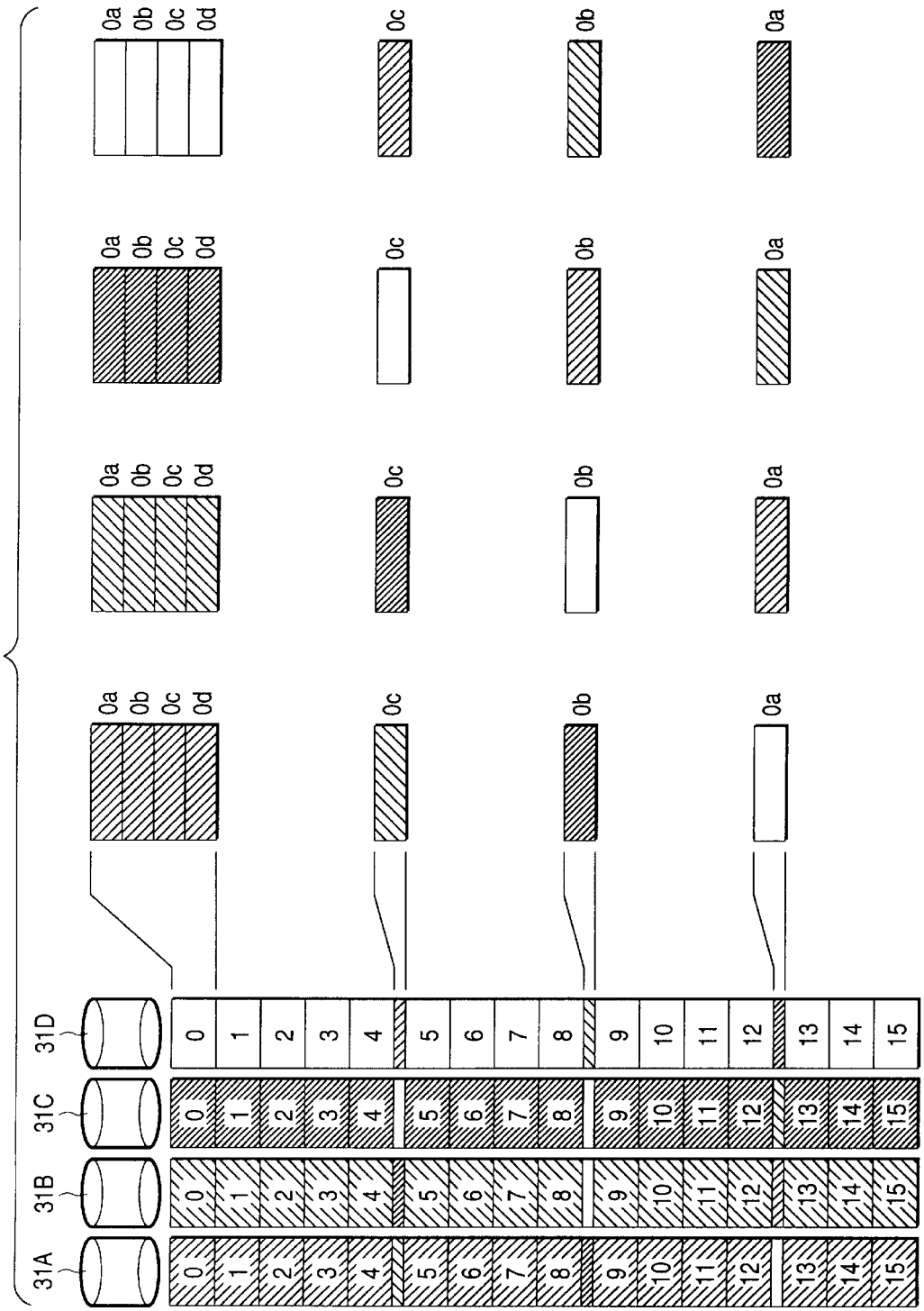
FIG. 25 is an explanatory view of the data storage system shown in FIG. 24.

In view of this, there is shown a further modification 4 which can ease the frustration of the other disc devices: that is, the modification 4 is shown in FIGS. 24 and 25 with the storage method shown in FIG. 4 as the reference thereof.

In the present modification 4, each of tiles 0, to which patterns respectively corresponding to the disc devices 31A–31D are given, is divided into four equal parts and these four equally divided parts, each of which is equivalent to a ¼ tile, are referred to as a tile 0$a$, a tile 0$b$, a tile 0$c$, and a tile 0d. In the respective disc devices, at the storage position of the tile 0 in the above-mentioned embodiment, these tiles 0a, 0b, 0c and 0d are stored in this order.

In each of the disc devices, between the tiles 4 and 5, between the tiles 8 and 9, and between the tiles 12 and 13, there is stored one of ¼ tiles having different patterns. The allotment of the ¼ tiles to be stored is as follows:

By virtually connecting the disc device 31A to the disc device 31D, it is assumed that the four disc devices 31A–31D are arranged as a ring. In this ring-shaped arrangement of the four disc devices, in the rear of the tile 4 which are respectively to be stored in the respective disc devices, there is allotted the tile 0c having a pattern stored in a next disc device on the right; in the rear of the tile 8, there is allotted the tile 0b having a pattern stored in a next disc device on the right but one; in the rear of the tile 12, there is allotted the tile 0a having a pattern stored in a next disc device on the right but two, that is, a next disc device on the left. In FIG. 25, there is shown how the respective tiles and ¼ tiles are stored in the disc devices 31A–31D.

Figure 26:
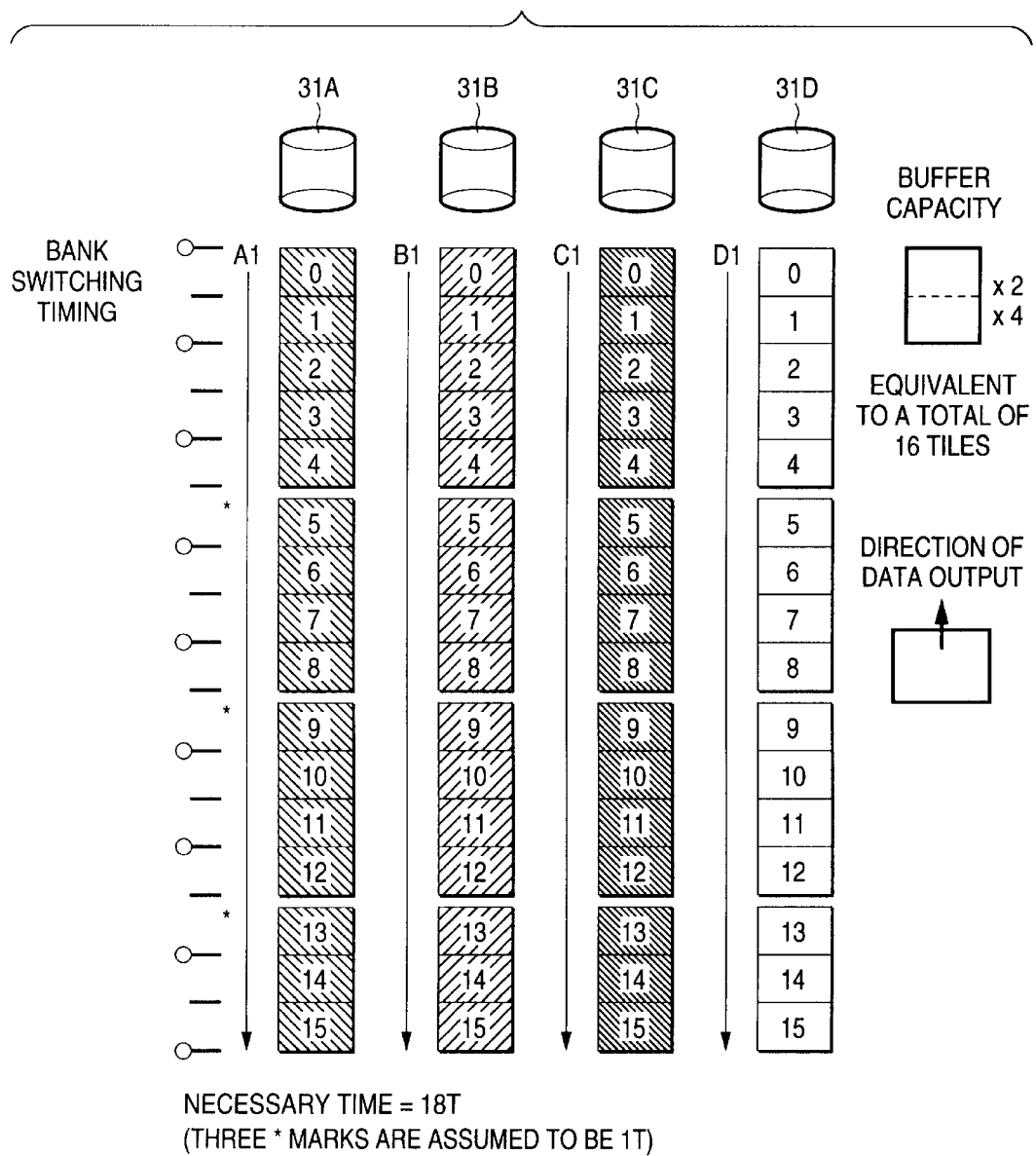
FIG. 26 is an explanatory view of an access technique used when a standard image is obtained in the embodiment of an image data rotational processing device according to the invention, using the data storage system shown in FIGS. 24 and 25.
Figure 27:
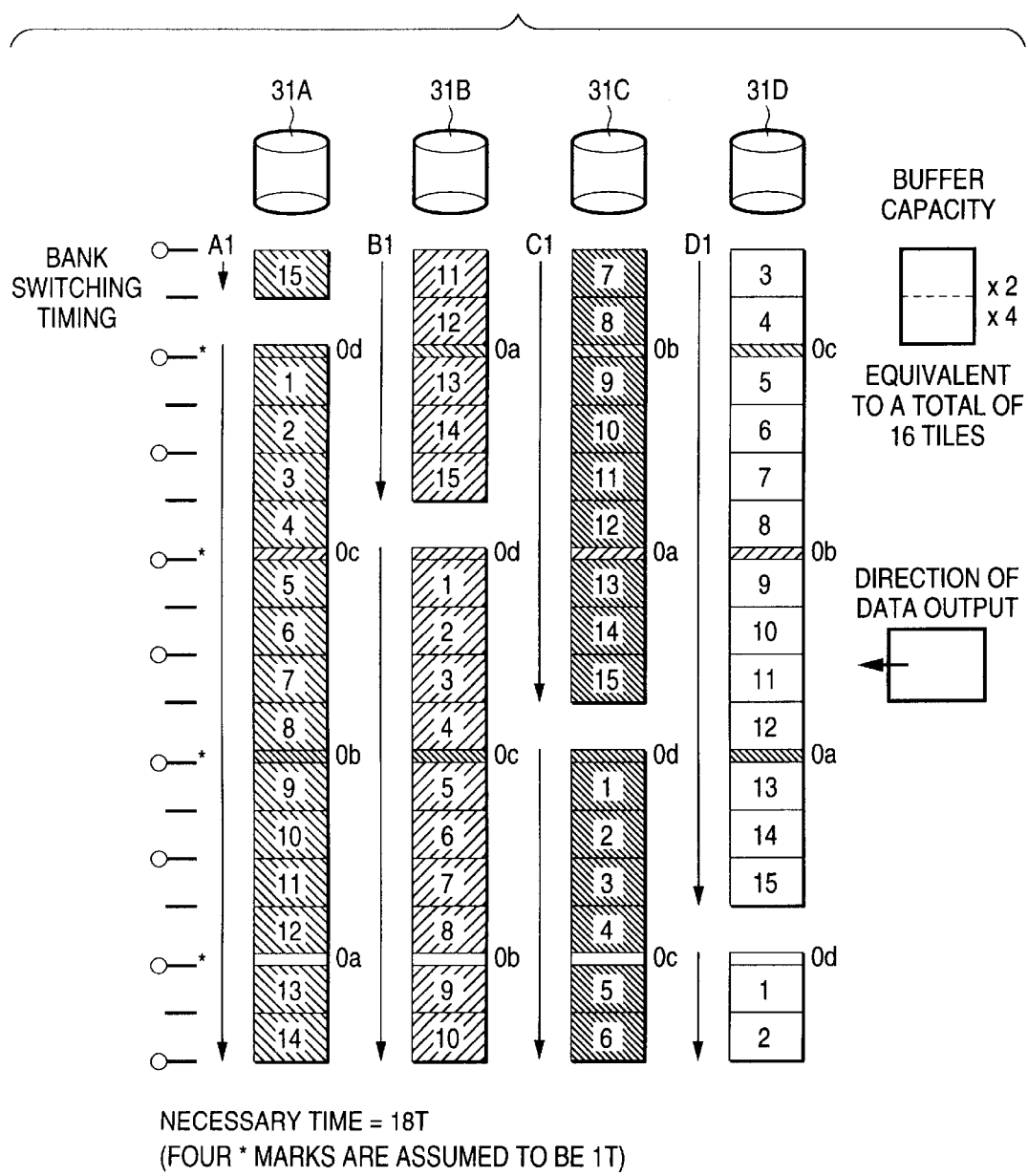
FIG. 27 is an explanatory view of an access technique used when a 90-deg. rotated image is obtained in the embodiment of an image data rotational processing device according to the invention, using the data storage system shown in FIGS. 24 and 25.
Figure 31:
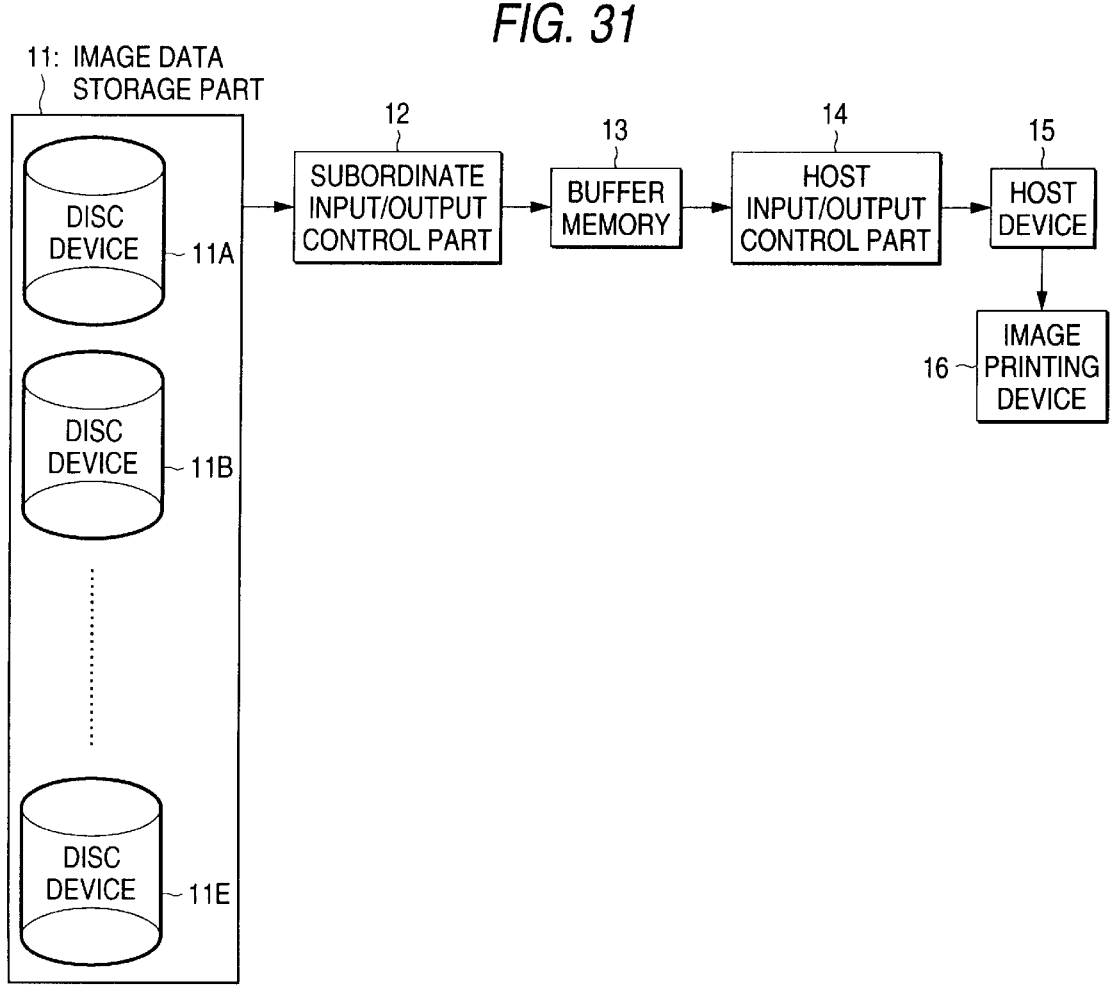
FIG. 31 is a block diagram of another structure of a conventional image data rotational processing device.
Figure 32:
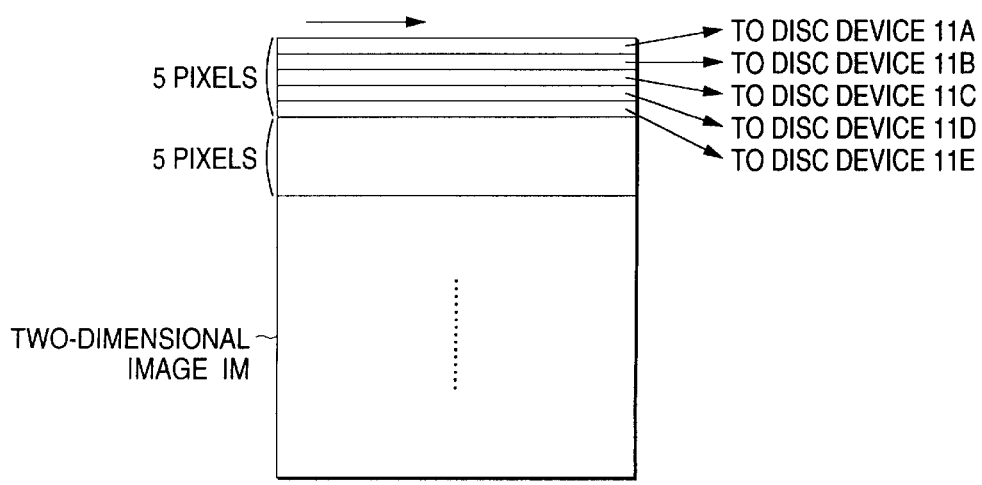
FIG. 32 is an explanatory view of an image data storage system employed in the conventional image data rotational processing device shown in FIG. 31.
Figure 33A:
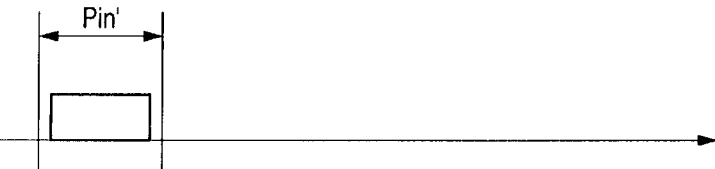
FIGS. 33A and 33B are explanatory views of a transfer time necessary for transfer of image data (which are equivalent to 1 screen) in the conventional device shown in FIG. 31.
Figure 33B:
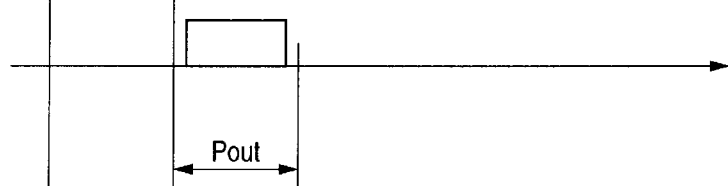
Figure 34A:
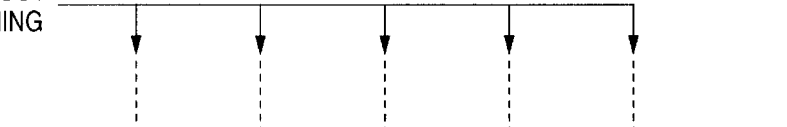
FIGS. 34A and 34B are explanatory views of a transfer time necessary for transfer of image data (which are equivalent to X screens) in the conventional device shown in FIG. 31.
Figure 34B:
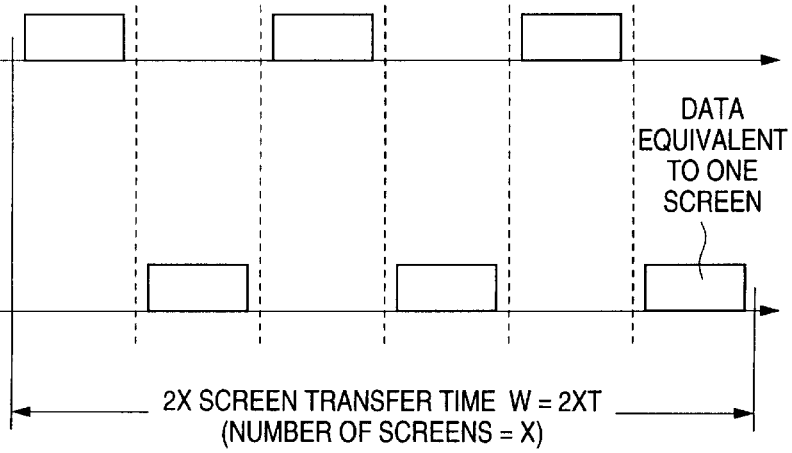
Figure 38:
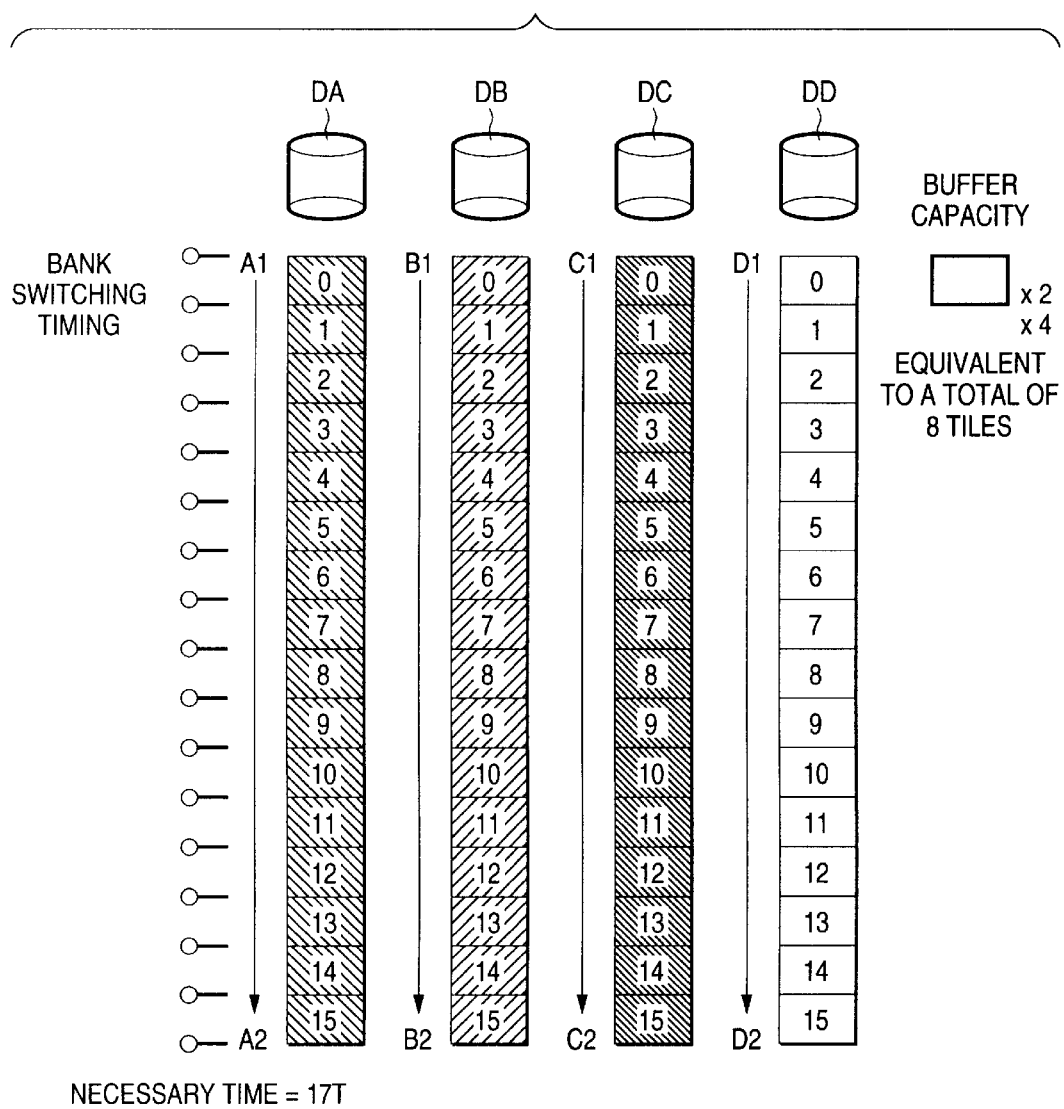
FIG. 38 is an explanatory view of an access technique used when a standard image is obtained according to the data storage system shown in FIGS. 37A and 37B using the conventional image data rotational processing device shown in FIG. 35.
Figure 39:
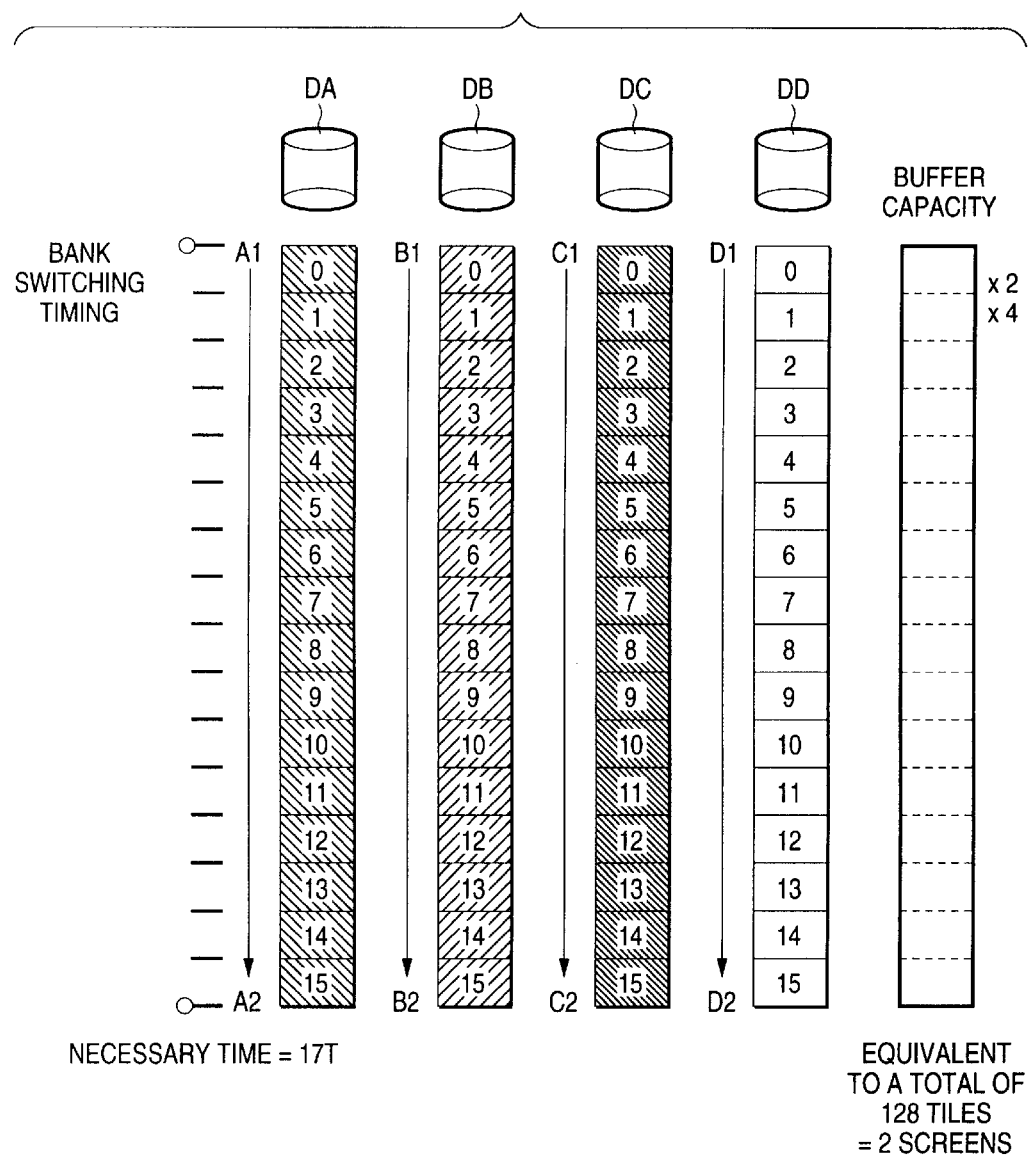
FIG. 39 is an explanatory view of an access technique used when a 90-deg. rotated image is obtained according to the data storage system shown in FIGS. 37A and 37B using the conventional image data rotational processing device shown in FIG. 35.
Figure 40:
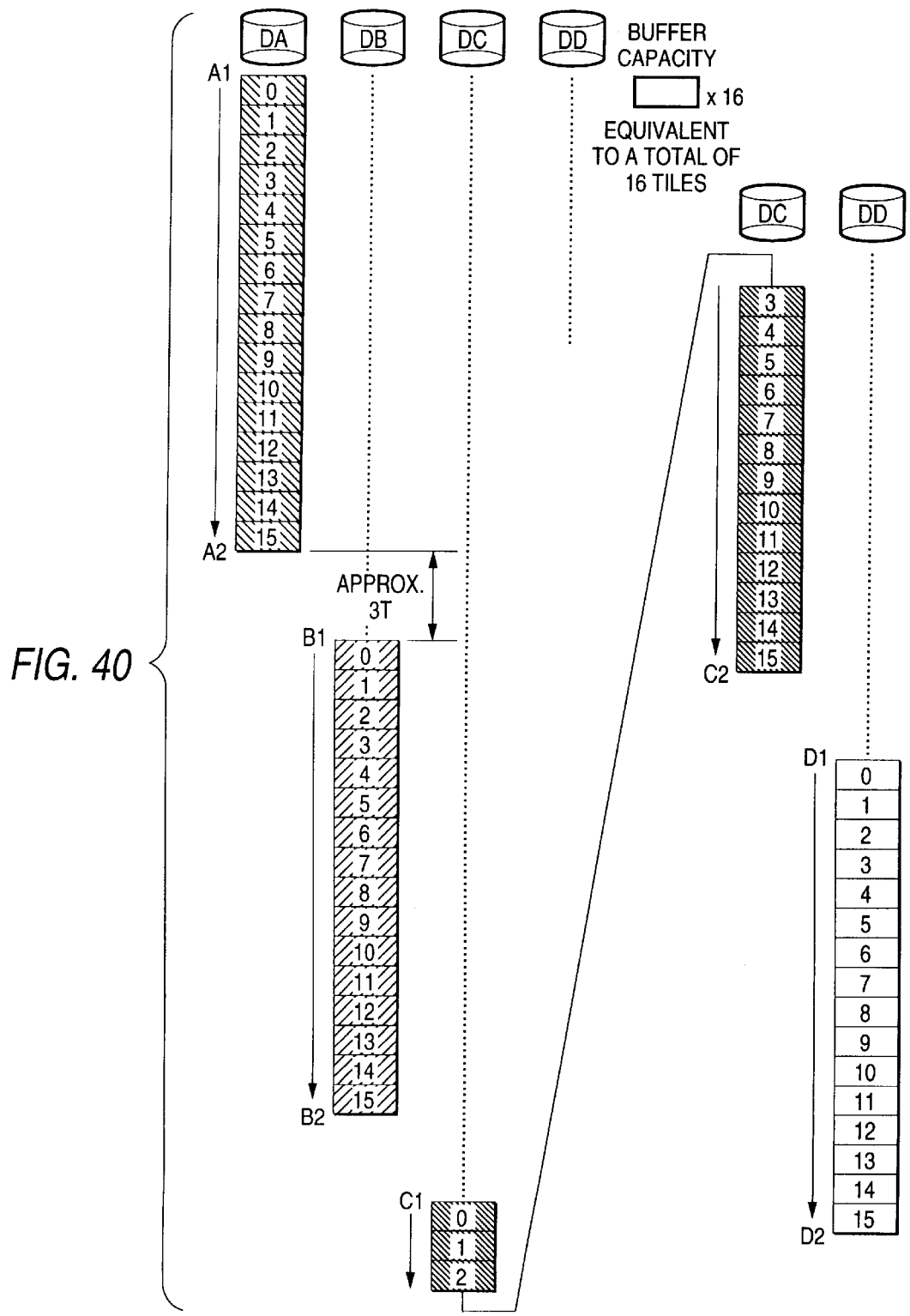
FIG. 40 is an explanatory view of an access technique used when a 90-deg. rotated image is obtained according to the data storage system shown in FIGS. 37A and 37B using the conventional image data rotational processing device shown in FIG. 35.
Figure 42:
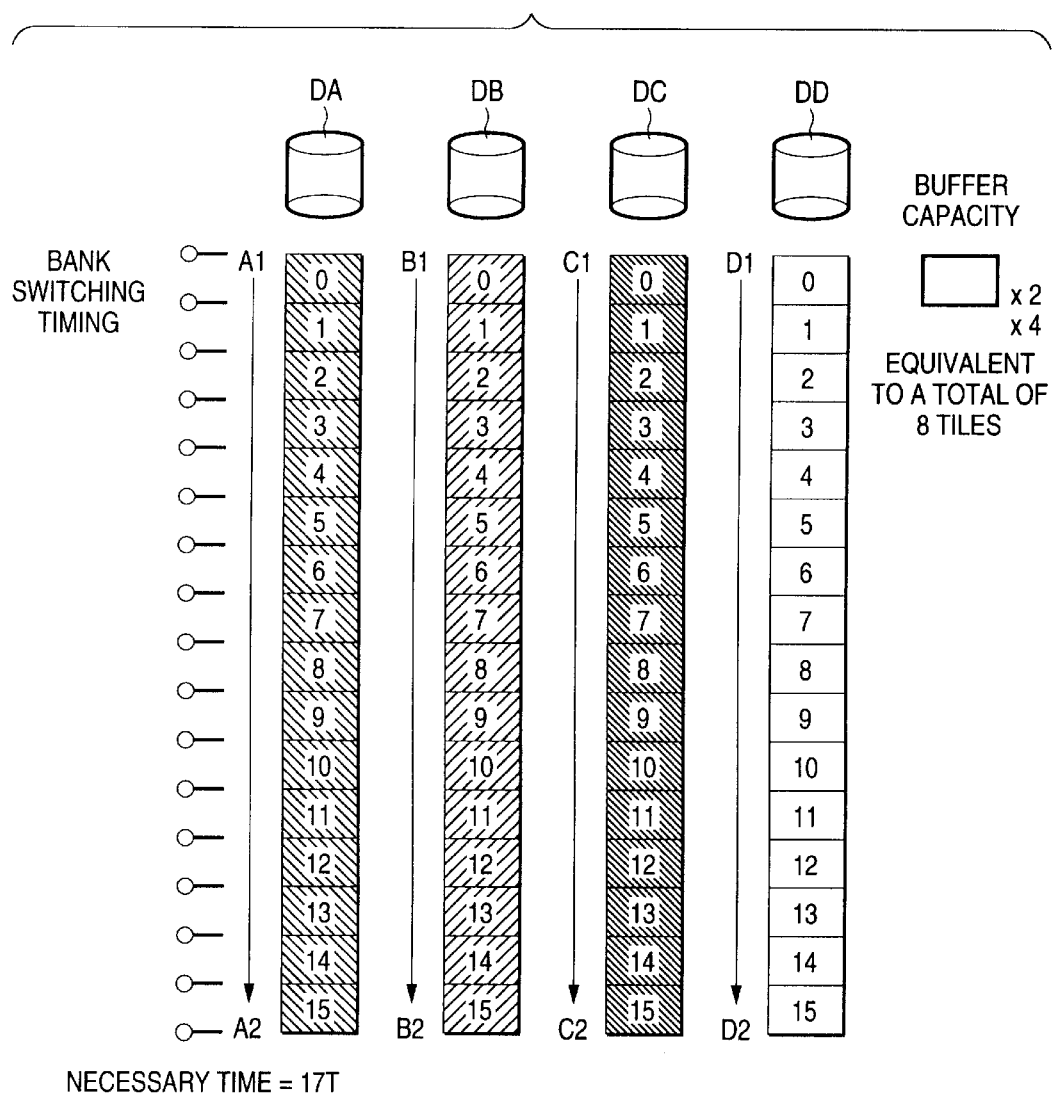
FIG. 42 is an explanatory view of an access technique used when a standard image is obtained according to the data storage system shown in FIGS. 41A and 41B using the conventional image data rotational processing device shown in FIG. 35.
Figure 43:
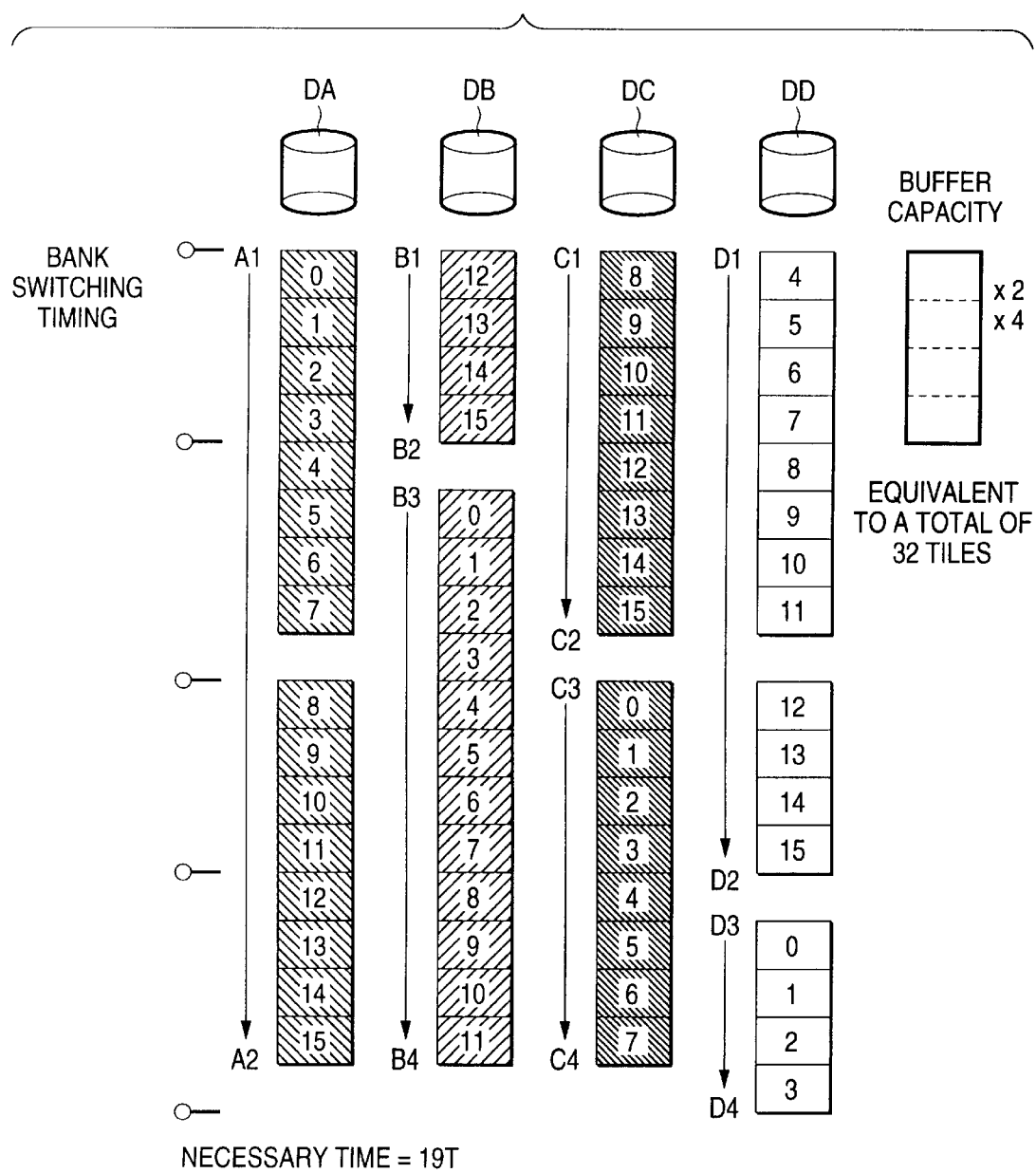
FIG. 43 is an explanatory view of an access technique used when a 90-deg. rotated image is obtained according to the data storage system shown in FIGS. 41A and 41B using the conventional image data rotational processing device shown in FIG. 35.
Figure 44:
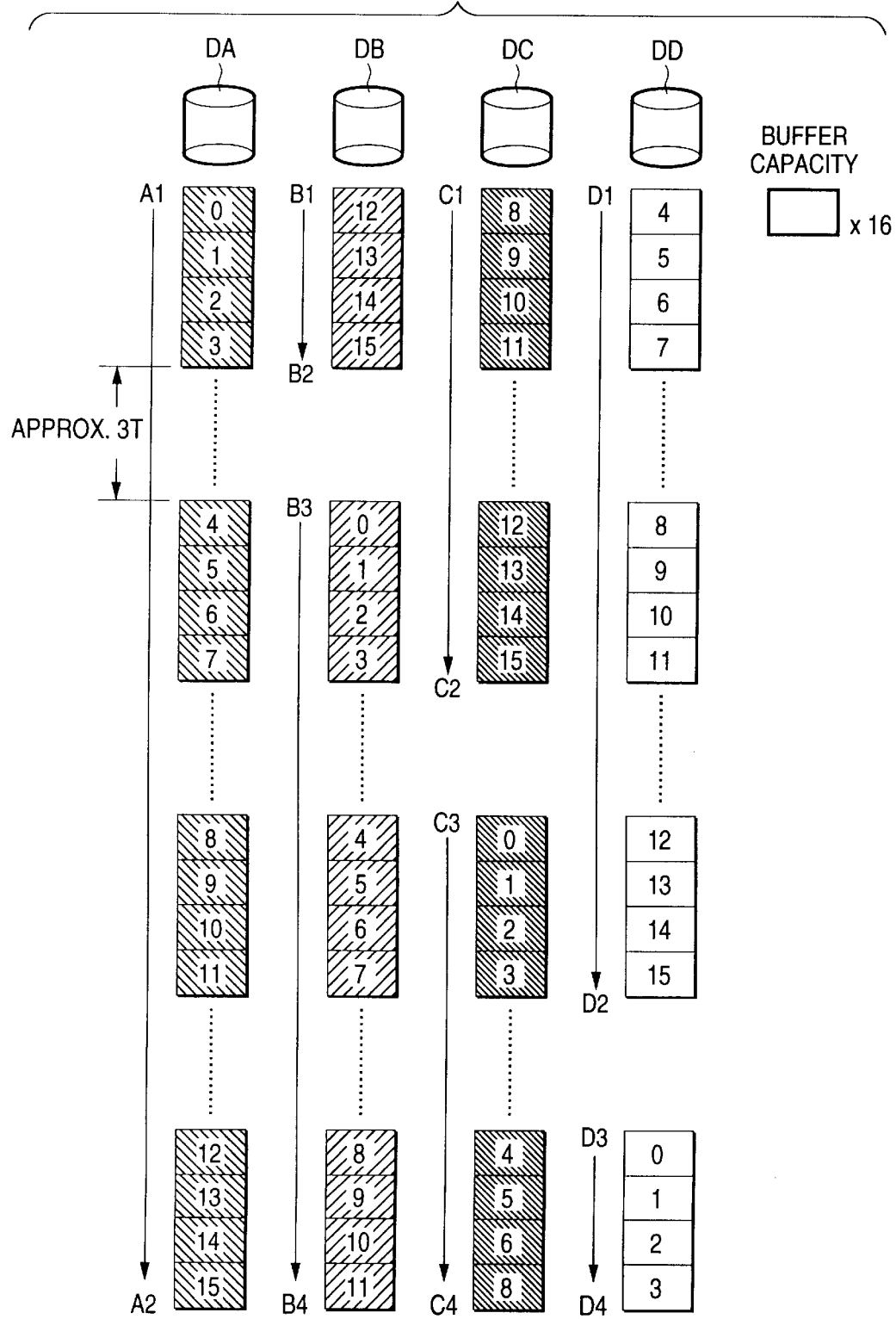
FIG. 44 is an explanatory view of another access technique used when a 90-deg. rotated image is obtained according to the data storage system shown in FIGS. 41A and 41B using the conventional image data rotational processing device shown in FIG. 35.
Figure 46:
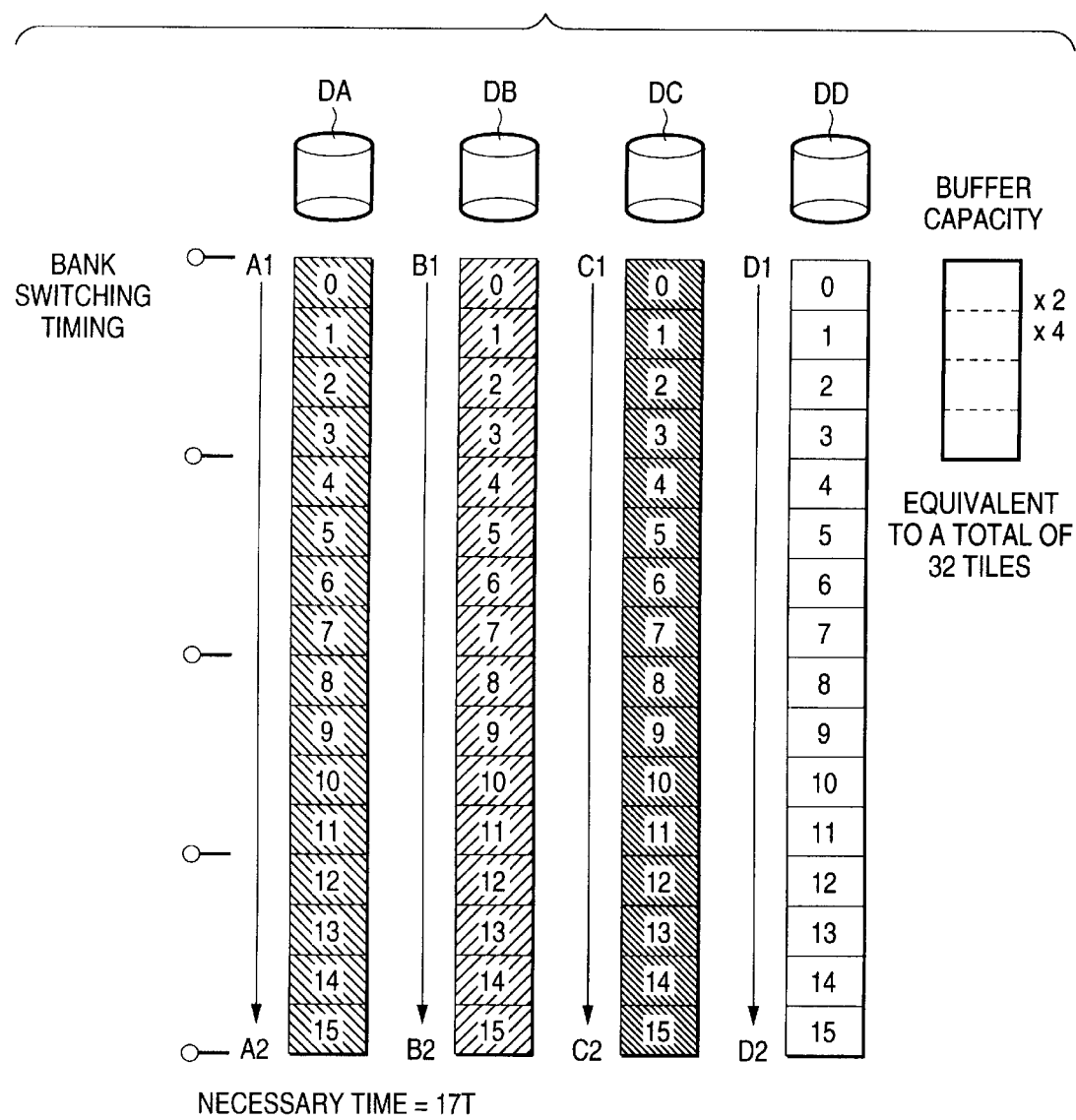
FIG. 46 is an explanatory view of an access technique used when a standard image is obtained according to the data storage system shown in FIGS. 45A and 45B using the conventional image data rotational processing device shown in FIG. 35.
Figure 47:
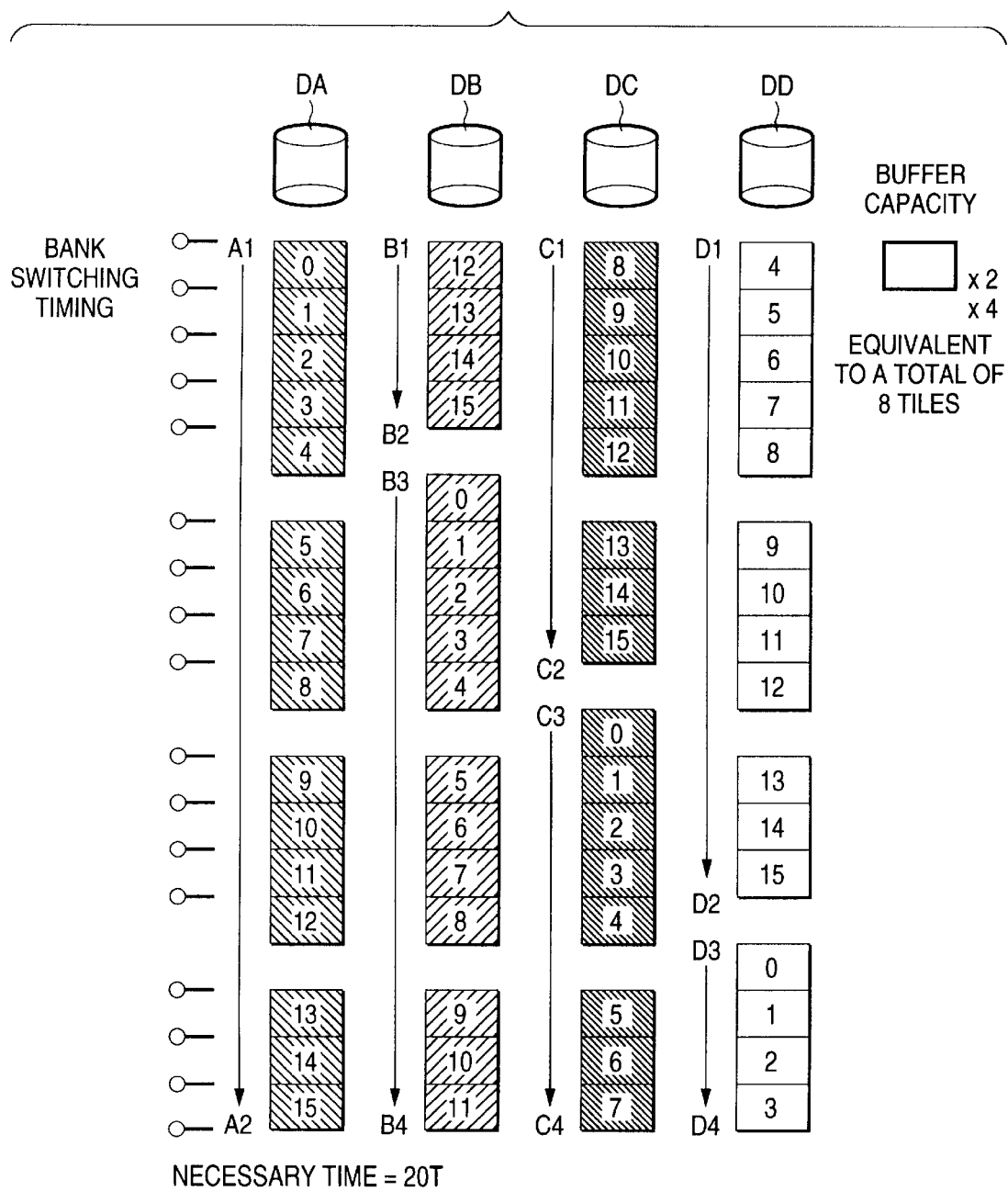
FIG. 47 is an explanatory view of an access technique used when a 90-deg. rotated image is obtained according to the data storage system shown in FIGS. 45A and 45B using the conventional image data rotational processing device shown in FIG. 35.
Figure 48:
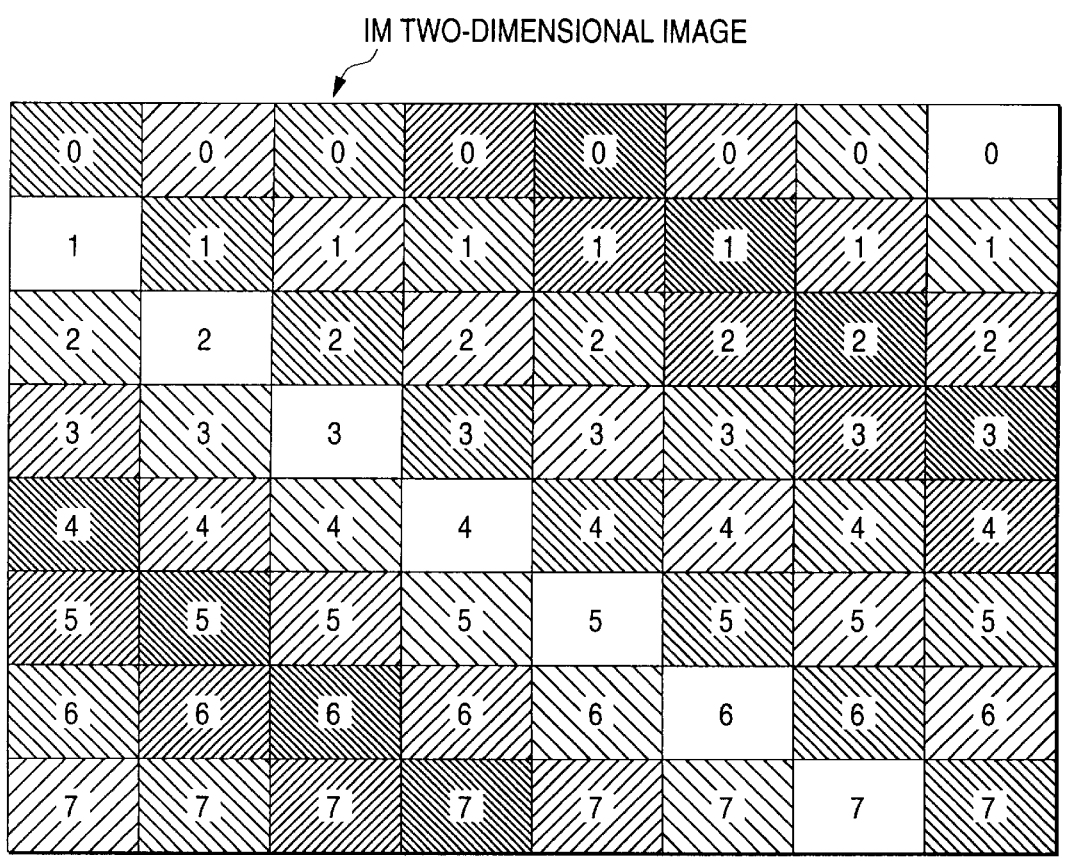
FIG. 48 is an explanatory view of a still another example of an image data storage system to be expected.
Figure 49:
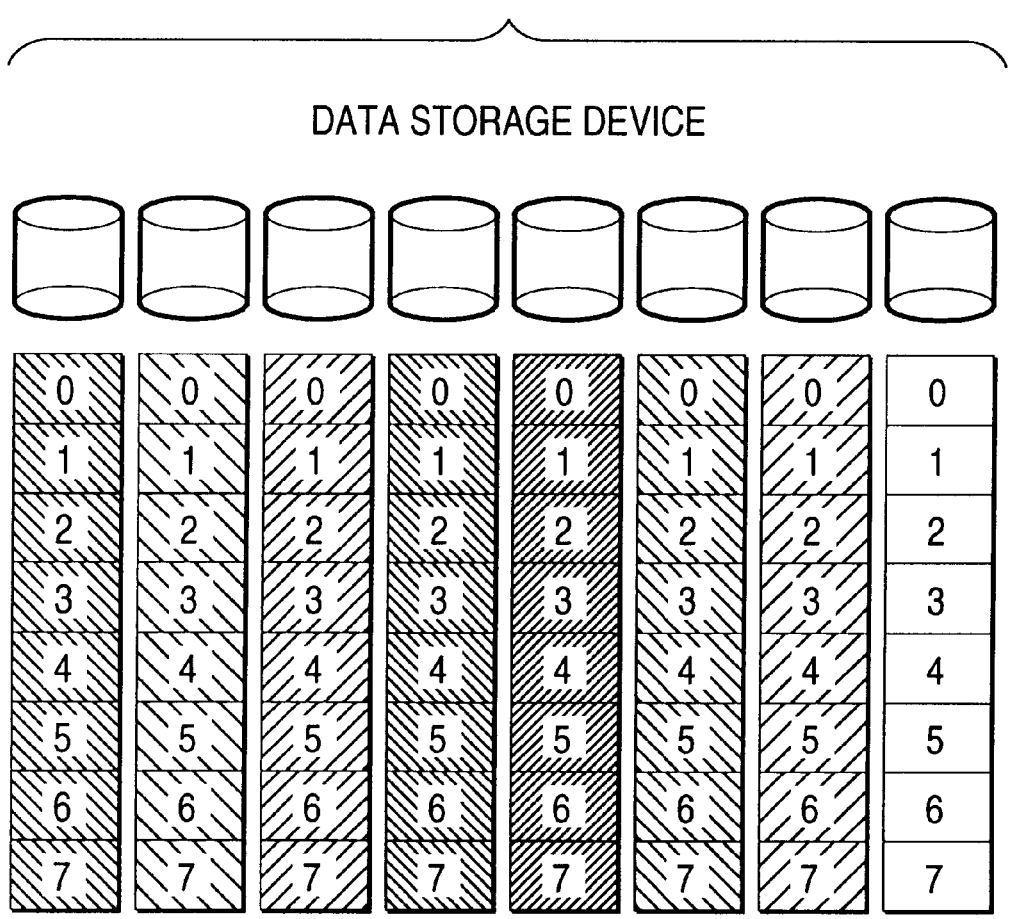
FIG. 49 is an explanatory view of the image data storage system shown in FIG. 48.
Figure 50:
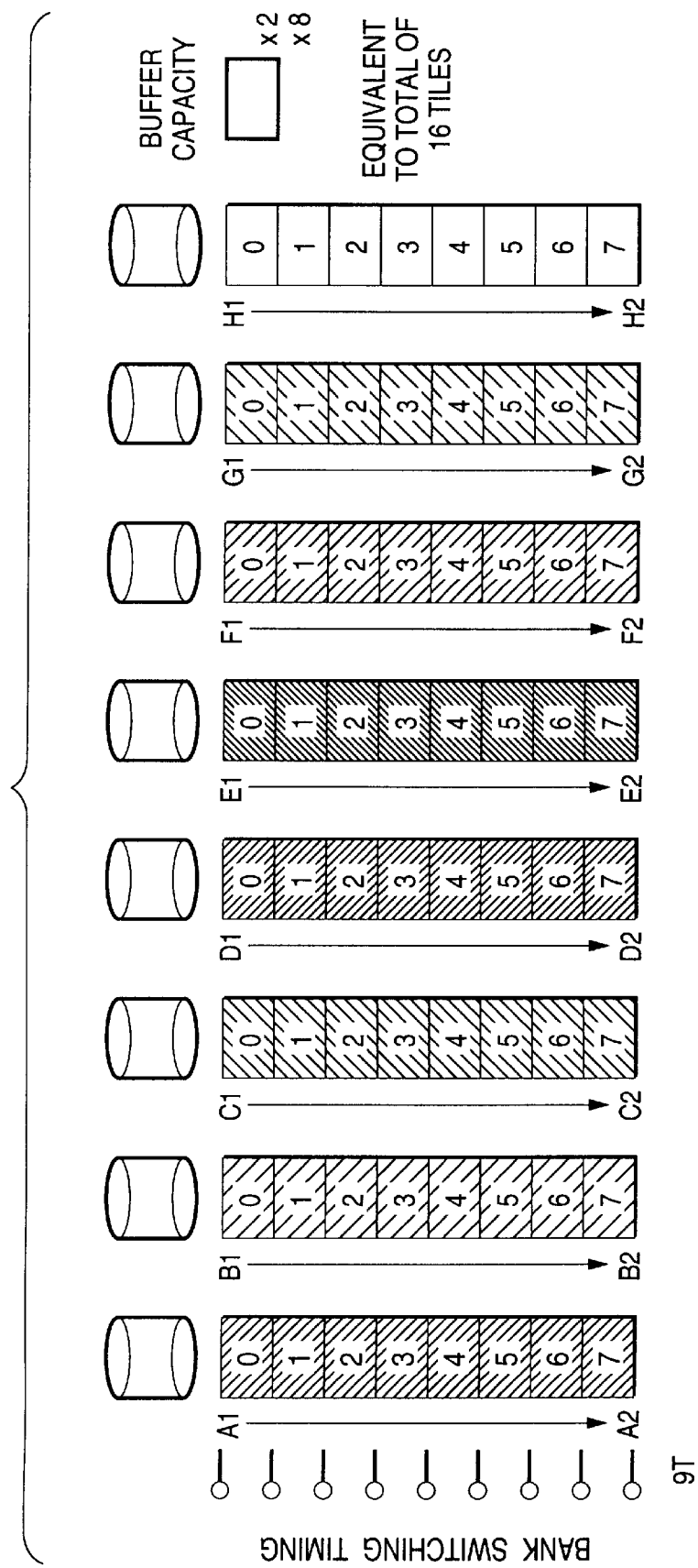
FIG. 50 is an explanatory view of an access technique used when a standard image is obtained according to the data storage system shown in FIGS. 48 and 49 using the conventional image data rotational processing device shown in FIG. 35; and, FIG. 51 is an explanatory view of an access technique used when a 90-deg. rotated image is obtained according to the data storage system shown in FIGS. 48 and 49 using the conventional image data rotational processing device shown in FIG. 35.
Figure 51:
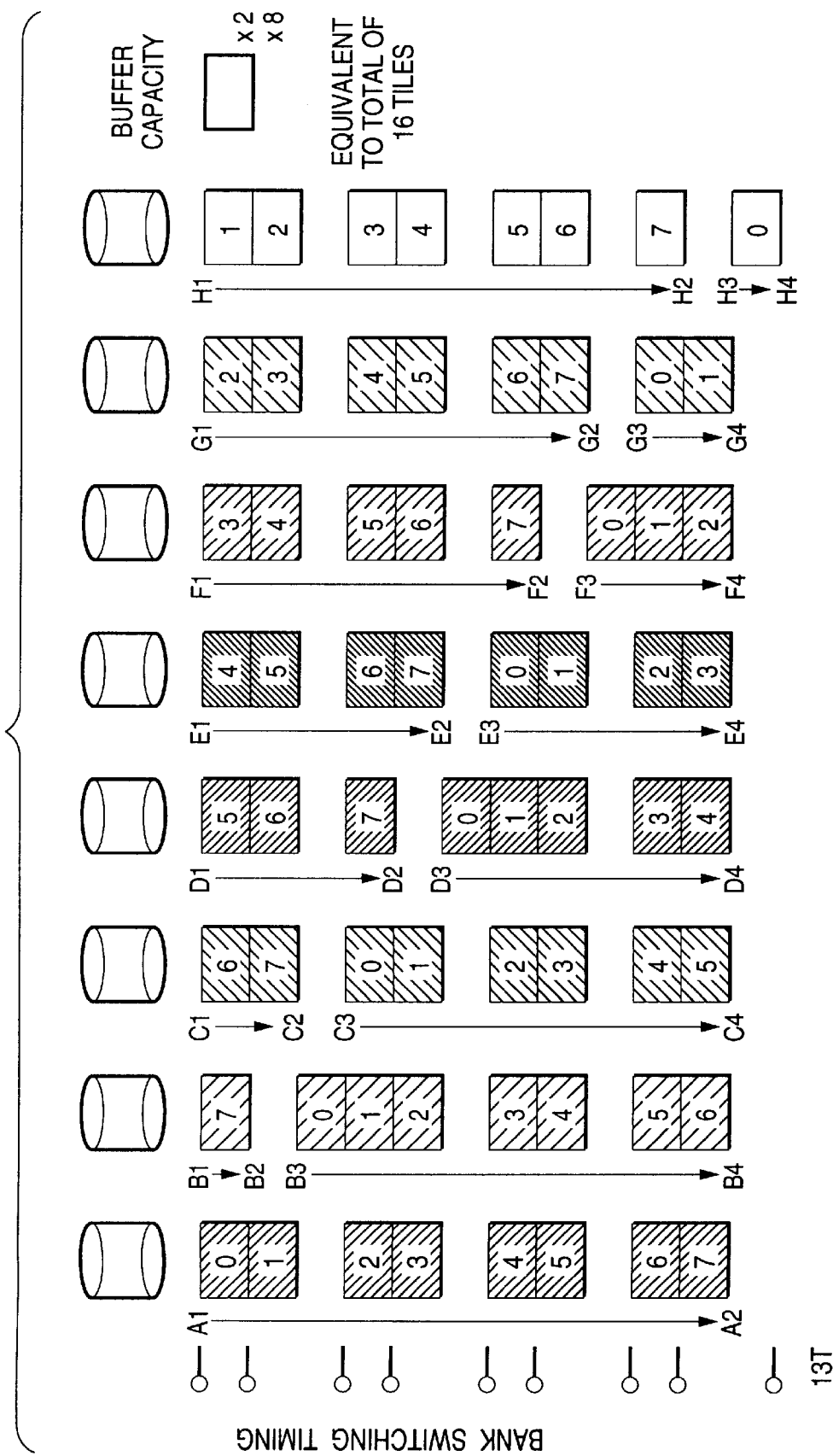

In connection with the storage method according to the present modification 4, in FIG. 26, there is shown an access technique for reading out the standard image from the buffer memory, and, in FIG. 27, there is shown an access technique for reading out the 90-deg. rotated image from the buffer memory. In the present modification, the capacity of the buffer memory is the same as in the above-mentioned modifications, that is, it is equivalent to 16 tiles.

As shown in FIG. 26, in the access technique for reading out the standard image, the ¼ tiles respectively stored behind the tiles 4, 8 and 12 are read away. For this reason, the transfer time in this case is longer by a time equivalent to the ¼ tiles read-away time than that in the above-mentioned embodiment, whereas this time is shorter than 1T equivalent to the transfer time of 1 tile. However, here, if a total of the read-away time is assumed as 1T, then the transfer time necessary for access to the standard image in the modification 4 can be considered as 18T.

In the access to the 90-deg. rotated image, as shown in FIG. 27, the ¼ tiles respectively stored in the rear of the tiles 4, 8 and 12 are read out, and are then respectively combined with tiles 0d (which are respectively equivalent to a ¼ of a tile stored as the tile 0) in the disc device in which most of the tiles having their corresponding pattern are stored, thereby creating a tile 0. Due to the fact that the ¼ tiles to be stored are allotted to the four disc devices 31A–31D in the above-mentioned manner, the ¼ tiles of the tile 0 having the same pattern, that is, the tiles 0a, 0b, 0c and 0d can be obtained at the same timing, as can be clearly seen from FIG. 27.

That is, data following the tiles 4, 8 and 12 can be read out continuously from the disc device, which does not disturb the continuous access at all. After completion of read-out of the tile 15, access may be provided not to the leading address of the tile 0 but to the leading address of the tile 0d and, even if there is necessary 1T between them, it is possible to save a read-out time equivalent to ¾ tiles necessary to read out the tiles 0a–0c. As shown in FIG. 27, there are four similar portions in total and thus the sum of the read time of the ¼ tiles is 1T, so that the transfer time necessary in access to the 90-deg. rotated image provides 18T.

As described above, in the modification 4, when compared with the above-mentioned first embodiment, the transfer time required in the read-out access to the standard image is longer by 1T, whereas the transfer time in the read-out to the 90-deg. rotated image is shorter by 3T.

[Other modifications]

Although the above-mentioned modifications have been all described under the assumption that the image data are raw data, a similar effect can also be obtained even when compressed image data are handled. In that case, when the data size after compressed is fixed, the above-mentioned embodiment can be applied as it is. Also, even when the data size after compressed is not fixed, if the data sizes of the compressed data are controlled for each tile, then the above-mentioned embodiment can be applied easily.

Also, in the above-mentioned modifications, while description has been given of the case in which the disc devices to be driven in parallel are used as the data storage means of the image data storage part to be driven in parallel, a semiconductor memory array can also be used as the data storage means to be driven in parallel.

As has been described heretofore, according to the invention, due to the fact that a plurality of data storage means to be driven in parallel are used as an image data storage part and also that a method for storing image data into these plurality of data storage means is improved, not only when a standard image is obtained but also when a rotated image such as a 90-deg. rotated image is obtained, the capacity of a buffer memory can be reduced down to a necessary minimum capacity and also a high transfer speed can be realized.

What is claimed is:

1. An image data storing method for storing image data for a two-dimensional image in N data storage devices to be driven in parallel, said method comprising the steps of:

dividing said two-dimensional image into small divisional areas arranged in rectilinearly oriented lines and rows such that the number of areas in each line is equal to 2N and the number of areas in each row is equal to or less than 2N; and storing said small divisional areas in each of said N data storage devices such that no more than two of said areas in the same line are stored in the same storage device and no more than two of said areas in the same row are stored in the same storage device, and wherein two areas located in the same line and stored in the same storage device are positioned either adjacent to one another in the line or at opposite ends of the line and wherein two areas located in the same row and stored in the same storage device are positioned either adjacent to one another in the row or at opposite ends of the row.

2. The image data storing method set forth in claim 1, wherein said small divisional areas are stored in a continuously accessible sequence in each of said data storage devices and wherein each pair of areas from the same line or row of said two-dimensional image are stored in adjoining positions within said sequence or at opposite ends of said sequence.

3. An image data rotational processing device comprising:

an image data storage subsystem including N data storage devices driven in parallel;

a buffer memory for temporarily storing image data read out from said image data storage subsystem; and a read/write controller for writing image data stored in said image data storage subsystem into said buffer memory and for reading said image data out of said buffer memory to an image display device, said writing and reading operations being performed such that a two-dimensional image represented by said image data is supplied to said image display device oriented in a first direction or in a direction rotated 90 degrees relative to said first direction;

said read/write controller further operating to write said image data into said image data storage subsystem such that said two-dimensional image is divided into small divisional areas arranged in rectilinearly oriented lines and rows with the number of areas in each line being equal to 2N and the number of areas in each row being equal to or less than 2N, said writing operation into said storage subsystem further allocating said small divisional areas to each of said N data storage devices such that no more than two of said areas in the same line are stored in the same storage device and no more than two of said areas in the same row are stored in the same storage device, and wherein two areas located in the same line and stored in the same storage device are positioned either adjacent to one another in the line or at opposite ends of the line and wherein two areas located in the same row and stored in the same storage device are positioned either adjacent to one another in the row or at opposite ends of the row.

4. The image data rotational processing device set forth in claim 3 wherein said read/write controller further operates to write said image data into said image data storage subsystem such that said small divisional areas are stored in each data storage device in a continuously accessible sequence with each pair of areas from the same line or row of said two-dimensional image being stored in adjoining positions within said sequence or at opposite ends of said sequence.

5. The image data rotational processing device set forth in claim 3, wherein said buffer memory is structured in a plurality of sections, with two sections being allotted exclusively to each of said N data storage devices, and wherein said read/write controller operates to write data from a data storage device into one of said sections while it reads data out of the other of said sections to said display device.

* * * * *